(12) United States Patent
Kobuke et al.

(10) Patent No.: US 7,094,866 B2
(45) Date of Patent: *Aug. 22, 2006

(54) COVALENTLY FIXED PORPHYRIN POLYMER HAVING PORPHYRIN METAL COMPLEX SUBSTITUTED WITH COORDINATING HETERO AROMATIC RING AS CONSTITUTING UNIT THEREOF, AND METHOD OF PRODUCING THE SAME

(75) Inventors: Yoshiaki Kobuke, Ikoma (JP); Akiharu Satake, Ikoma (JP)

(73) Assignee: Nara Institute of Science and Technology, Ikoma (JP)

( * ) Notice: Subject to any disclaimer, the term of this patent is extended or adjusted under 35 U.S.C. 154(b) by 203 days.

This patent is subject to a terminal disclaimer.

(21) Appl. No.: 10/419,767

(22) Filed: Apr. 22, 2003

(65) Prior Publication Data

US 2004/0072988 A1    Apr. 15, 2004

(30) Foreign Application Priority Data

Sep. 26, 2002   (JP)   .............................. 2002-281616

(51) Int. Cl.
  *C08G 79/00*    (2006.01)
(52) U.S. Cl. ...................... 528/395; 540/145; 514/185; 514/410; 534/15; 424/9.362; 424/9.61
(58) Field of Classification Search ................ 528/395; 540/145; 514/185, 410; 534/15; 424/9.362, 424/9.61

See application file for complete search history.

(56) References Cited

U.S. PATENT DOCUMENTS 6,429,310 B1 * 8/2002 Kobuke et al. ............. 540/145

6,602,998 B1 * 8/2003 Kobuke et al. ............. 540/145

OTHER PUBLICATIONS

Kofuya et al, Mercapto substituted imidazolylporphyrin metal complex monomers, their polymers, and their preparation, 2001, Jpn. Kokai Tokkyo Koho., Chem Abstract 135: 257635.*

Kofuya et al, Manufacture of polyporphyrins having imidazolylporphyrin metal complex unit, 2001, Jpn. Kokai Tokkyo Koho, Chem Abstract 135: 153257.□□.*

Stibrany et al, Two modes—a structural and spectroscopic comparison, 1996, Journal of the American Chemical Society, Chem Abstract 124: 330619.*

Ken-ichi Sugiura, et al. "A *Mandala*-Patterned *Bandanna*-Shaped Porphyrin Oligomer, $C_{1244}H_{1350}N_{84}Ni_{20}O_{88}$, Having a Unique Size and Geometry" Chemistry Letters No. 11, pp. 1193-1194, Nov. 5, 1999.

Naoki Aratani, et al. "Extremely Long, Discrete *meso-meso*-Coupled Porphyrin Arrays" Angewandte Chemie International Edition vol. 39, No. 8, Apr. 17, 2000, pp. 1458-1462.

Akihiko Tsuda, et al. "Fully Conjugated Porphyrin Tapes With Electronic Absorption Bands That Reach Into Infrared" Science, vol. 293, Jul. 6, 2001, pp. 79-82.

Yoshiaki Kobuke, et al. "Covalent Fastening of Coordination-Organized Supramolecule" Abstract of XIIth International Symposium on Supramolecular Chemistry at Eilat, Israel, Oct. 6-11, 2002, 3 pages.

* cited by examiner

*Primary Examiner*—Duc Truong
(74) *Attorney, Agent, or Firm*—Oblon, Spivak, McClelland, Maier & Neustadt, P.C.

(57) ABSTRACT

A covalently linked linear porphyrin polymer represented by formula (1):

(1)

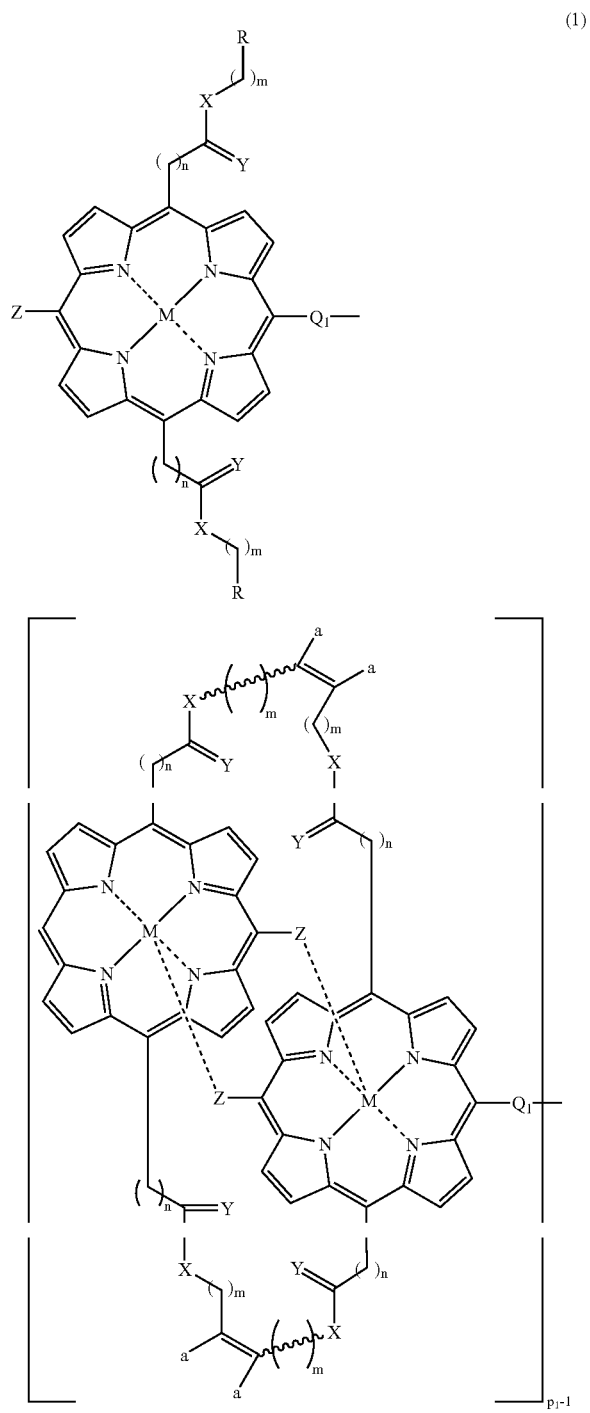

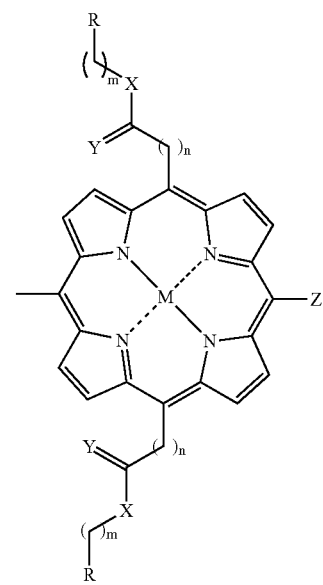

-continued wherein
R represents an alkyl group or

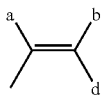

(wherein a, b and d independently represent H, an alkyl group or aryl group);

X represents —O—, —S—, >$NR_{101}$ (wherein $R_{101}$ represents H or an alkyl group), —$CH_2$— or a single bond;

Y represents =O, =S, or 2H;

m represents an integer of 0 to 4;

n represents an integer of 0 to 6;

Z represents a five- or six-membered, nitrogen-containing, coordinating hetero aromatic ring group;

M represents an ion of metal selected from typical metals and transition metals;

$Q_1$ represents a single bond or a linear, divalent linking group; and $p_1$ represents an integer of 2 or more.

20 Claims, 12 Drawing Sheets

COVALENTLY FIXED PORPHYRIN POLYMER HAVING PORPHYRIN METAL COMPLEX SUBSTITUTED WITH COORDINATING HETERO AROMATIC RING AS CONSTITUTING UNIT THEREOF, AND METHOD OF PRODUCING THE SAME

CROSS-REFERENCE TO RELATED APPLICATIONS

This application is based upon and claims the benefit of priority from the prior Japanese Patent Application No. 2002-281616, filed Sep. 26, 2002, the entire contents of which are incorporated herein by reference.

BACKGROUND OF THE INVENTION

1. Field of the Invention

The present invention relates to a novel porphyrin dimer or higher porphyrin polymer. The present invention also relates to a method of producing the same.

Further, the present invention relates to another porphyrin dimer and a porphyrin monomer which constitute the porphyrin polymer of the present invention.

The porphyrin polymer of the present invention is expected to function as an element for efficiently capturing and transferring light energy. It is contemplated that the porphyrin polymer of the present invention is applied to an artificial photosynthesis element and an organic solar battery. Porphyrin is also known to function as a light-induced electron transfer element. Therefore, it is expected that the porphyrin polymer of the present invention can be applied to a light/electron element of a molecular size.

2. Description of the Related Art

Porphyrin is a cyclic tetrapyrrole in which four pyrrole nucleuses are connected with four methine groups. As porphyrin has a large conjugated system including eighteen π electrons, it is expected that a porphyrin polymer can be used as a material of molecular wire or the like. Some examples of synthesizing a porphyrin polymer have been reported.

For example, Osuka of Kyoto University and Sugiura of Tokyo Metropolitan University have reported methods of extending a porphyrin polymer chain by way of covalent bonds (K. Sugiura, H. Tanaka, T. Matsumoto, T. Kawai, Y. Sakata, Chem. Lett. 1999, 1193; N. Aratani, A. Osuka, Y. H. Kim, D. H. Jeong, D. Kim, Angew. Chem. Int. Ed. 39, 1458 (2000); and A. Tsuda and A. Osuka, Science, 293, 79 (2001)). However, each of these methods requires a synthetic process with a very large number of steps, which is economically disadvantageous. Further, in these methods, a porphyrin polymer having up to hundreds of porphyrin units can hardly be synthesized.

The inventors of the present invention have already discovered that imidazolylporphyrin metal complexes form a coordinate bond with each other, between molecules, thereby forming a porphyrin dimer or a higher porphyrin polymer (refer to the following reaction formulae 1 and 2, and Y. Kobuke, H. Miyaji, J. Am. Chem. Soc. 1994, 116, 4111; K. Ogawa, Y. Kobuke, Angew. Chem. Int. Ed. 2000, 39, 4070; and Japanese Patent Application KOKAI Publication No. 2001-213883, which corresponds to U.S. Pat. No. 6,429,310B1, the entire contents of which are incorporated herein by reference, and Patent Application KOKAI Publication No. 2001-253883, the entire contents of which are incorporated herein by reference, which corresponds to U.S. Ser. No. 09/802,923, filed Mar. 12, 2001). Each of these porphyrin polymers functions as an energy-transferring element and thus is expected to be applicable to a molecular electronics element.

Dimer-forming reaction of imidazolylporphyrin with coordination bonds, and dissociation of the dimer (prior art)

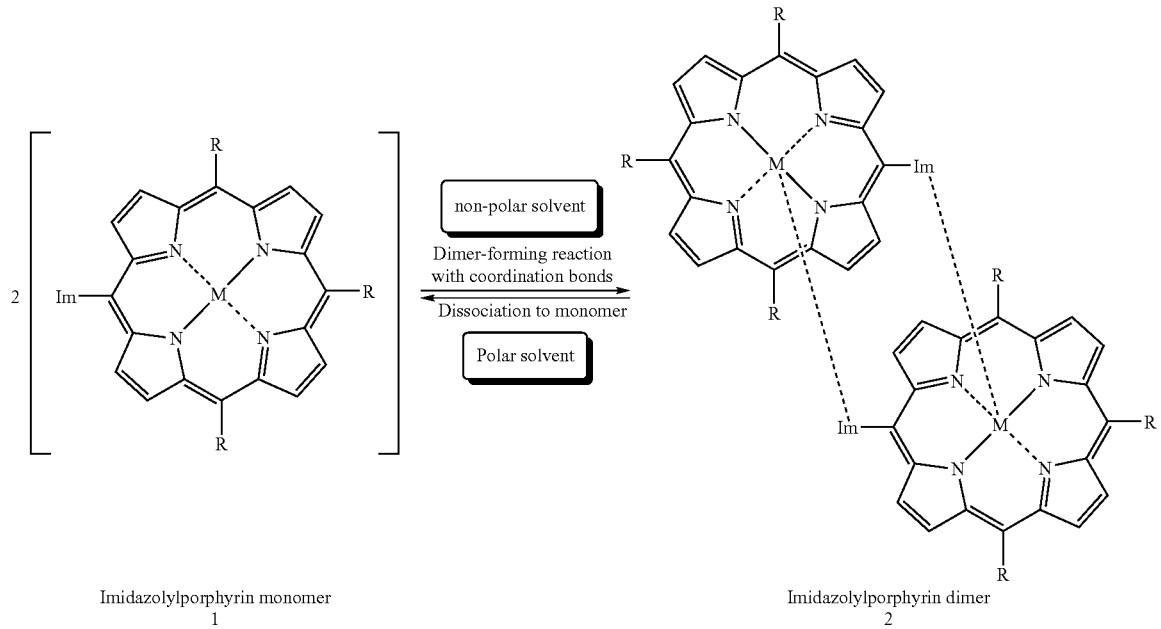

Imidazolylporphyrin monomer
1

Imidazolylporphyrin dimer
2

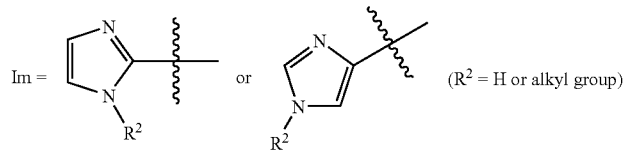

Polymerization of imidazolylporphyrin with coordination bonds (prior art)

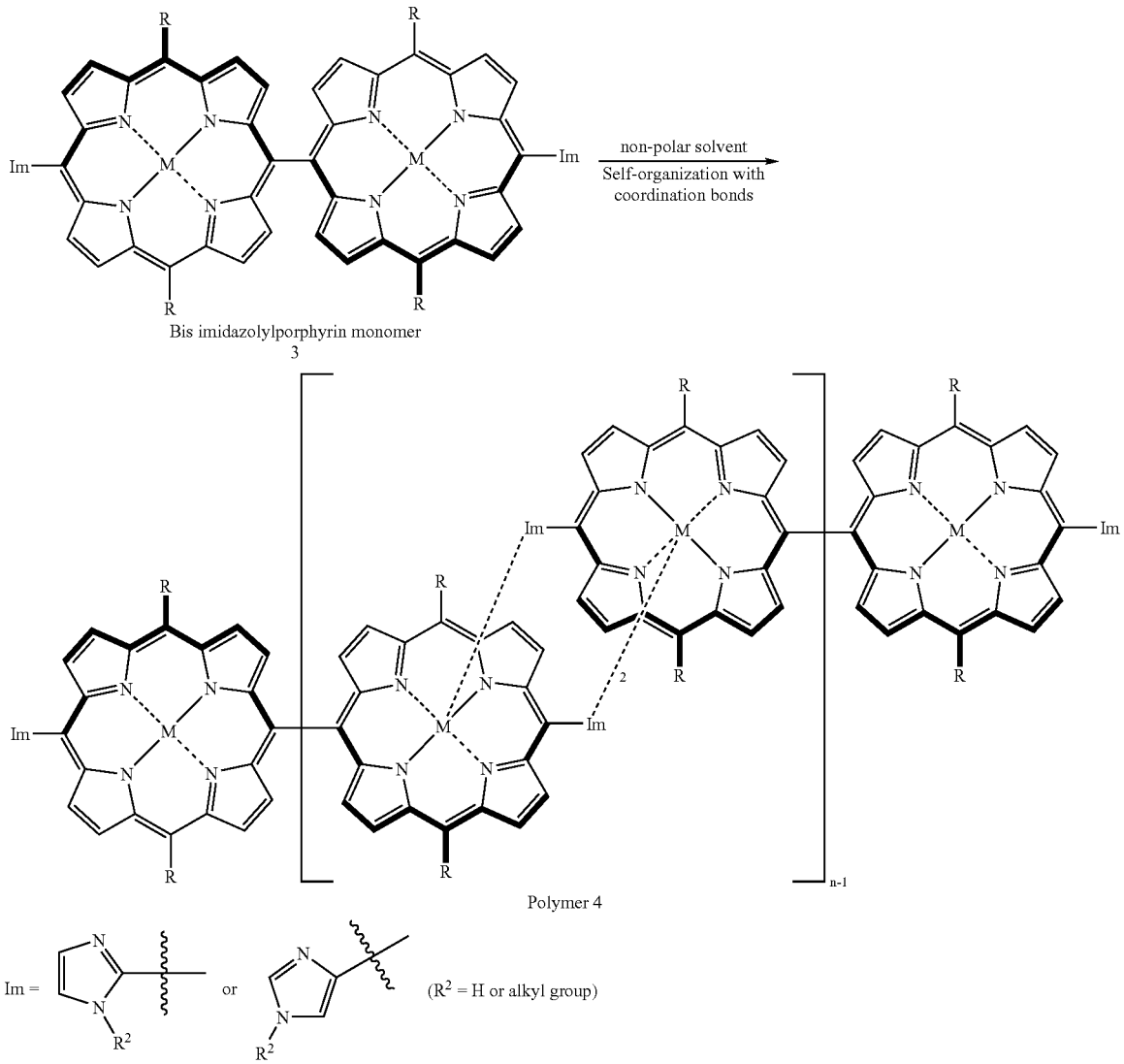

The unique and advantageous feature of a porphyrin polymer constituted of imidazolylporphyrin metal complexes as its constituting units lies in that the porphyrin polymer is self-organized only by mixing imidazolylporphyrin monomers in a non-polar solvent. Accordingly, the only material that is sufficient to synthesize porphyrin polymer is porphyrin monomers, which are the smallest constituting units (refer to the above-mentioned reaction formulae 1 and 2). As compared with the methods of Osuka and Sugiura in which a porphyrin polymer chain is extended by way of covalent bonds, this method requires a smaller number of synthesis steps, and thus is more economical. According to the method, it is actually possible to produce an extremely large metal complex polymer having a molecular weight of 500,000 or so, in which the metal complexes are regularly arranged. However, in this method, the porphyrin polymer extended by coordinate bonds tends to have the coordinate bond thereof cut in a polar solvent, and there arises a problem that the medium and environment applicable to the resulting porphyrin polymer are limited to non-polar ones. This limitation significantly restricts the scope of application of the porphyrin polymer (refer to the reaction indicated by the arrow showing the shift from right to left, of the above-mentioned reaction formula 1). Therefore, it has been desired to synthesize a stable porphyrin polymer in which the porphyrin polymer chain is extended by way of coordinate bonds, is firmly fixed and the coordinate bonds thereof are no longer cut after the polymer formation.

BRIEF SUMMARY OF THE INVENTION

An object of the present invention is to solve the above-mentioned problems. Specifically, the object of the present invention is to provide a porphyrin polymer that can stably exist without being influenced by the surrounding environment such as the polarity of a solvent and be easily produced, even if the degree of polymerization is relatively high.

The inventors of the present invention have discovered that the above object can be attained by using a specific bis-porphyrin derivative, the porphyrin being substituted with a coordinating hetero aromatic ring, as the constituting unit of forming a porphyrin polymer. The bis-porphyrin derivative has a bis-form in which two molecules of a mono derivative are bonded to each other by way of a divalent linking group, each mono derivative molecule being formed by binding, to a porphyrin metal complex, one coordinating hetero aromatic ring group and two groups each having a double bond moiety that can function for a cyclization metathesis reaction. In the porphyrin polymer of the present invention, not only a coordinate bond is formed between the coordinating hetero aromatic ring group and the core metal, but also a covalent bond is formed between the groups each having the double bond moiety, as a result of a cyclization metathesis. Accordingly, the constituting units of the porphyrin polymer can be more firmly fixed and the porphyrin polymer can more stably exist without being influenced by the surrounding environment such as the polarity of a solvent. Further, in the case of the porphyrin polymer of the present invention, the chain-extension method thereof requires a smaller number of synthesis steps and thus more economical, as compared with the conventional method of extending a porphyrin polymer chain by way of covalent bonds. According to the chain-extension method of the present invention, it is actually possible to provide an extremely large metal complex polymer having a molecular weight of 500,000 or so, in which polymer the metal complexes are regularly arranged.

Specifically, the present invention provides a porphyrin polymer as described below.

(I) The present invention provides a linear porphyrin polymer represented by the following formula (1). The porphyrin polymer represented by the formula (1) has porphyrin metal complexes each substituted with a coordinating hetero aromatic ring, as constituting units, and the porphyrin metal complexes being fixed by covalent bonds to each other (hereinafter, the porphyrin polymer represented by the formula (1) is also referred to as "covalently linked linear polymer").

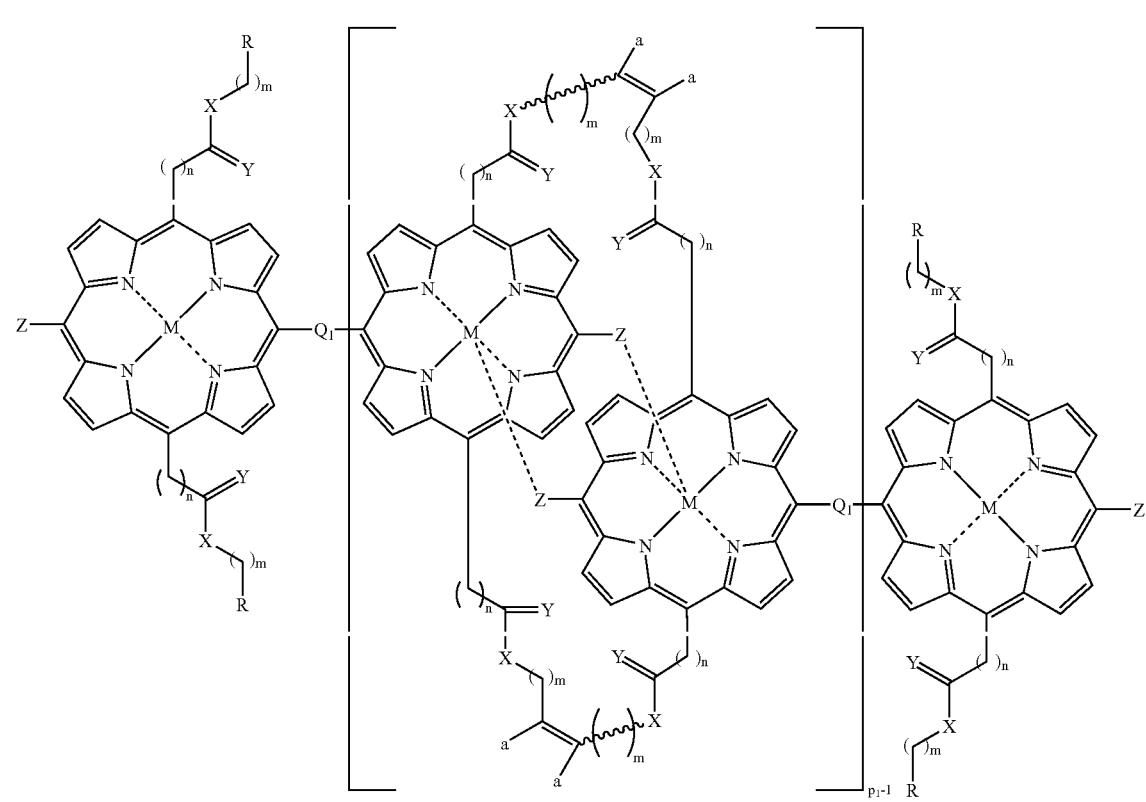

(1)

wherein

R represents an alkyl group or

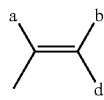

(wherein a, b and d independently represent H, an alkyl group or aryl group);

X represents —O—, —S—, >NR$_{101}$ (wherein R$_{101}$ represents H or an alkyl group), —CH$_2$— or a single bond;

Y represents =O, =S, or 2H;

m represents an integer of 0 to 4;

n represents an integer of 0 to 6;

Z represents a five- or six-membered, nitrogen-containing, coordinating hetero aromatic ring group;

M represents an ion of metal selected from typical metals and transition metals;

$Q_1$ represents a single bond or a linear, divalent linking group; and $p_1$ represents an integer of 2 or more.

(II) Further, the present invention also provides another linear porphyrin polymer represented by the following formula (1-1), which is a derivative of the covalently linked linear polymer of the formula (1).

e and f simultaneously represent H or a hydroxyl group, or e and f are bonded to each other to form an epoxy ring together with C—C to which e and f are bonded.

(III) Furthermore, the present invention also provides a cyclic porphyrin polymer represented by the following formula (2). The cyclic porphyrin polymer represented by the formula (2) has porphyrin metal complexes each substituted with a coordinating hetero aromatic ring, as constituting units, and the porphyrin metal complexes being fixed by covalent bonds to each other (hereinafter the cyclic porphyrin represented by the formula (2) is also referred to as "covalently linked cyclic polymer"). The covalently linked cyclic porphyrin polymer is in a cyclic structure because the

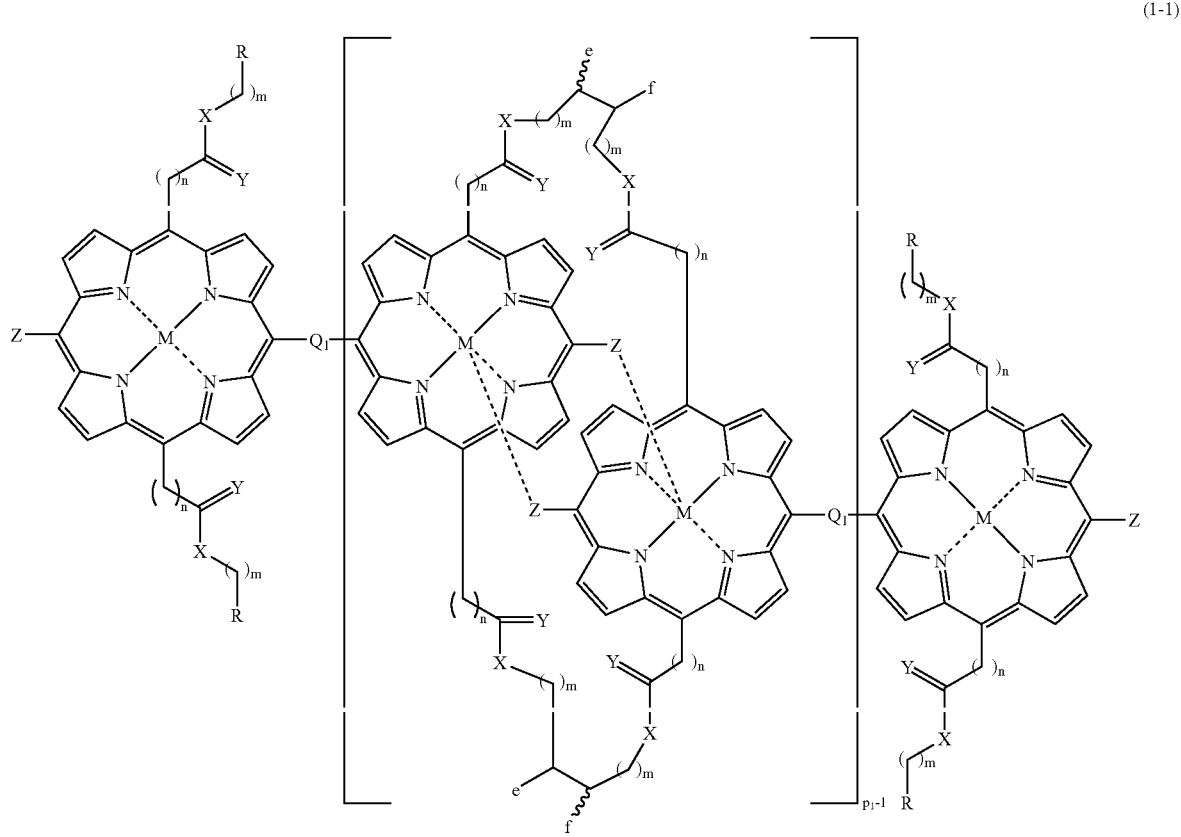

(1-1)

wherein

R, X, Y, m, n, Z, M, $Q_1$ and $p_1$ have the same meaning as defined in the formula (1) of the above-mentioned (I); and divalent group represented by -$Q_2$- for forming the bis-form, which corresponds to the linking group (-$Q_1$-) in the formula (1), is a bent, divalent group.

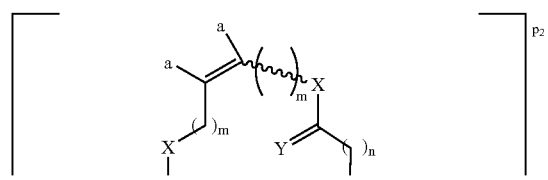

(2)

-continued

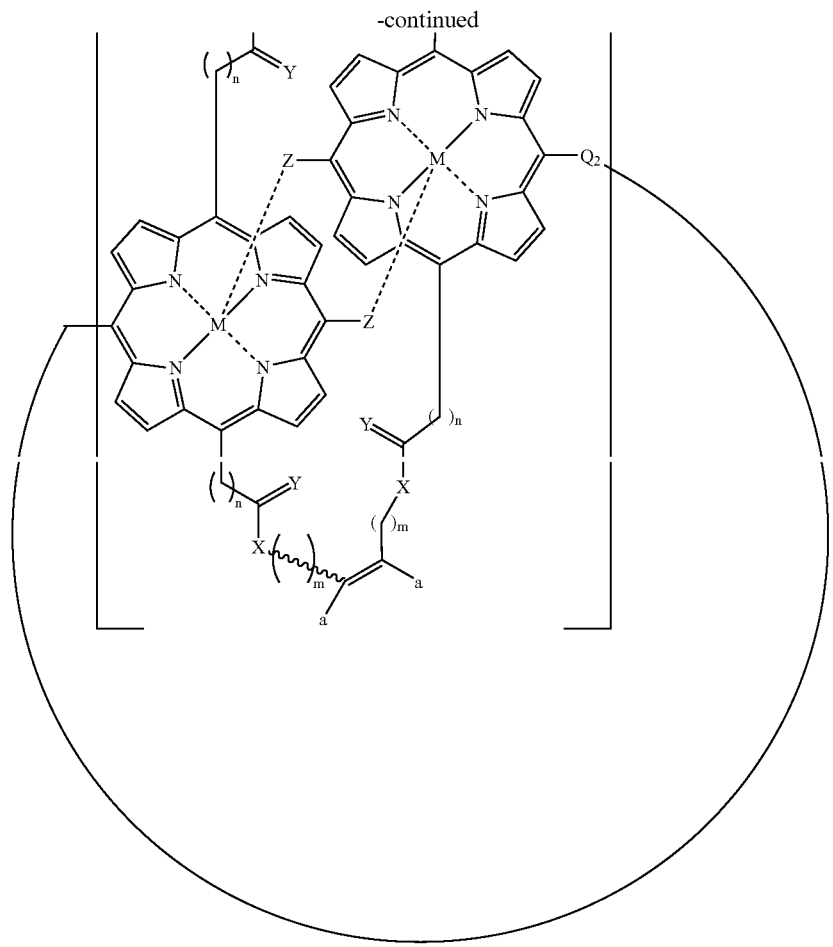

wherein
a represents H, an alkyl group or aryl group;

X represents —O—, —S—, >$NR_{101}$ (wherein $R_{101}$ represents H or an alkyl group), —$CH_2$— or a single bond;

Y represents =O, =S, or 2H;

m represents an integer of 0 to 4;

n represents an integer of 0 to 6;

Z represents a five- or six-membered, nitrogen-containing, coordinating hetero aromatic ring group;

M represents an ion of metal selected from typical metals and transition metals;

$Q_2$ represents a bent divalent group; and $p_2$ represents an integer of 3 or more.

(IV) Moreover, the present invention also provides another cyclic porphyrin polymer represented by the following formula (2-1), which is a derivative of the covalently linked cyclic polymer represented by the formula (2).

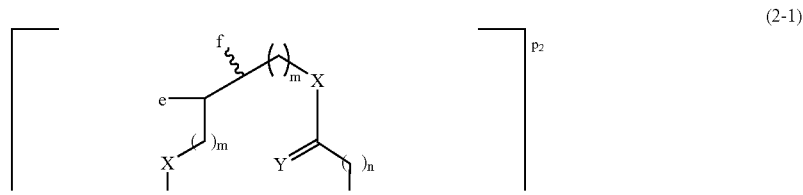

(2-1)

-continued

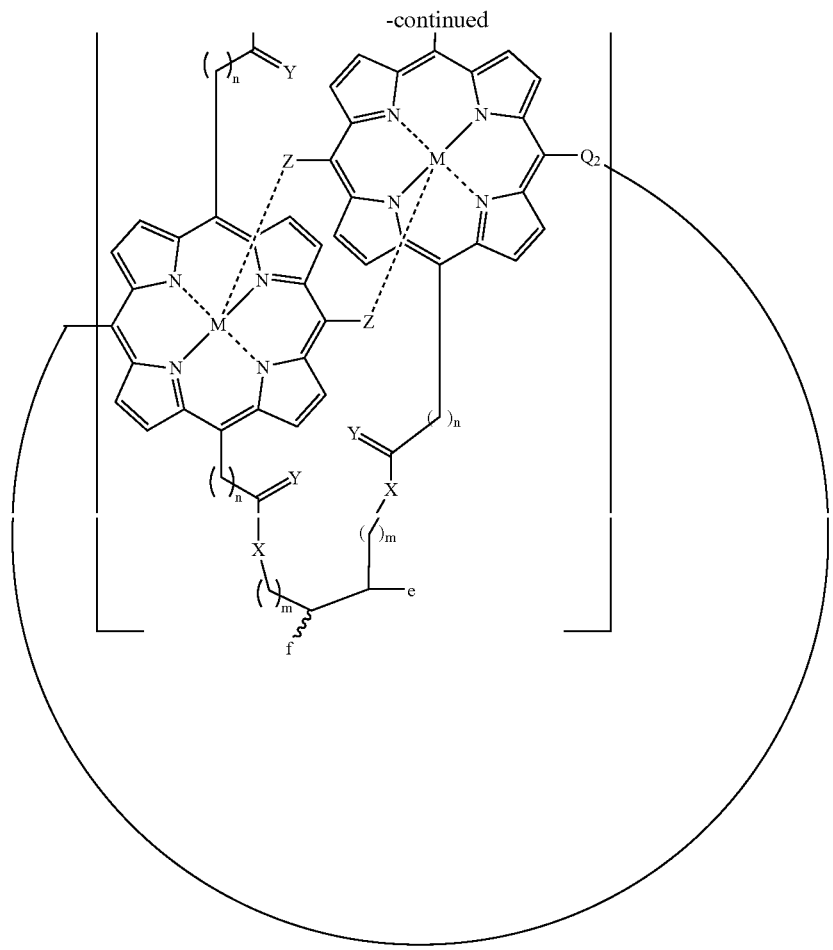

wherein X, Y, m, n, Z, M, $Q_2$ and $p_2$ have the same meaning as defined in the formula (2) of the above-mentioned (III); and e and f simultaneously represent H or a hydroxyl group, or e and f are bonded to each other to form an epoxy ring together with C—C to which e and f are bonded.

(V) The covalently linked linear polymer represented by the formula (1) of the present invention may be prepared by effecting a cyclization metathesis reaction of another linear porphyrin polymer represented by the following formula (3), in the presence of Grubbs catalyst. The linear porphyrin polymer represented by the following formula (3) has porphyrin metal complexes each substituted with a coordinating hetero aromatic ring, as constituting units, the metal complexes being bonded by way of coordinate bonds to each other (hereinafter the porphyrin polymer represented by the formula (3) is also referred to as "coordination-organized linear polymer").

The present invention also provides the coordination-organized linear polymer represented by the formula (3), and a method of producing the covalently linked linear polymer of the formula (1) by using the coordination-organized linear polymer represented by the formula (3).

(3)

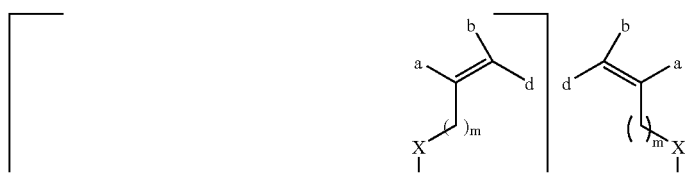

-continued

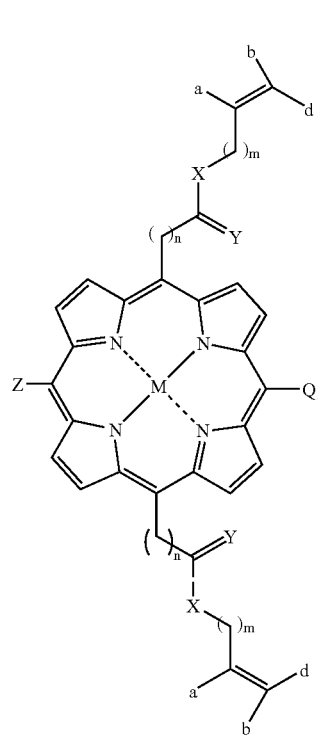
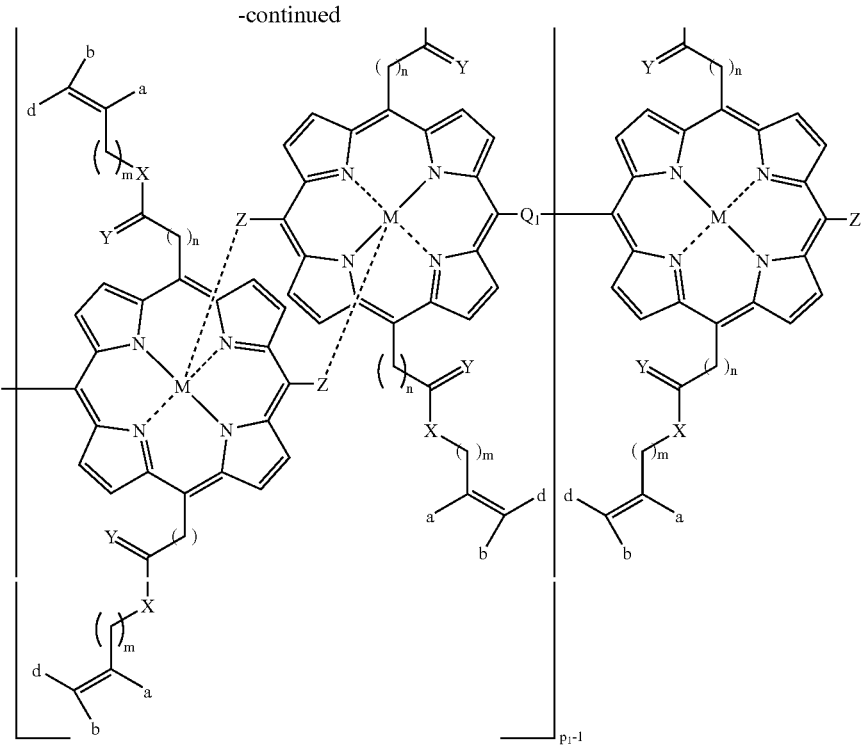

wherein a, b and d independently represent H, an alkyl group or aryl group;

X represents —O—, —S—, >NR$_{101}$ (wherein R$_{101}$ represents H or an alkyl group), —CH$_2$— or a single bond;

Y represents =O, =S, or 2H;

m represents an integer of 0 to 4;

n represents an integer of 0 to 6;

Z represents a five- or six-membered, nitrogen-containing, coordinating hetero aromatic ring group;

M represents an ion of metal selected from typical metals and transition metals;

Q$_1$ represents a linear divalent group; and p$_1$ represents an integer of 2 or more.

(VI) The covalently linked cyclic polymer represented by the formula (2) may be prepared by effecting a cyclization metathesis reaction of another cyclic porphyrin polymer represented by the following formula (4), in the presence of the Grubbs catalyst. The cyclic porphyrin polymer represented by the formula (4) has porphyrin metal complexes each substituted with a coordinating hetero aromatic ring, as constituting units, the porphyrin metal complexes being bonded by way of coordinate bonds to each other (hereinafter the cyclic porphyrin polymer represented by the formula (4) is also referred to as "coordination-organized cyclic polymer").

The present invention also provides the coordination-organized cyclic polymer represented by the formula (4), and a method of producing the covalently linked cyclic polymer represented by the formula (2) by using the coordination-organized cyclic polymer represented by the formula (4).

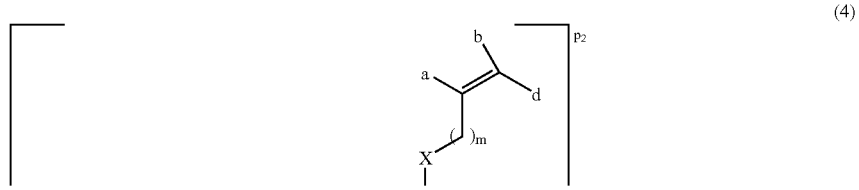

(4)

-continued

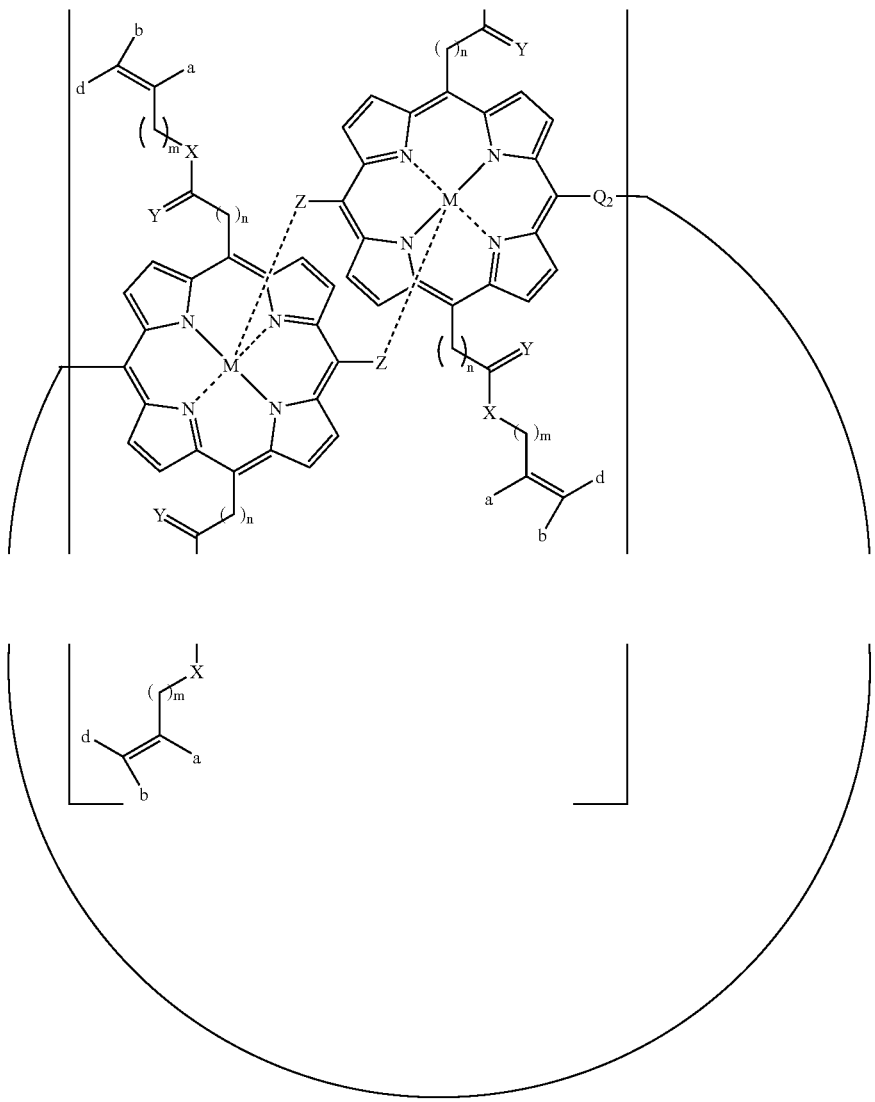

wherein a, b and d independently represent H, an alkyl group or aryl group;

X represents —O—, —S—, >NR$_{101}$ (wherein R$_{101}$ represents H or an alkyl group), —CH$_2$— or a single bond;

Y represents =O, =S, or 2H;

m represents an integer of 0 to 4;

n represents an integer of 0 to 6;

Z represents a five- or six-membered, nitrogen-containing, coordinating hetero aromatic ring group;

M represents an ion of metal selected from typical metals and transition metals;

Q$_2$ represents a bent divalent group; and p$_2$ represents an integer of 3 or more.

(VII) The coordination-organized linear polymer represented by the formula (3) and the coordination-organized cyclic polymer represented by the formula (4) can be prepared from bis-porphyrin monomer represented by the following formula (5). The monomer represented by the formula (5) comprises two porphyrins each substituted with a coordinating hetero aromatic ring, the porphyrins being boned by a cross-liking group.

The present invention provides the bis-porphyrin monomer represented by the following formula (5), as well as a method of producing the coordination-organized linear polymer represented by the formula (3) and the coordination-organized cyclic polymer represented by the formula (4) by self-organizing the bis-porphyrin monomer represented by the following formula (5), in a non-polar solvent. In this case, when a single bond or a linear, divalent linking group is used as the linking group represented by -Q- in the formula (5), the coordination-organized linear polymer represented by the formula (3) is obtained. Alternatively, when a bent, divalent group is used as the linking group represented by -Q- in the formula (5), the coordination-organized cyclic polymer represented by the formula (4) is obtained.

(5)

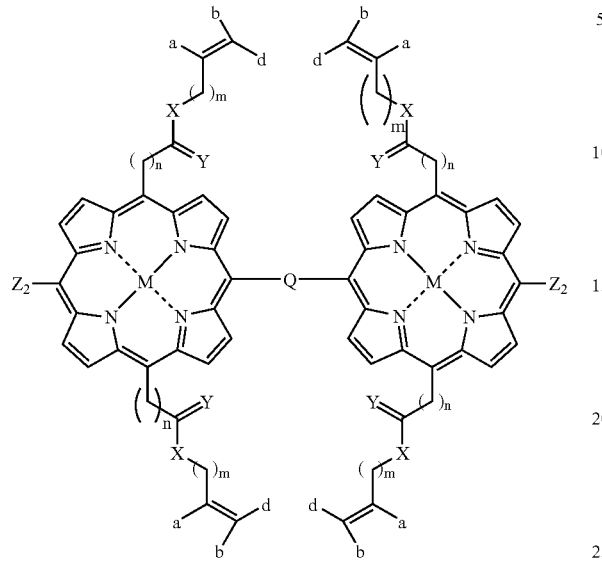

wherein
- a, b and d independently represent H, an alkyl group or aryl group;
- X represents —O—, —S—, >NR$_{101}$ (wherein R$_{101}$ represents H or an alkyl group), —CH$_2$— or a single bond;
- Y represents =O, =S, or 2H;
- m represents an integer of 0 to 4;
- n represents an integer of 0 to 6;
- Z$_2$ represents a five- or six-membered, nitrogen-containing, coordinating hetero aromatic ring group, alkyl group or aryl group;
- M represents an ion of metal selected from typical metals and transition metals; and
- Q represents a single bond or a divalent linking group.

(VIII) Further, the present invention also provides a porphyrin dimer represented by the following formula (6). The dimer represented by the formula (6) comprises two porphyrins each substituted with a coordinating hetero aromatic ring, the porphyrins being fixed by covalent bonds to each other (hereinafter the dimer represented by the formula (6) is also referred to as "covalently linked dimer".

(6)

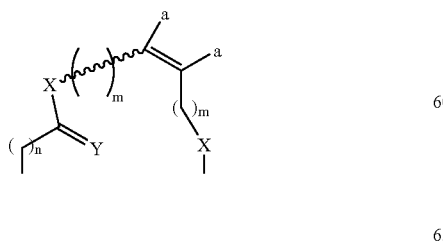

-continued

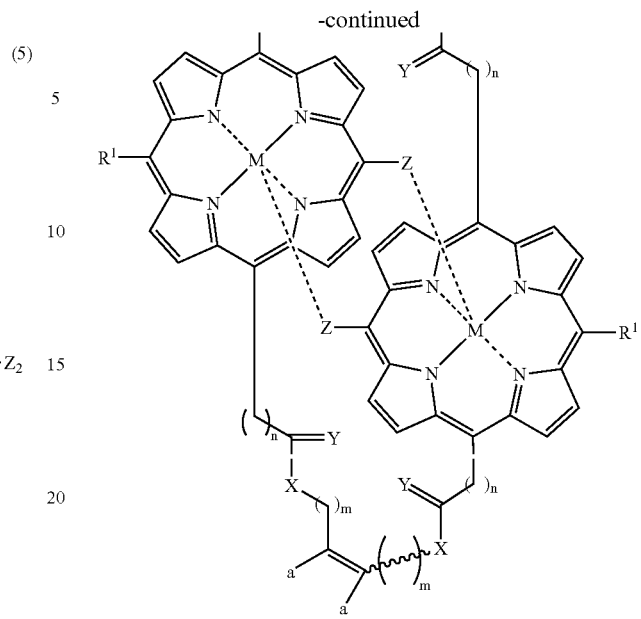

wherein
- a represents H, an alkyl group or aryl group;
- X represents —O—, —S—, >NR$_{101}$ (wherein R$_{101}$ represents H or an alkyl group), —CH$_2$— or a single bond;
- Y represents =O, =S, or 2H;
- m represents an integer of 0 to 4;
- n represents an integer of 0 to 6;
- Z represents a five- or six-membered, nitrogen-containing, coordinating hetero aromatic ring group;
- M represents an ion of metal selected from typical metals and transition metals;
- R$^1$ represents H, an alkyl group, alkenyl group, alkynyl group, aryl group,

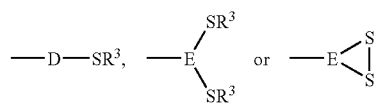

(wherein D represents a divalent group including at least one of an arylene group and alkylene group, E represents a trivalent group including at least one of an arylene group and alkylene group, and R$^3$ represents H or an acetyl group).

(IX) Further, the present invention also provides another covalently linked dimer represented by the following formula (6-1), which is a derivative of the covalently linked dimer represented by the formula (6).

(6-1)

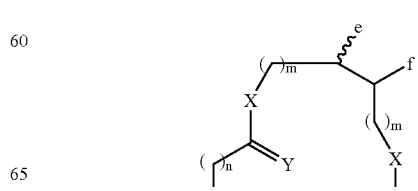

-continued

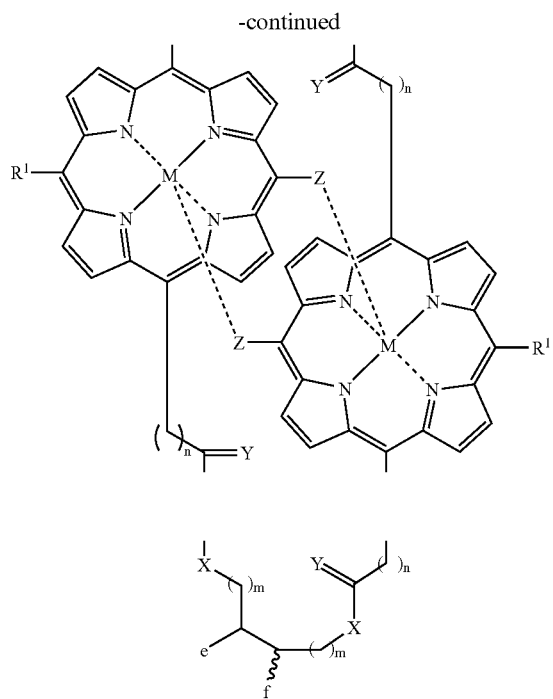

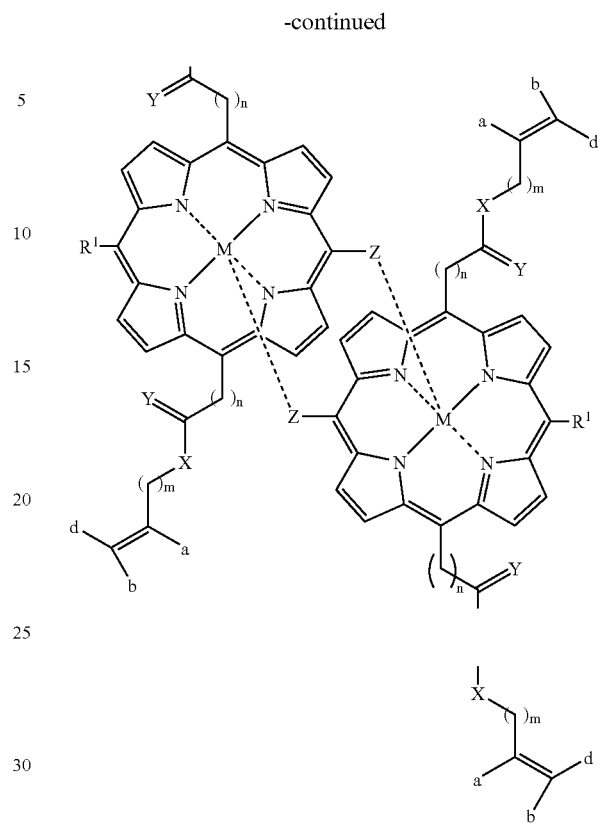

wherein

X, Y, m, n, Z, M, and $R^1$ have the same meaning as defined in the formula (6) of the above-mentioned (VIII); and e and f simultaneously represent H or a hydroxyl group, or e and f are bonded to each other to form an epoxy ring together with C—C to which e and f are bonded.

(X) The covalently linked dimer represented by the above formula (6) may be obtained by effecting a cyclization metathesis reaction of another porphyrin dimer represented by the following formula (7), in the presence of the Grubbs catalyst. The dimer represented by the formula (7) comprises two porphyrins each substituted with a coordinating hetero aromatic ring, the porphyrins being fixed by coordinate bonds to each other (hereinafter the dimer represented by the formula (7) is also referred to as "coordination-organized dimer".

The present invention also provides the coordination-organized dimer represented by formula (7), and a method of producing the covalently linked dimer of the formula (6) by using the coordinately boned dimer represented by the formula (7).

(7)

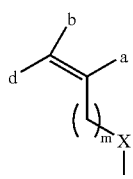

wherein a, b and d independently represent H, an alkyl group or an aryl group;

X represents —O—, —S—, >$NR_{101}$ (here, $R_{101}$ represents H or an alkyl group), —$CH_2$— or a single bond;

Y represents ═O, ═S, or 2H;

m represents an integer of 0 to 4;

n represents an integer of 0 to 6;

Z represents a five- or six-membered, nitrogen-containing, coordinating hetero aromatic ring group;

M represents an ion of metal selected from typical metals and transition metals;

$R^1$ represents H, an alkyl group, alkenyl group, alkynyl group, aryl group,

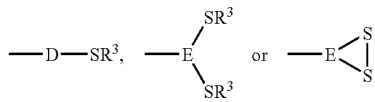

(wherein D represents a divalent group including at least one of an arylene group and alkylene group, E represents a trivalent group including at least one of an arylene group and alkylene group, and $R^3$ represents H or an acetyl group).

(XI) The present invention also provides a porphyrin metal complex monomer represented by the following formula (8), the porphyrin metal complex being substituted with a coordinating hetero aromatic ring, and a method of producing the coordination-organized diner represented by the formula (7) by using the monomer represented by the formula (8).

(8)

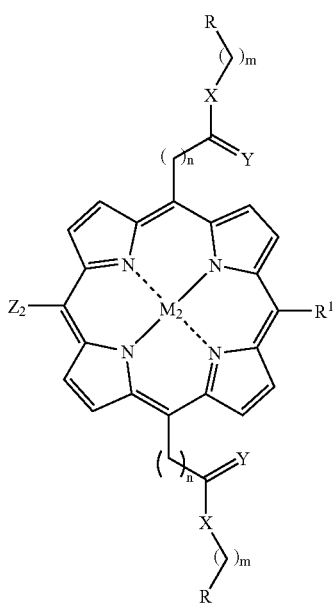

wherein
R represents an alkyl group or

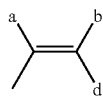

(wherein a, b and d independently represent H, an alkyl group or aryl group);
X represents —O—, —S—, >NR$_{101}$ (wherein R$_{101}$ represents H or an alkyl group), —CH$_2$— or a single bond;
Y represents =O, =S, or 2H;
m represents an integer of 0 to 4;
n represents an integer of 0 to 6;
Z$_2$ represents a five- or six-membered, nitrogen-containing, coordinating hetero aromatic ring group, an alkyl group or aryl group;
M$_2$ represents an ion of metal selected from typical metals and transition metals;
R$^1$ represents H, an alkyl group, alkenyl group, alkynyl group, aryl group,

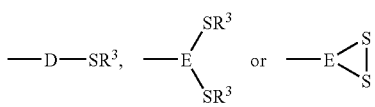

(wherein D represents a divalent group including at least one of an arylene group and alkylene group, E represents a trivalent group including at least one of an arylene group and alkylene group, and R$^3$ represents H or an acetyl group).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

FIG. 11 shows a measurement result of MALDI-TOF mass spectrometry spectrum (matrix: dithranol) of the compound C-6a.

DETAILED DESCRIPTION OF THE INVENTION

Figure 1:
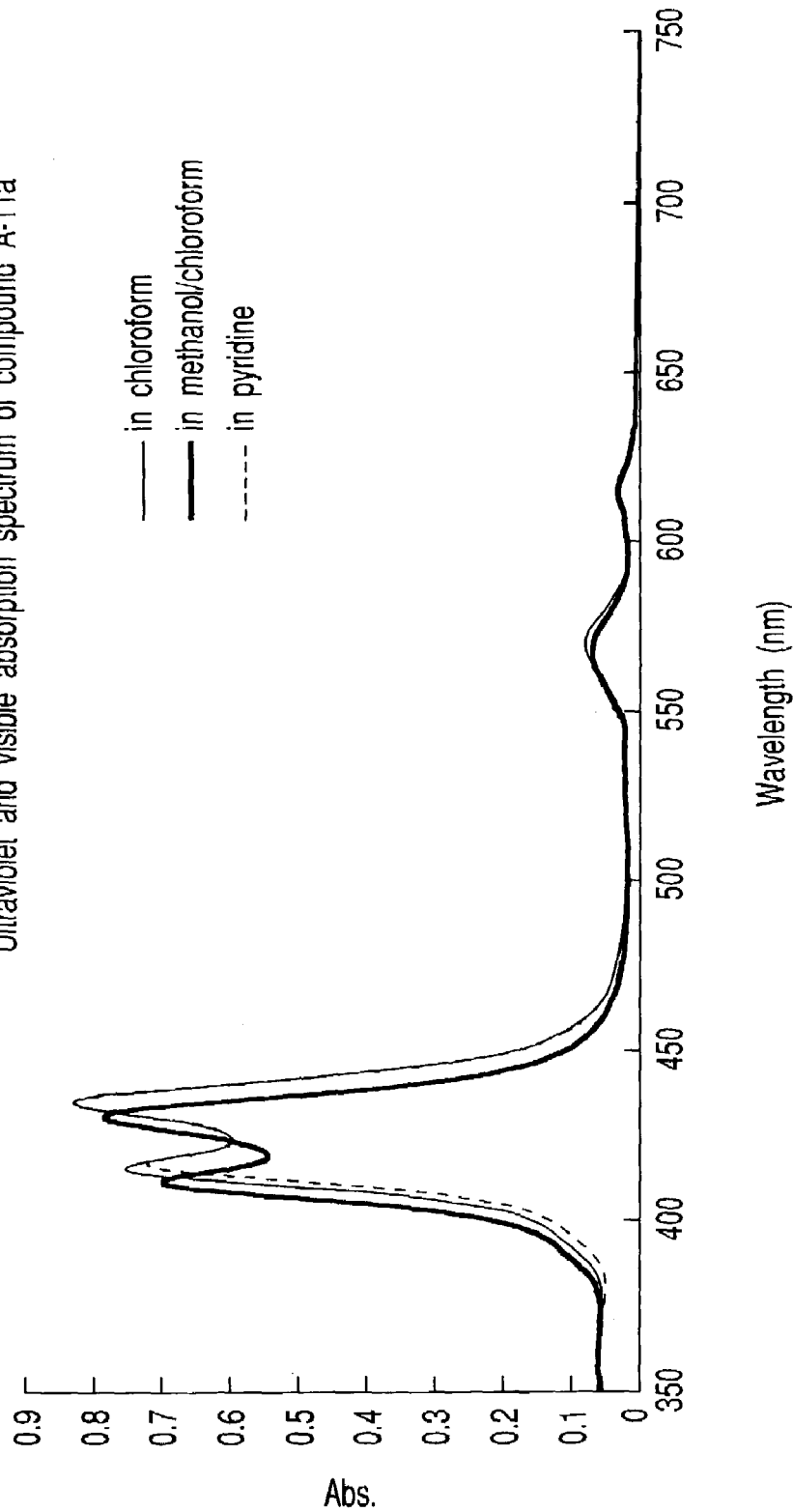
FIG. 1 shows ultraviolet-visible absorption spectra of the compound A-11a. In the graph, the solid line, thick line and dotted line represent the case in which chloroform methanol/chloroform (100:1) and pyridine were used, respectively, as a solvent.

First, a covalently linked linear polymer represented by the formula (1) of the present invention will be described in detail.

In the formula (1), R represents an alkyl group or

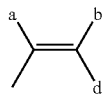

wherein a, b and d independently represent H, an alkyl group or aryl group.

In the present specification, an "alkyl group" means a normal, branched or cyclic monovalent aliphatic group. When any substituent other than the groups a, b and d is an alkyl group, hereinafter, the alkyl group has the same meaning. An "aryl group" represents a monovalent aromatic hydrocarbon group, which may be either monocyclic or a condensed ring constituted of at least two rings. When any substituent other than the groups a, b and d is an aryl group, the aryl group has the same meaning. The alkyl group and the aryl group may have a substituent group, if possible. The same can be applied to the alkyl and aryl groups other than those represented by the groups a, b and d.

The number of carbon atoms of the alkyl group represented by a, b and d is generally 1 to 8, and preferably 1 to 2. However, the number of carbon atoms is not particularly limited to these, and may be selected in consideration of: whether or not the double bond between the carbon atom to which a is bonded and the carbon atom to which b and d are bonded can function for the cyclization metathesis reaction; how easily the raw material for the polymer represented by the formula (1) can be synthesized; the function/capacity which the product is expected to have; and the like.

The number of carbon atoms of the aryl group represented by a, b and d is generally 6 to 20 (e.g., phenyl, naphthyl, anthracenyl, pyrenyl and naphthacenyl), and preferably 6 to 10. However, the number of the carbon atoms is not particularly limited to these, and may be selected in a viewpoint similar to those described above for the alkyl group.

In the formula (1), the alkyl group represented by R has the same meaning as described with respect to the aforementioned a, b and d.

In the formula (1), X represents —O—, —S—, >NR$_{101}$ (wherein R$_{101}$ represents H or an alkyl group), —CH$_2$— or a single bond.

The number of carbon atoms of the alkyl group represented by R$_{101}$ is preferably 1 to 4 or so, although the number is not particularly limited to these.

In the formula (1), X is preferably —O—, in consideration of easiness of synthesis of the raw material compound, the function that the product is expected to have, and the like.

In the formula (1), Y represents =O, =S or 2H. Herein, the expression that "Y represents 2H" indicates that two hydrogen atoms are bonded, by single bond, to the carbon atom to which Y is bonded.

Y is preferably =O, in consideration of easiness of synthesis of the raw material compound, the function that the product is expected to have, and the like.

In the formula (1), m represents an integer of 0 to 4. m is preferably 1, in consideration of easiness of synthesis of the raw material compound, the function that the product is expected to have, and the like.

In the formula (1), n represents an integer of 0 to 6. n is preferably 2, in consideration of easiness of synthesis of the raw material compound, the function that the product is expected to have, and the like.

In the formula (1), Z represents a five- or six-membered, nitrogen-containing, coordinating hetero aromatic ring group. The type of the "five- or six-membered, nitrogen-containing, coordinating hetero aromatic ring group" is not particularly restricted, as long as the hetero cycle including at least one nitrogen atom and has aromaticity. The hetero cycle represented by Z may include oxygen atom, sulfur atom or the like as a hetero atom other than nitrogen. In a case in which the nitrogen-containing, coordinating hetero aromatic ring group has structural isomers thereof, the group also represents these structural isomers.

A five-membered, nitrogen-containing, coordinating hetero aromatic ring group and a six-membered, nitrogen-containing, coordinating hetero aromatic ring group include following imidazolyl, oxazolyl and thiazolyl groups, and pyridyl group, but the hetero aromatic group is not limited to these.

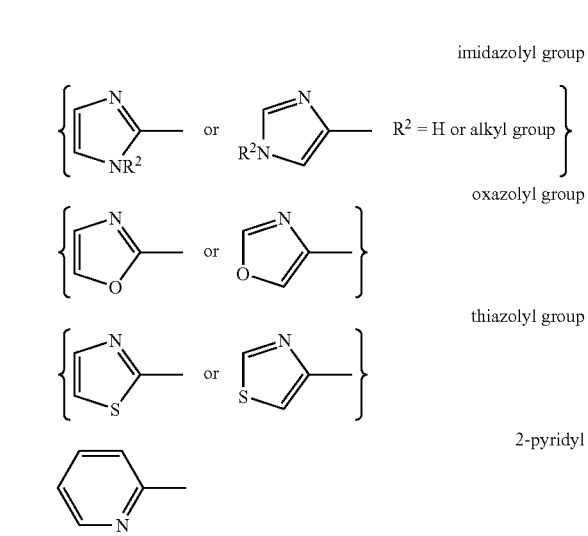

In the above imidazolyl group, the number of carbon atoms of the alkyl group represented by R$^2$ is generally 1 to 10, and preferably 1 or so, in consideration of easiness of synthesis of the raw material compound, the function that the product is expected to have, and the like.

In the formula (1), Z preferably represents imidazolyl groups, in consideration of the strength of bond between Z and the core metal of the porphyrin metal complex.

In the formula (1), M represents an ion of metal selected from typical metals and transition metals. Herein, the "typical metals" represent metals of 1A, 2A, 2B, 3B to 7B, and 0 groups in the long form of the periodic table. More specifically, the typical metals include Mg, Zn, Cd, Hg, Al, Ga, In, Tl, Si, Ge, Sn, Pb, P, As, Sb, Bi and the like. On the other hand, the "transition metals" represent metals of 3A to 7A, 8 and 1B groups in the long form of the periodic table. More specifically, the transition metals represent Sc, Y, lanthanoid (La, Ce, Pr, Nd, Pm, Sm, Eu, Gd, Tb, Dy, Ho, Er, Tm, Yb, Lu), Ti, Zr, Hf, V, Nb, Ta, Cr, Mo, W, Mn, Tc, Re, Fe, Ru, Os, Co, Rh, Ir, Ni, Pd, Pt, Cu, Ag, Au and the like. The valence number of these metals is generally II- or III-valent, although the valence number of these metals is not particularly limited as long as the metal can serve as the core metal of a porphyrin metal complex.

The type of the metal ion M is not particularly restricted, as long as M is capable of forming coordinate bond between itself and the above-mentioned Z. However, M is preferably Zn, Mg, Co, Fe or the like, in consideration of the reactivity, the strength of the bond, the function that the product is expected to have, and the like.

In the formula (1), $Q_1$ represents a single bond or a linear, divalent linking group. The linear, divalent linking group may be selected, in consideration of the function that the resulting product is expected to have (e.g., conductivity of electron/energy, the strength with which the porphyrin rings are bonded to each other, the capacity of maintaining the steric configuration, and the like).

Herein, the linear, divalent linking group includes: (a) a divalent linking group whose connecting bonds at both ends thereof are aligned on the same line; or (b) a divalent linking group whose connecting bonds at both ends thereof are aligned in parallel with each other. Here, the expression that the connecting bonds at both ends of the divalent linking group are "aligned on the same line" does not necessarily mean that the connecting bonds are aligned on the same, geometrically perfect line. Similarly, the expression that the connecting bonds at both ends of the divalent linking group are "aligned in parallel with each other" does not necessarily mean that the connecting bonds are aligned in parallel with each other in the geometrically perfect manner. Accordingly, it suffices, as long as the polymer constituted by way of the liner, divalent linking group is not cyclic, but takes on the substantially linear chain-like form as a whole. In particular, in the case in which the polymer formed by way of the liner, divalent linking group is relatively long, the connecting bonds at both ends of the liner, divalent group need to be neither aligned on the same, geometrically perfect line nor aligned in parallel (with each other) in the geometrically perfect manner. In this case, a chain-like polymer can reliably be formed as long as the connecting bonds at both ends of the liner, divalent group are located substantially on the same line or aligned substantially in parallel with each other. Hereinafter, in the present specification, the state in which the connecting bonds are aligned substantially on the same line and the state in which the connecting bonds are aligned substantially in parallel with each other will simply be referred to as "linear" and "in parallel", respectively.

Examples of the group (a) whose connecting bonds at both ends thereof are aligned on the same line include: a divalent, saturated or unsaturated aliphatic hydrocarbon group {e.g., alkylene group having 1–3 carbon atoms (e.g., —$CH_2$—), —C≡C—}; a divalent, saturated or unsaturated hydrocarbon ring group {e.g., a monocycle or a condensed ring having 3–20 carbon atoms (e.g., 1,3-cyclobutylene (in trans form), 1,4-phenylene, 2,7-pyrenylene)}; a divalent, saturated or unsaturated hetero cyclic group {e.g., a six-membered hetero cycle containing at least one N, S, O, P atom or the like as a hetero atom (such as 2,5-pyridine)}; and a combination of at least two of the aforementioned divalent groups. When at least two of the aforementioned divalent groups are combined, the groups may be either of the same type (the resulting structure is what is called a bis structure) or of different types. Combining the groups of the same type is preferable, in terms of making the synthesis of the raw material compound easy. Further, when at least two of the aforementioned divalent groups are combined, these divalent groups may be bonded by way of a group whose connecting bonds at both ends thereof are aligned on the same line, such as —O— and —C(=O)—. Still further, the divalent groups may be bonded by way of any linking group, as long as the connecting bonds of both ends of the linking group represented by $Q_1$ are eventually aligned on the same line.

Examples of the group (b) whose connecting bonds at both ends thereof are aligned in parallel with each other include: a divalent, saturated or unsaturated normal hydrocarbon group {e.g., normal alkyl groups having 3–5 carbon atoms (such as n-propylene), —C=C— (in trans form)}; a divalent, aromatic hydrocarbon ring group {e.g., condensed rings having approximately 10–20 carbon atoms (e.g., 2,6-naphthylenyl and 1,6-pyrenylene)}; and the like.

Further, the aforementioned group (a) whose connecting bonds at both ends thereof are aligned on the same line may be combined with the aforementioned group (b) whose connecting bonds at both ends thereof are aligned in parallel with each other, as long as the connecting bonds of the thus formed divalent group are eventually aligned on the same line or aligned in parallel with each other.

Specific examples of the divalent linking group whose connecting bonds at both ends thereof are: (a) aligned on the same line or (b) aligned in parallel with each other are described below. It should be noted, however, that the group represented by $Q_1$ is not limited to these.

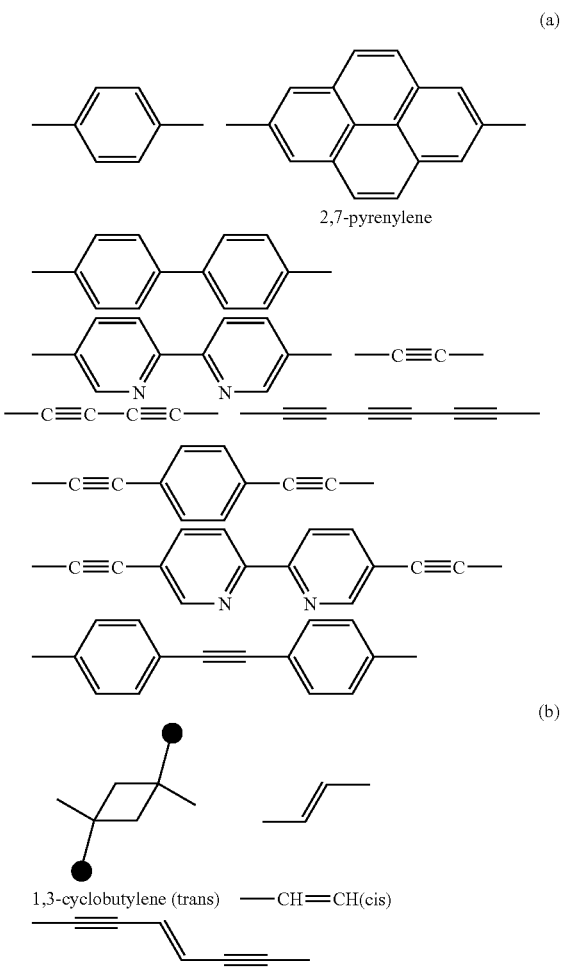

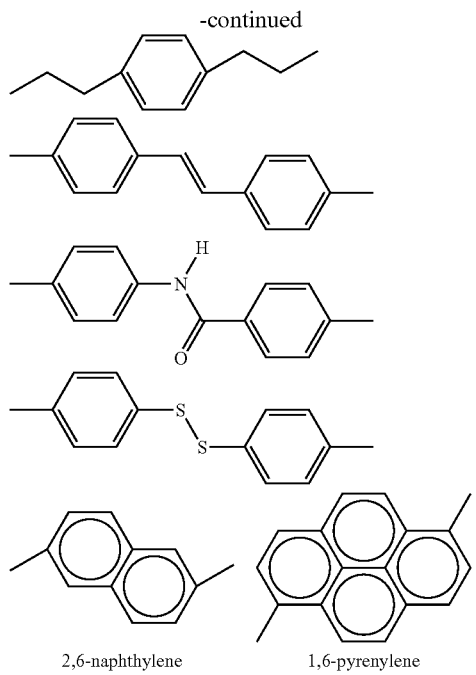

2,6-naphthylene      1,6-pyrenylene

In the formula (1), $Q_1$ is preferably a single bond or alkynylene group represented by the formula: $(-C\equiv C-)_n$, wherein n represents an integer of 1 to 3), in consideration of the strength of the bond, stability, and easiness of the synthesis of the raw material.

In the formula (1), $p_1$ represents an integer of 2 or more. The value of $p_1$ may be selected, in an appropriate manner, according to the application or the like of the covalently linked linear polymer of the present invention. There exists no particular upper limit of the $p_1$ value. Currently, it is possible to produce a covalently linked linear polymer in which the $p_1$ value is approximately up to 100.

In the formula (1), the wavy line drawn from the substituent group X represents the presence of both trans and cis isomers (similarly, a wavy line found in other formulae indicates the presence of both trans and cis isomers). In a case in which there exist at least two sites at which trans/cis steric isomerism can occur in a covalently linked linear polymer, as is the case with the polymer represented by the formula (1), the a covalently linked linear polymer will possibly have various steric isomers thereof, according to the combination of cis/trans structure at the sites at which trans/cis steric isomerism occurs. In the present invention, the covalently linked linear polymer of the formula (1) includes all of the individual isomers as described above and mixtures thereof, which are theoretically possible (hereinafter, the same principal can be applied to any other compounds represented by other formulae, when isomers thereof can exist).

Further, the plural same letters employed in the formula (1) may be the same group or different. However, in consideration of easiness of the synthesis process, it is preferable that these plural same letters represent the same group or atom (the same principal as this may be applied to other formulae, too).

The linear polymer represented by the formula (1-1) of the present invention is a derivative of a covalently linked linear polymer of the formula (1), in which the covalent bond (the alkene portion) in the repetitive unit portion of the formula (1) shown below:

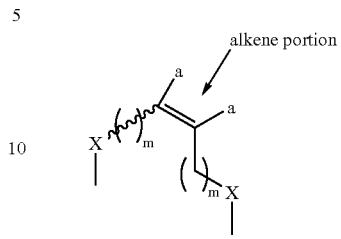

is replaced with an alkane to become:

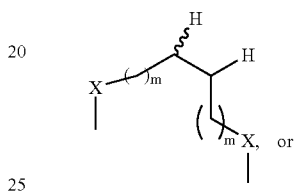

is replaced with hydroxy to become:

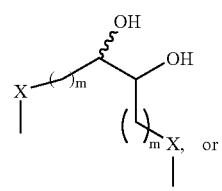

is replaced with epoxy to become:

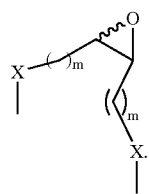

Next, a covalently linked cyclic polymer represented by the formula (2) of the present invention will be described in detail.

The covalently linked cyclic polymer represented by the formula (2) of the present invention is characterized in that the bridging group represented by $Q_2$, which links two porphyrins is a divalent group in a bent form, and not linear as is the linking group represented by $Q_1$ in the formula (1).

In the formula (2), the divalent linking group in a bent form may be selected in consideration of the function that the resulting product is expected to have (e.g., conductivity of electron or energy, the strength with which porphyrin rings are bonded to each other, the capacity of maintaining the steric configuration, and the like), as is the case with selection of $Q_1$ of the formula (1).

The divalent group in a bent form, represented by $Q_2$, represents a divalent group whose connecting bonds at both ends thereof are neither aligned on the same line nor aligned in parallel with each other, but disposed with an angle formed therebetween. When the angle formed between the one connecting bond at one end of the divalent group and the other connecting bond at the other end of the same divalent group is in a range of 60° to 145° or so, a cyclic structure of the polymer can be made easily. Examples of such a group include: an unsaturated normal hydrocarbon {e.g., those having two carbon atoms such as —C═C— (cis) and the like}; a saturated or unsaturated carbon ring {e.g., monocycle or condensed rings having 3–20 carbon atoms (such as cyclopropenylene, 1,3-phenylene, 3,6-naphthylene and the like)}; and a saturated or unsaturated heterocycle (e.g., five- or six-membered heterocycle containing at least one atom selected from N, S, O, P and the like as a hetero atom (such as 1,3-phenyl, 3,5-pyridilene and the like)). Aromatic hydrocarbon such as benzene ring may be fused to the saturated or unsaturated heterocycle. Further, a connecting bond may extend from such fused rings.

Specific examples of the divalent linking group in a bent form are set forth below. It should be noted, however, that the group represented by $Q_2$ is not limited to these.

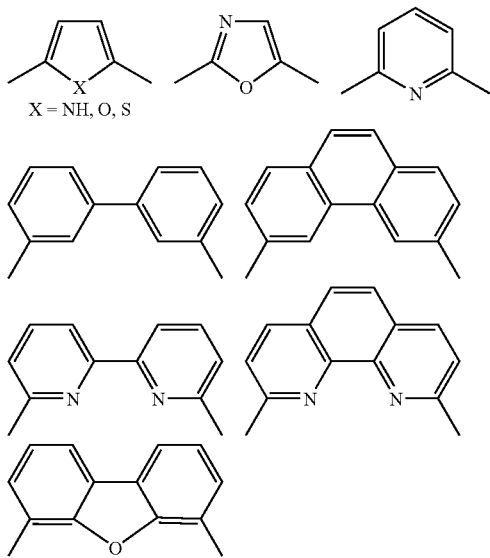

In the covalently linked cyclic polymer of the formula (2), a, X, Y, m, n, Z and M have the same meaning as defined in the formula (1).

In the formula (2), $p_2$ represents an integer of 3 or more. The value of $p_2$ may be selected, in an appropriate manner, according to the application and the like of the covalently linked cyclic polymer of the present invention. There exists no particular upper limit of the $p_2$ value. Theoretically, it is assumed that a covalent bond cyclic polymer whose $p_2$ value is approximately 20 can be produced. Currently, it is possible to produce a covalent bond cyclic polymer in which the $p_2$ value is approximately 6.

The polymer represented by the formula (2-1) of the present invention is a derivative of the covalently linked cyclic polymer represented by the formula (2), and is the same as the polymer represented by the formula (2), except that the covalent bond of the repeating unit portion (the alkene portion) of the formula (2) is replaced with alkane, hydroxy or epoxy (the alkane, hydroxy and epoxy are defined in the same manner as in the formula (1-1)).

Next, the coordination-organized linear polymer represented by the formula (3) and the coordination-organized cyclic polymer represented by the formula (4) will be described below.

The coordination-organized linear polymer represented by the formula (3) is the same, with regards to each substituent thereof, as the covalently linked linear polymer represented by the formula (1). However, the former is different from the latter in that the repeating unit portion of the formula (1) does not have a covalent bond resulted from the cyclization metathesis reaction. The cyclization metathesis reaction will be described in detail later.

The coordination-organized cyclic polymer represented by the formula (4) is the same, with regards to each substituent thereof, as the covalently linked cyclic polymer represented by the formula (2). However, the former is different from the latter in that the repeating unit portion of the formula (2) does not have a covalent bond resulted from the cyclization metathesis reaction.

Next, the bis-porphyrin monomer having a bridging portion, represented by the formula (5), will be described.

The bis-porphyrin monomer represented by the formula (5) can be used as a synthesis intermediate of the coordination-organized linear polymer represented by the formula (3) and the coordination-organized cyclic polymer represented by the formula (4).

In the formula (5), the substituents a, b, d, X, Y, m and n have the same meaning as defined in the formula (1).

$Z_2$ represents H, a five- or six-membered, nitrogen-containing coordinating hetero aromatic ring group, alkyl group or aryl group. The five- or six-membered, nitrogen-containing coordinating hetero aromatic ring group represented by $Z_2$ has the same meaning as Z in the formula (1). The number of carbon atoms of the alkyl group represented by $Z_2$ is preferably 1 to 4. The number of carbon atoms of the aryl group represented by $Z_2$ is preferably 6 to 10.

Q represents a single bond or a divalent linking group. The generally acceptable number of carbon atoms of Q, the preferable number of carbon atoms of Q are basically the same as those described with regards to $Q_1$ of the formula (1) and $Q_2$ of the formula (2).

Next, the covalently linked diner represented by the formula (6) and the coordination-organized dimer represented by the formula (7) will be described below.

The covalently linked dimer represented by the formula (6) and the coordination-organized dimer represented by the formula (7) are characterized in that each of the dimers has a sulfur atom-containing group at the terminal end thereof, and thus provides a site connectable to an electrode such as gold. Japanese Patent Application KOKAI Publication No. 2001-253883, for example, discloses a porphyrin having a sulfur atom-containing group at the terminal end thereof.

In the formula (6), a, X, Y, m, n, Z and M have the same meaning as defined in the formula (1).

$R^1$ represents H, an alkyl group, alkenyl group, alkynyl group, aryl group,

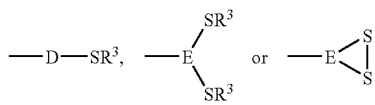

wherein D represents a divalent group including at least one of an arylene group and alkylene group, E represents a trivalent group including at least one of an arylene group and alkylene group, and $R^3$ represents H or an acetyl group.

The divalent group including at least one of an arylene group and alkylene group represented by D is a divalent group having arylene group and/or alkylene group at both terminal ends thereof, the divalent group being generally constituted of these terminal end groups and at least one group including an ether group, carbonyl group and functional group containing a hetero atom (e.g., an ester group or an amido group) disposed between the terminal end groups. However, a divalent group having no intervening group between the terminal end groups thereof is also acceptable. The intervening group between the both terminal end groups is a group which can be conveniently used when the porphyrin ring and the sulfur atom-containing group is bonded during the synthesis of the compound of the formula (6). The number of carbon atoms of the arylene group/alkylene group is not particularly limited. The number of carbon atoms of the alkylene group is normally set in a range of 1 to 18. The number of carbon atoms of the arylene group is normally set in a range of 6 to 13.

The trivalent group including at least one of an arylene group and alkylene group represented by E is a trivalent group obtained by removing one hydrogen atom from the group represented by D mentioned above.

The number of carbon atoms of the alkyl group, alkenyl group, alkynyl group and aryl group represented by $R^1$ is preferably 1 to 18, 2 to 18, 2 to 18, and 6 to 16, respectively.

In the coordination-organized dimer represented by the formula (7), X, Y, M, Z, $R^1$, m, n and a have the same meaning as defined in the formula (6). Further, b and d of the formula (7) have the same meaning as defined in the formula (1).

The dimer represented by the formula (6-1) of the present invention is a derivative of the covalently linked dimer of the formula (6), and is the same as the dimer of the formula (6), except that covalent bond (the alkene portion) extending from the porphyrin ring of the formula (6) is replaced with alkane, hydroxy or epoxy (the alkane, hydroxy and epoxy are defined in the same manner as in the formula (1-1)).

Next, the monomer represented by the formula (8) that is substituted by a coordinating hetero aromatic ring will be described.

The monomer represented by the formula (8) can be used as a synthesis intermediate of the coordination-oriented dimer represented by the formula (7).

In the formula (8), $R^1$, X, Y, m and n have the same meaning as defined in the formula (7). Specific examples of the alkyl group, alkenyl group, alkynyl group and aryl group represented by $R^1$ include a monovalent group derived from a divalent linking group represented by the aforementioned $Q_1$ and $Q_2$. Herein, "a monovalent group derived from a divalent linking group" means a monovalent group obtained by replacing one of the connecting bonds of the divalent linking group with a hydrogen atom or a substituent group (e.g., trimethylsilyl).

$Z_2$ represents H, a five- or six-membered, nitrogen-containing, coordinating hetero aromatic ring, alkyl group or aryl group. The five- or six-membered, nitrogen-containing, coordinating hetero aromatic ring, alkyl group and aryl group represented by $Z_2$ have the same meaning as defined in the formula (5).

$M_2$ represents 2H or an ion of metal selected from typical metals and transition metals. The typical metals and the transition metals represented by $M_2$ have the same meaning as defined in M of the formula (1).

Next, the method of producing each of the compounds represented by the formulae (1) to (8) of the present invention will be described in detail, with reference to several compounds as typical examples. It should be noted, however, that the present invention is not limited to these examples. Other compounds than exemplified below can be produced by one skilled in the art by appropriately selecting the reaction conditions including the reaction temperature, pressure, time, atmosphere, solvent, catalyst and the like.

Each of the compounds of the formulae (5), (3) and (1) can sequentially be produced by employing the porphyrin metal complex monomer of the formula (8) as the synthesis intermediate. Following Scheme 1 shows a synthesis example in which: R=methyl, $Z_2$=1-methyl-2-imidazolyl, $R^1$=1-trimethylsilylethynyl, $M_2$=2H, X=Y=O, m=0, and n=2 in the formula (8); and in addition, M=Zn, $Q_1$= (ethynyl)$_2$, and a=b=d=H in the formulae (3) and (1). However, the present invention is not restricted to this synthesis example. A synthesis example of compound A-6b used as the starting material in Scheme 1 is shown in Scheme 3 described below. According to this method, compounds of the formula (1) are produced as a mixtures of polymers having different degrees of polymerization, represented by $p_1$-1. Similarly, compounds of the formula (3) are produced as a mixtures of polymers having different degrees of polymerization, represented by $p_1$-1. The mixtures may be separated into components each having a certain degree of polymerization by subjecting the polymers to a size exclusion column chromatography or the like. The degree of polymerization expressed by $p_1$-1 can be adjusted by the amount of compound B-5, which is an intermediate product, the amount of the Grubbs catalyst, the reaction time and the like.

The "Grubbs catalyst" herein is a generic term for the ruthenium carbene complex developed by Grubbs et al., which is reactive in the olefin metathesis reaction. When this complex is used, even if an olefin compound having various functional groups such as ester, ketone and amido is employed as a reaction substance, the reaction selectively proceeds only with respect to the olefin sites (refer to the general theory of Grubbs et al. (T. M. Trnka, R. H. Grubbs, Acc. Chem. Res. 34, 18 (2001), the entire contents of which is incorporated herein by reference).

Further, the reaction starting from compound B-6 to compound B-7 in Scheme 1 is a reaction known as the cyclization metathesis reaction, which is described in detail in the aforementioned reference by Grubbs et al. The cyclization metathesis reaction is, in short, a reaction in which a compound having two alkenyl groups causes an olefin metathesis reaction to forms a cyclic compound.

The group represented by R of the both terminal porphyrins of compound B-6 and compound B-7 has the same meaning as defined for the substituent, R, in the formula (1). Typical examples of R include —CH=CH$_2$.

Scheme 1
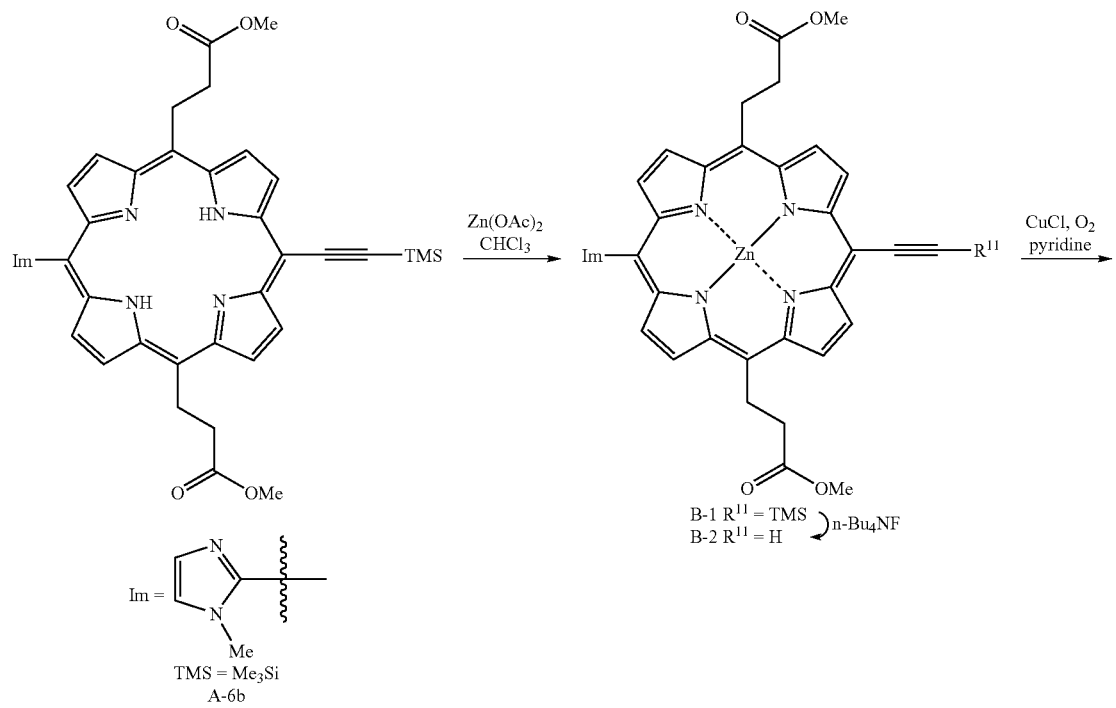
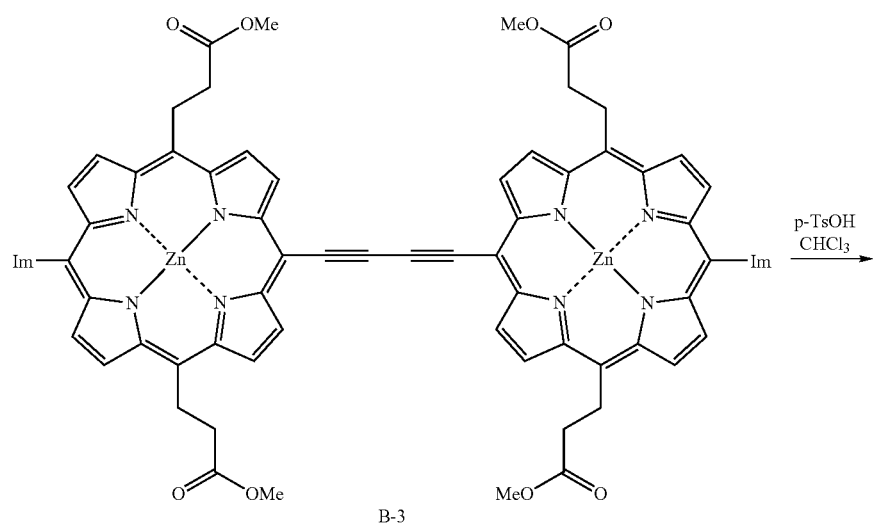

-continued
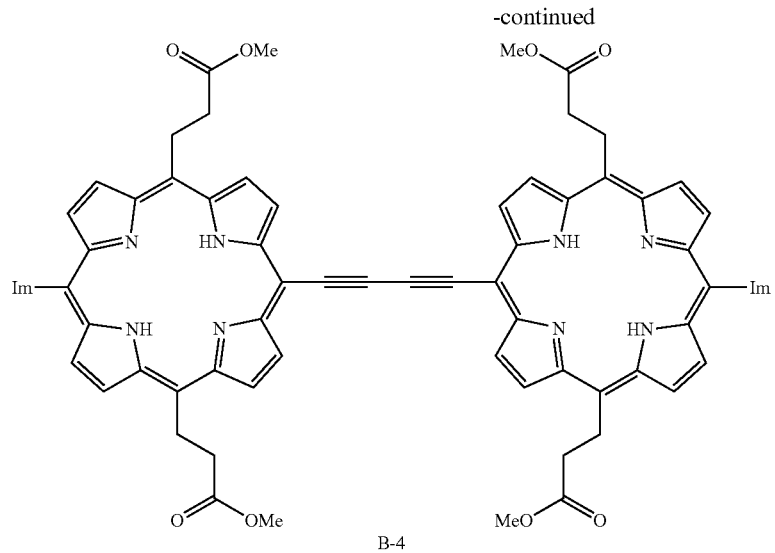
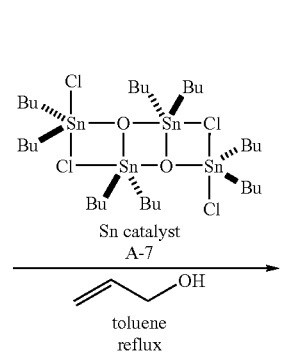
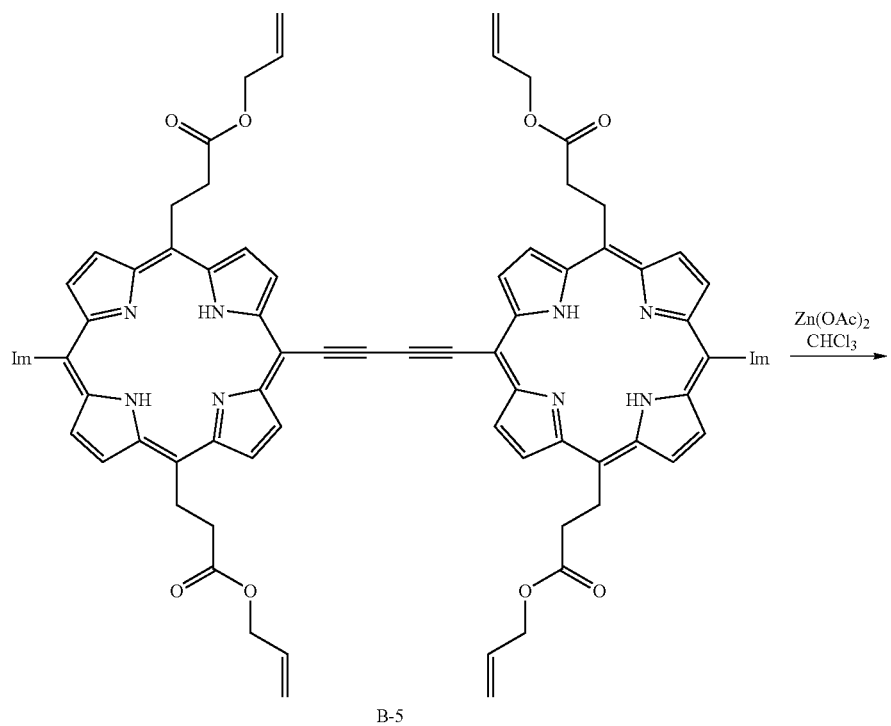

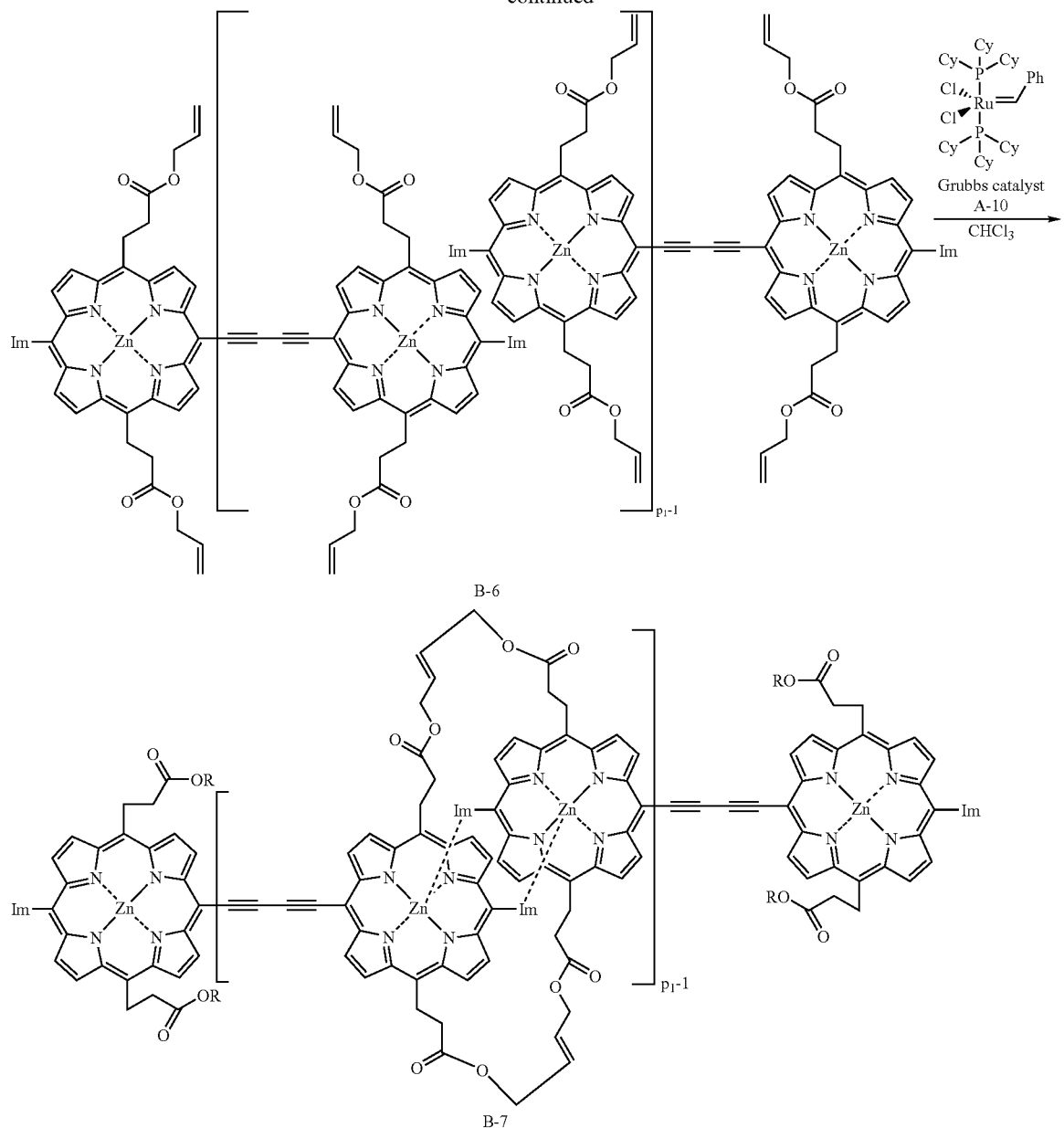

In the linear porphyrin polymer derivative represented by the formula (1-1) of the present invention, the linear porphyrin having the alkane portion is obtained by hydrogenating the alkene portion of the covalently linked linear polymer of the formula (1), in the presence of a metal catalyst (e.g., heterogeneous catalysts such as platinum, palladium, rhodium, iridium, Raney nickel or homogeneous catalysts such as chlorotris(triphenylphosphine)rhodium (Wilkinson catalyst)). As one of the representative references of hydrogenation, "Jikken Kagaku Koza" (Lecture of Experimental Chemistry), Maruzen, the 4$^{th}$ edition, vol. 26, pp. 251–266, can be mentioned.

The hydroxy portion is obtained by oxidizing the alkene portion of the covalently linked linear polymer of the formula (1), by using an oxidizing agent such as N-methylmorpholine N-oxide or hydrogen peroxide (aq), in the presence of a catalyst such as osmium tetroxide (OsO$_4$). As one of the representative references of hydroxylation, "Jikken Kagaku Koza", Maruzen, the 4$^{th}$ edition, vol. 23, pp. 79–113, can be mentioned.

The epoxy portion is obtained by oxidizing the alkene portion of the covalently linked linear polymer of the formula (1) by using an oxidizing agent such as m-chloroperbenzoic acid. Alternatively, the epoxy portion is obtained by oxidizing the alkene portion of the covalently linked linear polymer of the formula (1) by using an oxidizing agent such as t-butylhydroperoxide, in the presence of ester of boric acid or metal catalysts such as vanadium and molybdenum. As one of the representative references of epoxydation, "Jikken Kagaku Koza", Maruzen, the 4$^{th}$ edition, vol. 23, pp. 237–267, can be mentioned.

The compound of the formula (4) and the compound of the formula (2) can also be sequentially produced by employing the porphyrin metal complex monomer of the formula (8) as the synthesis intermediate. Following Scheme 2 shows a synthesis example in which: R=methyl, $Z_2$=1-methyl-2-imidazolyl, $R^1$=3-formylphenyl, $M_2$=2H, X=Y=O, m=0, n=2 in the formula (8); and in addition, M=Zn, $Q_2$=1,3-phenyl, a=b=d=H in the formula (4). However, the present invention is not restricted to this synthesis example. According to this method, compounds of the formula (2) are produced as a mixture of polymers having different degrees of polymerization, represented by $p_2$. Similarly, compounds of the formula (4) are produced as a mixture of polymers having different degrees of polymerization represented by $p_2$. The mixtures may be separated into components each having a certain degree of polymerization by subjecting the polymers to a size exclusion column chromatography or the like. The degree of polymerization expressed by $p_2$ can be adjusted by the angle formed by one substituent group and another substituent group bonded with the divalent group in a bent form. For example, in the case shown in Scheme 2, the angle formed by the substituents is 120°, whereby the cyclic structure can be pentagonal or hexagonal. The value of $p_2$ is 5 or 6 in this case.

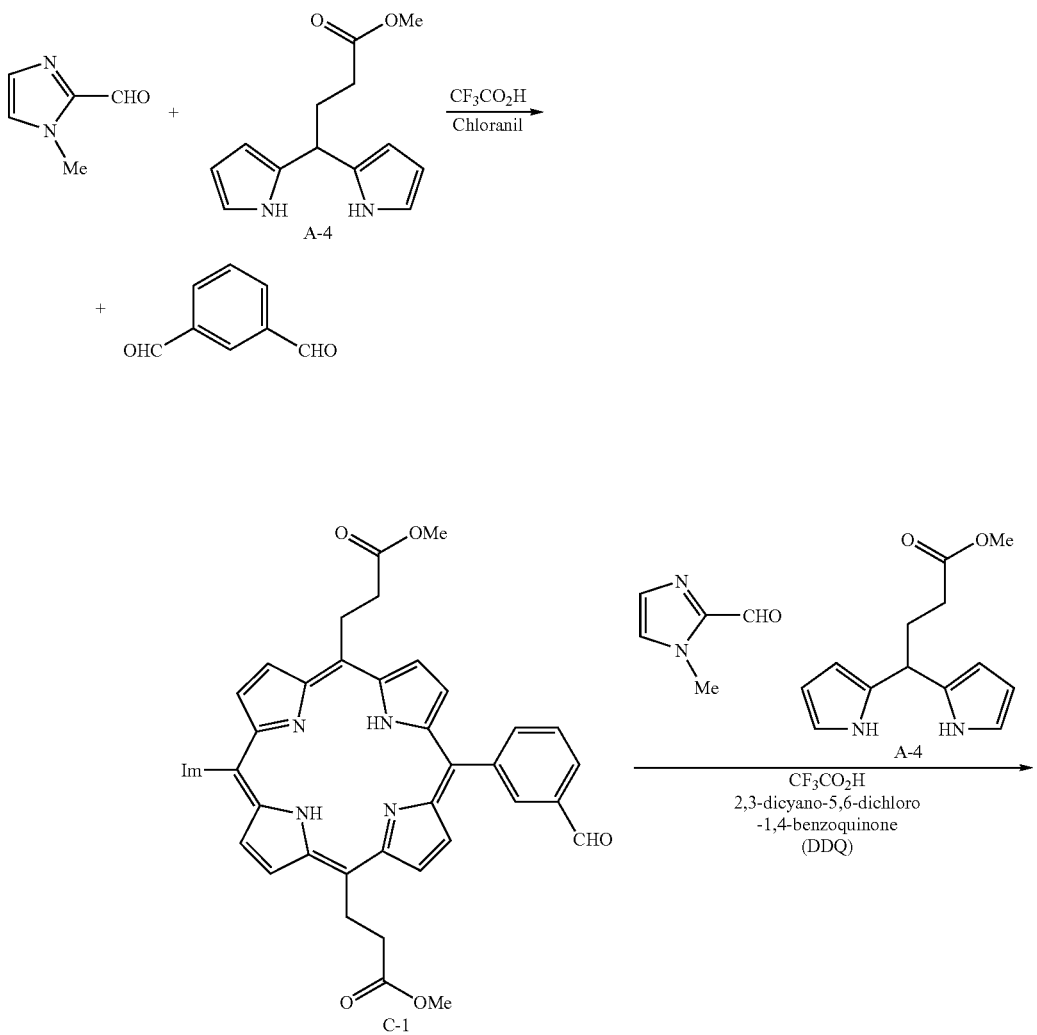

Scheme 2

-continued
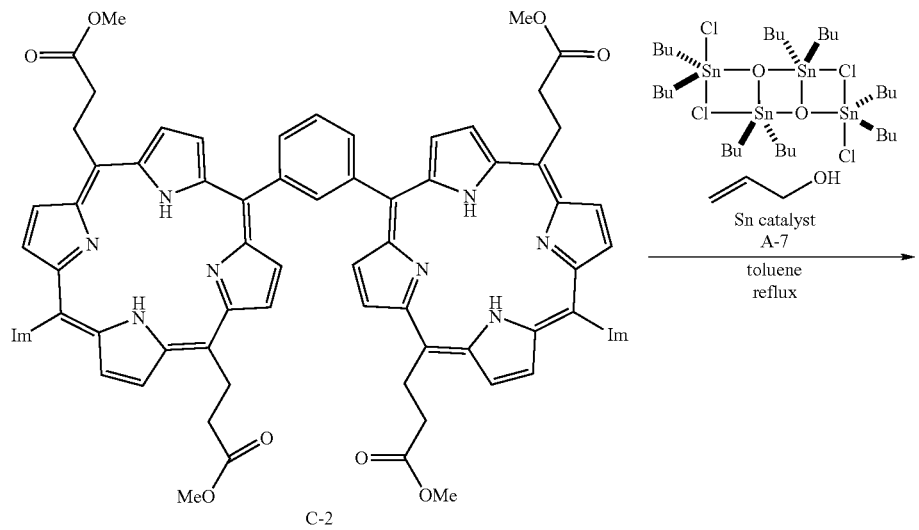
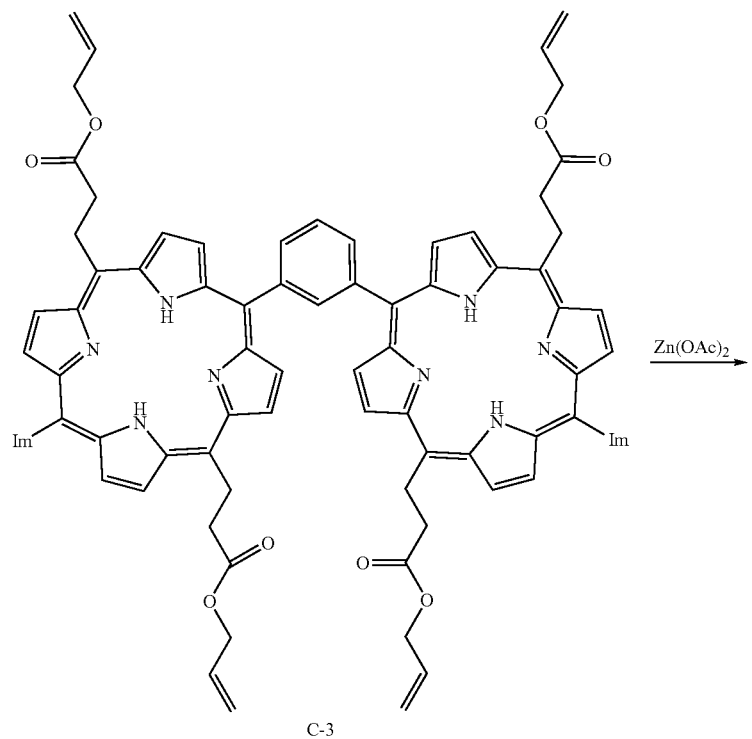

-continued
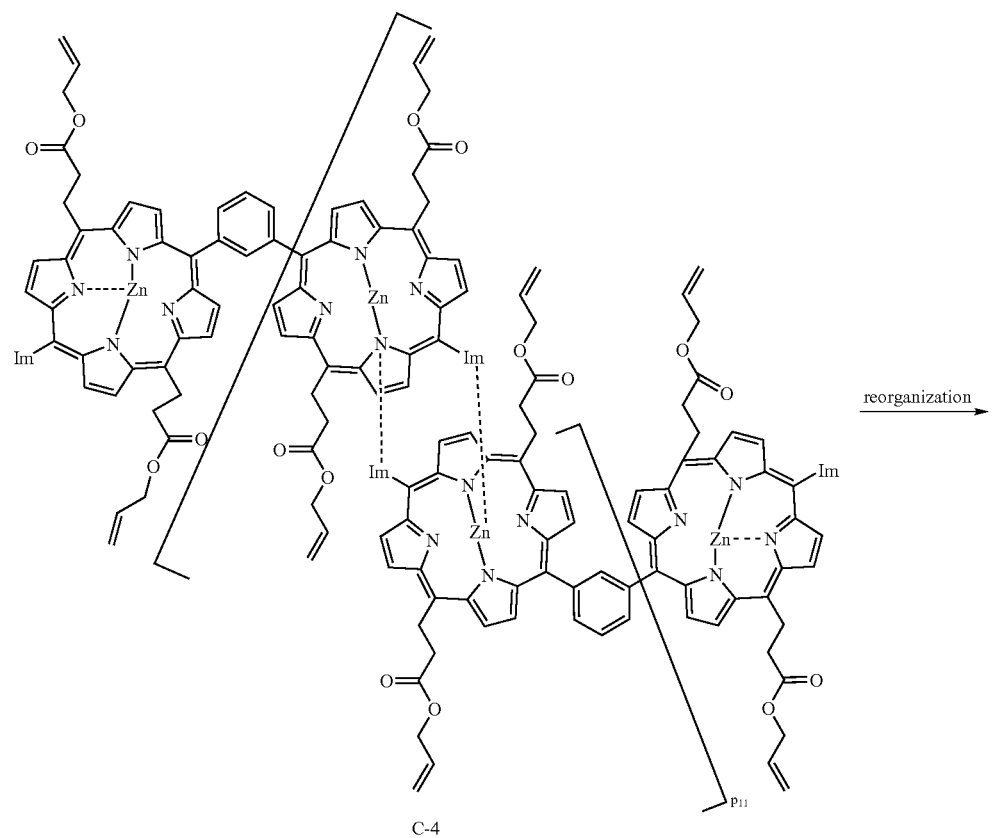
C-4

-continued
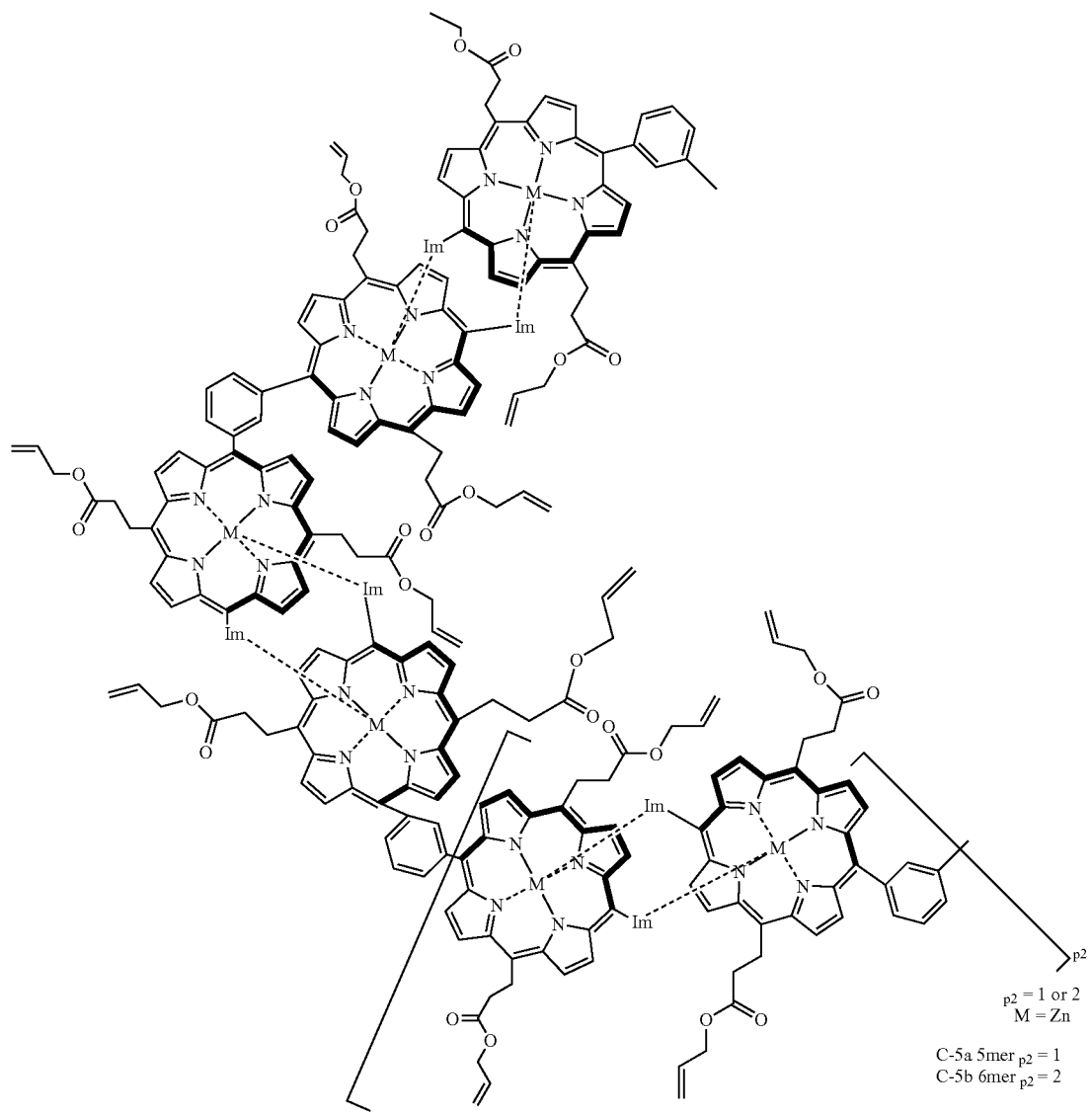
p2 = 1 or 2
M = Zn
C-5a 5mer p2 = 1
C-5b 6mer p2 = 2

-continued
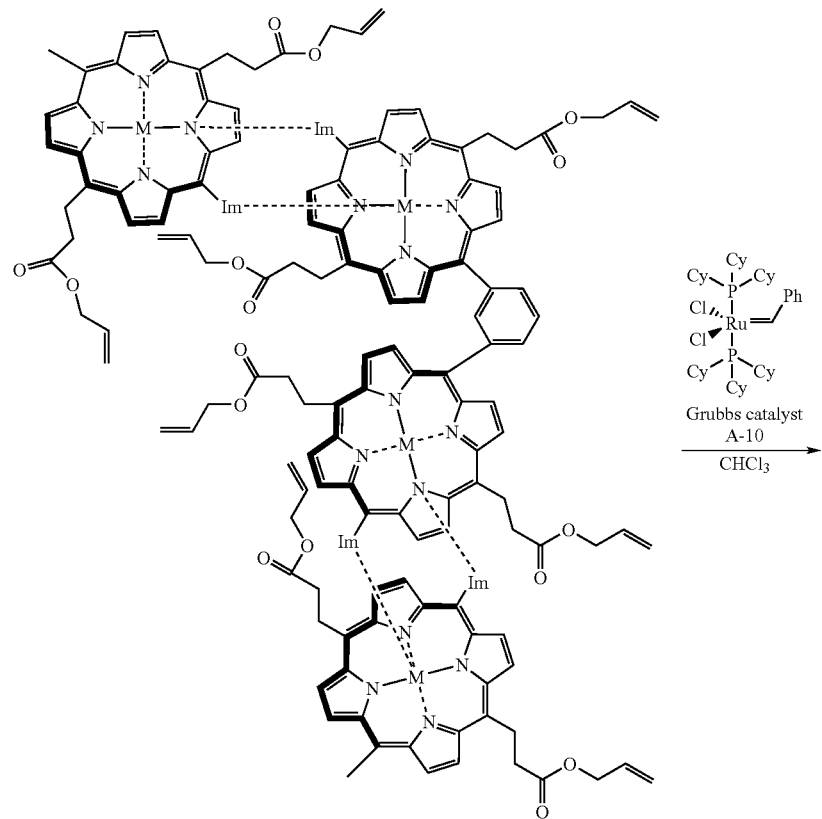

-continued

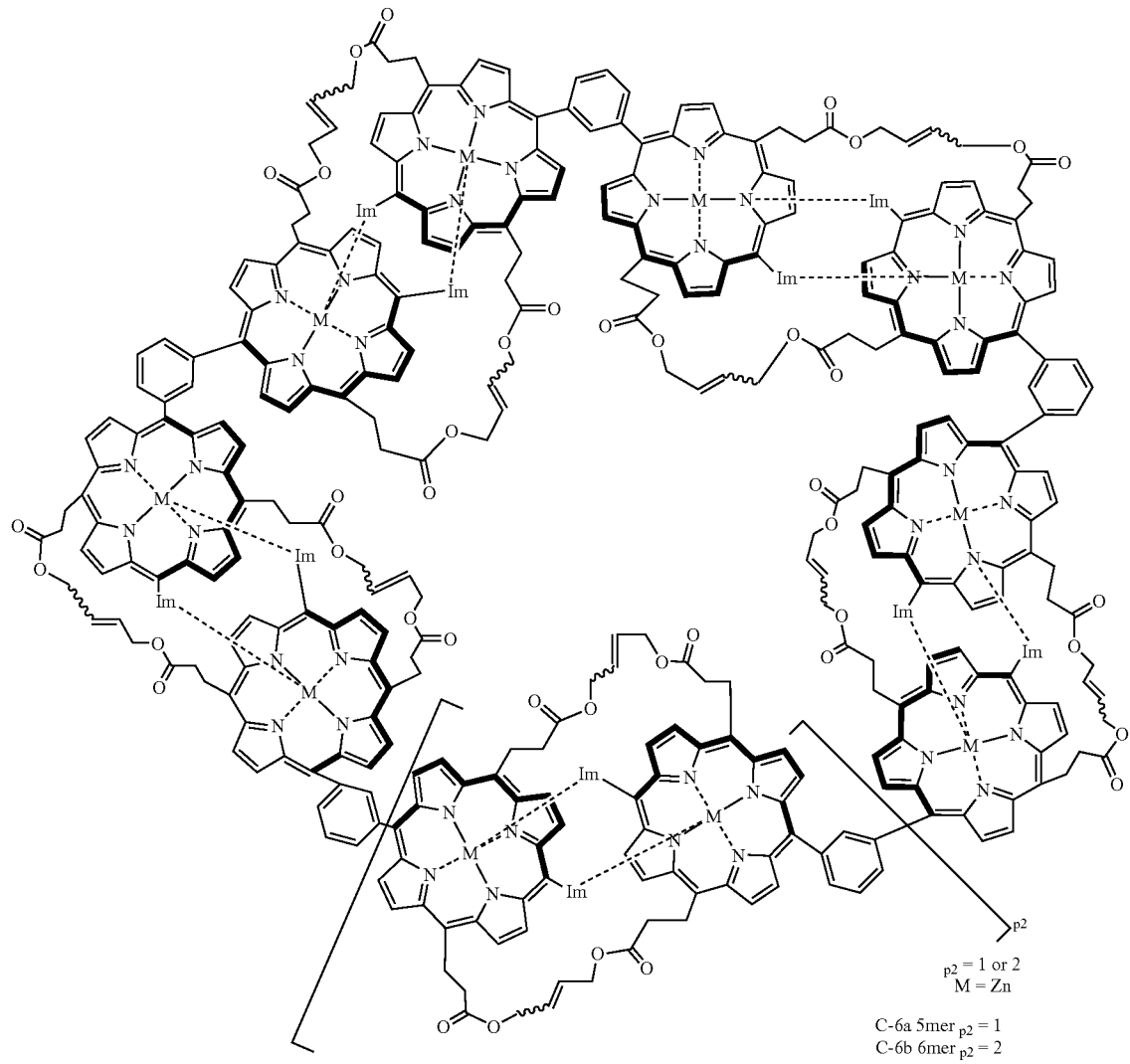

p2 = 1 or 2
M = Zn

C-6a 5mer p2 = 1
C-6b 6mer p2 = 2

In the cyclic porphyrin polymer derivative represented by the formula (2-1) of the present invention, the cyclic porphyrin having the alkane portion is obtained by hydrogenating the alkene portion of the covalently linked cyclic polymer of the formula (2). The condition of hydrogenation can be set in a manner similar to that in the above-mentioned preparation of the alkane portion of the formula (1-1).

The hydroxy portion is obtained by oxidizing the alkene portion of the covalently linked cyclic polymer of the formula (2). The condition of oxidization can be set in a manner similar to that in the above-mentioned preparation of the hydroxy portion of the formula (1-1).

The epoxy portion is obtained by oxidizing the alkene portion of the covalently linked cyclic polymer of the formula (2). The condition of oxidization can be set in a manner similar to that in the above-mentioned preparation of the epoxy portion of the formula (1-1).

The compound of the formula (7) and the compound of the formula (6) can also be sequentially produced by employing the porphyrin metal complex monomer of the formula (8) as the synthesis intermediate. Following Scheme 3 shows a synthesis example in which: R=methyl, $Z_2$=1-methyl-2-imidazolyl, $R^1$=$C_7H_{15}$, 1-trimethylsilylethynyl, 1-methyl-2-imidazolyl or phenyl, $M_2$=2H, X=Y=O, m=0, n=2 in the formula (8); and in addition, M=Zn, a=b=d=H in the formula (7). However, the present invention is not restricted to this synthesis example.

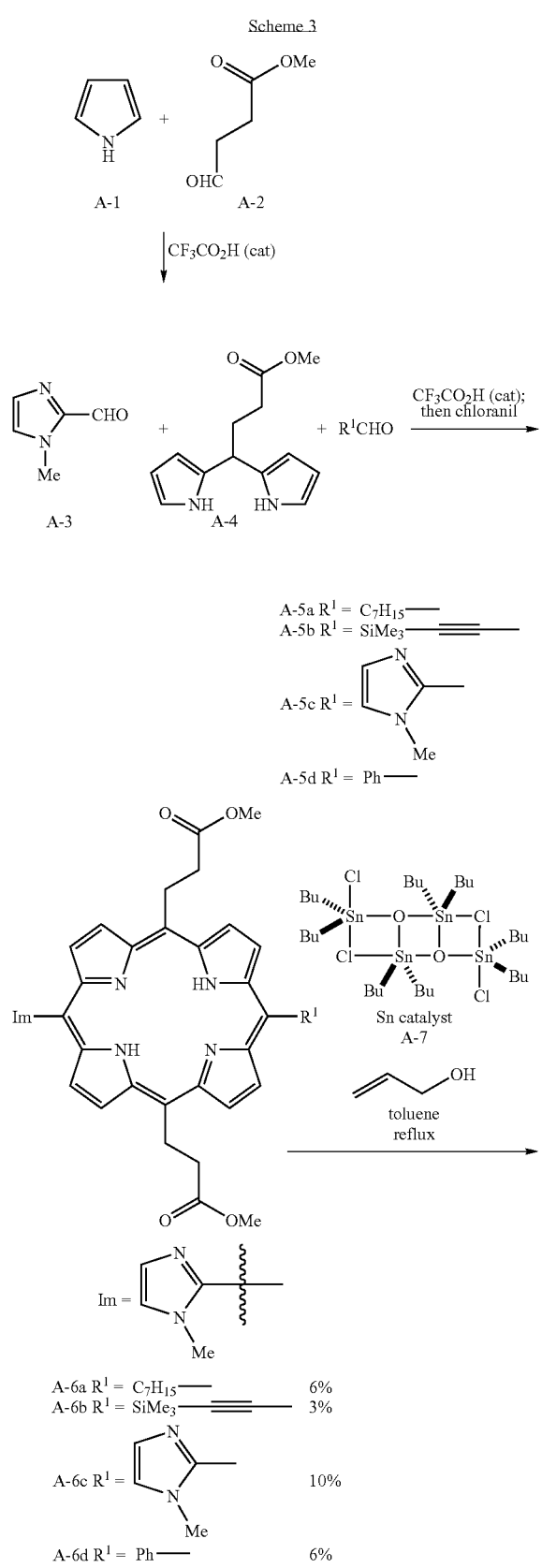

-continued

A-9a R¹ = C₇H₁₅—  quant
A-9b R¹ = SiMe₃—≡—  quant

A-9c R¹ = [imidazole-Me]  quant

A-9d R¹ = Ph—  quant

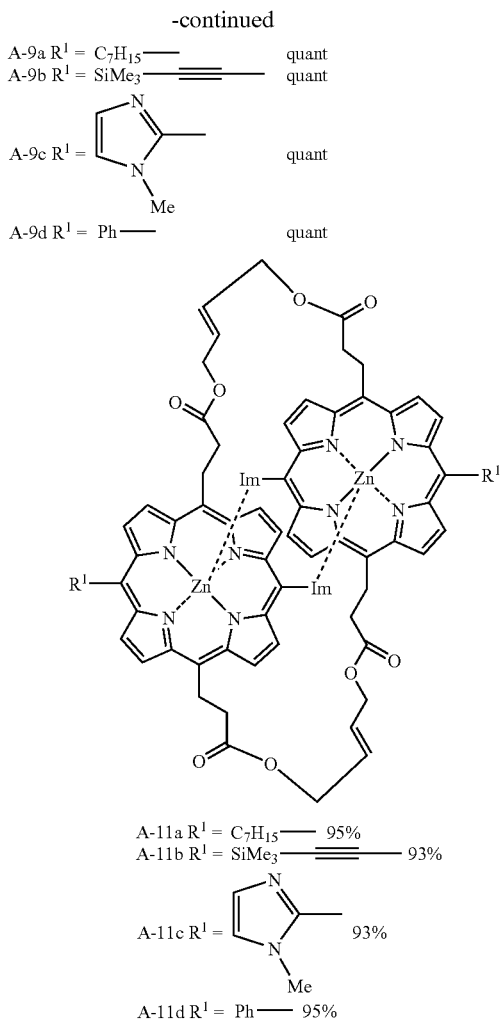

A-11a R¹ = C₇H₁₅—  95%
A-11b R¹ = SiMe₃—≡—  93%

A-11c R¹ = [imidazole-Me]  93%

A-11d R¹ = Ph—  95%

In the porphyrin dimer derivative represented by the formula (6-1) of the present invention, the alkane portion is obtained by hydrogenating the alkene portion of the covalently linked dimer of the formula (6). The condition of the hydrogenation can be set in a manner similar to that in the above-mentioned preparation of the alkane portion of the formula (1-1).

The hydroxy portion is obtained by oxidizing the alkene portion of the covalently linked dimer of the formula (6). The condition of oxidization can be set in a manner similar to that in the above-mentioned preparation of the hydroxy portion of the formula (1-1).

The epoxy portion is obtained by oxidizing the alkene portion of the covalently linked dimer of the formula (6). The condition of oxidization can be set in a manner similar to that in the above-mentioned preparation of the epoxy portion of the formula (1-1).

EXAMPLES

Hereinafter, the present invention will be described in more detail by the following examples. It should be noted, however, that the present invention is not limited to these.

Example 1

Corresponding to the Above-Mentioned Scheme 3

Meso-(methoxycarbonylethyl) dipyrromethane (A-4)

Meso-(methoxycarbonylethyl) dipyrromethane (A-4) was synthesized by stirring methoxycarbonyl propanal (11.6 g, 0.1 mol) and pyrrole (280 mL, 4 mol) in the presence of trifluoroacetic acid (1.4 mL, 10 mmol), in a method similar to that described in the reference (Y. Tomohiro, A. Satake, Y. Kobuke, J. Org. Chem. 2001, 66, 8442–8446). The resulting product was purified with silica gel chromatography using hexane/EtOAc (5:1), whereby 17 g (73%) of meso-(methoxycarbonylethyl) dipyrromethane (A-4) was obtained. $^1$H NMR (600 MHz, CDCl$_3$) δ 2.22–2.26 (m, 2H), 2.29–2.33 (m, 2H), 3.63 (s, 3H), 3.99 (t, J=7.2 Hz, 1H), 6.05–6.07 (m, 2H, pyH4), 6.12–6.14 (m, 2H, pyH5), 6.58–6.62 (m, 2H, pyH2), 7.78 (br, 2H, NH); $^{13}$C NMR (150 MHz, CDCl$_3$) δ 29.5, 31.9, 36.9, 51.6, 105.8, 108.1, 117.3, 132.4, 174.0.

Sn Catalyst A-7

Sn catalyst A-7 was synthesized according to the method of Otera et al. and used for the present example (Junzo Otera, Nobuhisa Dan-oh, Hitosi Nozaki, J. Org. Chem. 1991, 56, 5307–5311).

Grubbs Catalyst A-10

Fluka 09587 (manufactured by Fluka Co., Ltd.) (Benzylidene-bis(tricyclohexylphosphine)-dichlororuthenium) was purchased from WAKENYAKU Co., Ltd, and used for the present example.

5,15-Bis(methoxycarbonylethyl)-10-(n-heptyl)-20-(1'-methyl-2'-imidazolyl) Porphyrin (A-6a)

To a solution of meso-(methoxycarbonylethyl)dipyrromethane A-4 (1 g, 4.3 mmol), 1-methyl-2-formyl-imidazole A-3 (240 mg, 2.2 mmol), and 1-octanal A-5a (280 mg, 2.2 mmol) in CHCl$_3$ (1 L), was added trifluoroacetic acid (1.2 mL, 8.6 mmol) under N$_2$ atmosphere. After the mixture was stirred for 4 h at room temperature, 2,3,5,6-tetrachloro-1,4-benzoquione (chloranil, 1.6 g, 6.5 mmol) was added to the mixture to perform oxidative aromatization. After the mixture was stirred for 3 h, was added saturated NaHCO$_3$ aq., and extracted with CHCl$_3$. The organic layer was washed with brine, dried over anhydrous Na$_2$SO$_4$, and evaporated under reduced pressure. The residue was loaded on a silica gel column, eluting with CHCl$_3$/acetone (10:1) to give A-6a (82 mg, 6%). $^1$H NMR (600 MHz, CDCl$_3$) δ −2.71 (s, 2H; inner proton), 0.91 (t, J=7 Hz, 3H; C7), 1.34–1.36 (m, 4H; C6, C5), 1.52–1.54 (m, 2H, C4), 1.78–1.80 (m, 2H, C3), 2.45–2.55 (m, 2H; C2), 3.38 (s, 3H; NCH$_3$), 3.45–3.52 (m, 4H; ester β), 3.75 (s, 6H; COOMe), 4.98–5.00 (m, 2H; C1), 5.23–5.30 (m, 4H; ester α), 7.45 (br.s, 1H; imidazole ring), 7.67 (br.s, 1H; imidazole ring), 8.74 (d, J=4.2 Hz, 2H, Porβ), 9.44 (d, J=4.2 Hz, 2H, Porβ), 9.51 (d, J=4.2 Hz, 2H, Porβ), 9.56 (d, J=4.2 Hz, 2H, Porβ); $^{13}$C NMR (150 MHz, CDCl$_3$) δ 14.2 (C7), 22.8 (C6), 29.6 (C4), 30.5 (ester α), 30.7 (C3), 32.0 (C5), 34.6 (NCH$_3$), 36.1 (C2), 39.1 (C1), 41.8 (ester β), 52.0 (COOMe), 104.0 (meso), 116.9 (meso), 121.5 (meso), 122.1 (imidazole), 126–132 (br, 4 carbons (Porβ)), 128.5 (imidazole), 148.7 (Im N—C=N), 173.2 (C=O). Other 4 carbons (Porα) could not be observed by boarding.; UV-Vis (CHCl$_3$): 652 (Abs.; 0.0188), 594 (0.0260), 551 (0.0366), 516 (0.0856), 418 (1.3949) nm; Fluorescence (EX=418 nm, CHCl$_3$): 723, 620 nm; MALDI-TOF MASS C$_{39}$H$_{44}$N$_6$O$_4$ Calcd: 660.34. Found: 661.9 (M+H)$^+$.

5,15-Bis(methoxycarbonylethyl)-10-(1'-trimethylsilylethynyl)-20-(1''-methyl-2''-imidazolyl)porphyrin (A-6b)

This compound was prepared as above. Trifluoroacetic acid (3.7 mL, 26 mmol) was added to a solution of meso-(methoxycarbonylethyl)dipyrromethane A-4 (3 g, 13 mmol), 1-methyl-2-formyl-imidazole A-3 (1.4 g, 13 mmol) and 1-trimethylsilyl-ethynylaldehyde A-5b (0.8 g, 6.5 mmol) in deoxygenated CHCl$_3$ (3 L), followed by the addition of chloranil (4.8 g, 20 mmol). The thus obtained crude product was loaded on a silica gel column, eluting with CHCl$_3$/MeOH (9:1) to give A-6b (120 mg, 3%). $^1$H NMR (600 MHz, CDCl$_3$) δ −2.78 (s, 2H; inner proton), 0.67 (s, 9H; TMS), 3.33 (s, 3H; NCH$_3$), 3.43 (t, J=7.2 Hz, 4H; ester β), 3.7 (s, 6H; COOMe), 5.17–5.19 (m, 4H; ester α), 7.46 (br.s, 1H; imidazole ring), 7.70 (br.s, 1H; imidazole ring), 8.71 (d, J=4.2 Hz, 2H; Porβ), 9.34 (d, J=4.2 Hz, 2H; Porβ), 9.41 (d, J=4.2 Hz, 2H; Porβ), 9.70 (d, J=4.2 Hz, 2H; Porβ); $^{13}$C NMR (150 MHz, CDCl$_3$) δ 0.4 (TMS), 30.2 (ester α), 34.6 (NCH$_3$), 41.7 (ester β), 52.0 (COOMe), 100.1 (TMS-C≡C—), 102.5 (meso), 106.4 (meso), 107.1 (TMS-C≡C—), 118.3 (meso), 121.7 (imidazole ring), 128.2 (Porβ), 128.3 (imidazole ring), 128.4 (Porβ), 131.2 (Porβ), 131.9 (Porβ), 144–147 (br, 4 carbons (Porα)), 148.4 (Im N—C=N), 173.0 (C=O); UV-Vis (CHCl$_3$): 665 (Abs.; 0.0651), 608 (0.0553), 566 (0.1405), 527 (0.1086), 427 (2.3982) nm; Fluorescence (EX=427 nm, CHCl$_3$): 740, 668 nm; MALDI-TOF MASS C$_{37}$H$_{38}$N$_6$O$_4$Si Calcd: 658.27. Found: 659.2 (M+H)$^+$.

5,15-Bis(methoxycarbonylethyl)-10,20-bis(1'-methyl-2'-imidazolyl)porphyrin (A-6c)

Trifluoroacetic acid (1.7 mL, 12 mmol) was added to a solution of meso-(methoxycarbonylethyl)dipyrromethane A-4 (1 g, 4 mmol) and 1-methyl-2-formyl-imidazole A-3 (450 mg, 4 mmol) in deoxygenated CHCl$_3$ (1 L), followed by the addition of chloranil (3 g, 12 mmol) according to the procedure described for the preparation of A-6a. The thus obtained crude product was loaded on a silica gel column, eluting with CHCl$_3$/MeOH (9:1) to give A-6c4c (260 mg, 10%). Imidazole groups at 10- and 20-position gave two peaks by NMR. This comes from the presence of geometrical isomers of cis and trans (1:1) by the two N-imidazoly groups. Imidazole groups at 10- and 20-positions gave two peaks by NMR.

$^1$H NMR (600 MHz, CDCl$_3$) δ −2.82 (s, 2H×1/2; inner proton), −2.78 (s, 2H×1/2; inner proton), 3.43 (s, 3H; NCH$_3$), 3.48 (dd, J=7, 7 Hz, 4H; ester β), 3.73 (s, 6H×1/2; COOMe), 3.74 (s, 6H×1/2; COOMe), 5.30–5.34 (m, 4H; ester α), 7.46 (d, J=1 Hz, 2H×1/2; imidazole ring), 7.48 (d, J=1 Hz, 2H×1/2; imidazole ring), 7.66 (d, J=1 Hz, 2H×1/2; imidazole ring), 7.68 (d, J=1 Hz, 2H×1/2; imidazole ring), 8.83 (d, J=4.2 Hz, 4H×1/2; Porβ), 8.84 (d, J=4.2 Hz, 4H×1/2; Porβ), 9.49 (d, J=4.2 Hz, 4H×1/2; Porβ), 9.50 (d, J=4.2 Hz, 4H×1/2; Porβ); $^{13}$C NMR (150 MHz, CDCl$_3$) δ 30.1 & 30.2 (ester α), 34.6 & 34.7 (NCH$_3$), 41.7 & 41.8 (ester β), 52.0 (COOMe), 106.0 (meso), 118.1 (meso), 121.7 & 121.9 (imdazole ring), 128.2 & 128.8 (imidazole ring), 131.1 & 131.4 (Porβ), 146.5–149.2 (br, 4 carbons (Porα)), 148.1 & 148.5 (Im N—C=N), 172.9 & 173.0 (C=O); UV-Vis (CHCl$_3$): 654 (Abs.; 0.028), 592 (0.0189), 547 (0.0221), 514 (0.0602), 416 (0.8753) nm; Fluorescence (EX=416 nm, CHCl$_3$): 718, 657 nm; MALDI-TOF MASS C$_{36}$H$_{34}$N$_8$O$_4$ Calcd: 642.27. Found: 643.2 (M+H)$^+$.

5,15-Bis(methoxycarbonylethyl)-10-(phenyl)-20-(1'-methyl-2'-imidazolyl) porphyrin (A-6d)

Trifluoroacetic acid (0.9 mL, 6 mmol) was added to a solution of benzaldehyde A-5d (0.2 mL, 2 mmol), meso-(methoxycarbonylethyl)dipyrromethane A-4 (1 g, 4 mmol) and 1-methyl-2-formyl-imidazole A-3 (220 mg, 2 mmol) in deoxygenated CHCl$_3$ (1 L), followed by the addition of chloranil (1.5 g, 6 mmol) according to the procedure described for the preparation of A-6a. The thus obtained crude product was loaded on a silica gel column, eluting with CHCl$_3$/acetone (9:1) to give A-6d (73 mg, 6%). $^1$H NMR (600 MHz, CDCl$_3$) δ −2.73 (s, 2H; inner proton), 3.40 (s, 3H; NCH$_3$), 3.50 (t, J=8 Hz, 4H; ester β), 3.75 (s, 6H; COOMe), 5.32 (t, J=8 Hz, 4H), 7.48 (s, 1H; imidazole ring), 7.68 (s, 1H; imidazole ring), 7.74–7.82 (m, 3H; Ph), 8.10 (d, J=7 Hz, 1H; Ph), 8.22 (d, J=7 Hz, 1H; Ph), 8.81 (d, J=4.2 Hz, 2H; Porβ), 8.89 (d, J=4.2 Hz, 2H; Porβ), 9.43 (d, J=4.2 Hz, 2H; Porβ), 9.49 (d, J=4.2 Hz, 2H; Porβ); $^{13}$C NMR (150 MHz, CDCl$_3$) δ 30.4 (ester α), 34.6 (NCH$_3$), 41.8 (ester β), 52.0 (COOMe), 104.8 (meso), 117.5 (meso), 121.3 (meso), 121.5 (imdazole ring), 126.66 (Ph), 126.73 (Ph), 127.4 (Porβ), 128.0 (imidazole ring), 128.5 (C; Ph), 128.9 (Porβ), 131.1 (Porβ), 132.7 (Porβ), 134.4 (Ph), 142.3 (Ph), 144.2–149.5 (br, 4 carbons (Porα)), 148.7 (Im N—C=N), 173.1 (C=O); UV-Vis (CHCl$_3$): 647 (Abs.; 0.0224), 590 (0.0384), 548 (0.0415), 515 (0.1159), 417 (1.9670) nm; Fluorescence (EX=417 nm, CHCl$_3$): 717, 652 nm; MALDI-TOF MASS C$_{38}$H$_{34}$N$_6$O$_4$ Calcd: 638.26. Found: 639.8 (M+H)$^+$.

5,15-Bis(allyloxycarbonylethyl)-10-(n-heptyl)-20-(1'-methyl-2'-imidazolyl) porphyrin (A-8a)

To a stirred solution of porphyrin A-6a (100 mg, 0.15 mmol) and allyl alcohol (0.2 mL, 3 mmol) in toluene (3 mL) was added Sn Cat. A-7 (1 mg, 2 mmol), and refluxed for 4 h at 120° C. The completion of the reaction was checked by MALDI-TOF MASS, and the mixture was added by water, and extracted with CHCl$_3$. The organic layer was washed with brine, dried over anhydrous Na$_2$SO$_4$, and evaporated under reduced pressure. The thus obtained crude product was loaded on a silica gel column, eluting with CHCl$_3$/MeOH (10:1) to give A-8a (90 mg, 90%). $^1$H NMR (600 MHz, CDCl$_3$) δ −2.81 (s, 2H; inner proton), 0.91 (t, J=7 Hz, 3H; C7), 1.34–1.35 (m, 4H; C6,C5), 1.45–1.57 (m, 2H; C4), 1.78 (t,t, J=7, 7 Hz, 2H; C3), 2.49 (t,t, J=7, 7 Hz, 2H; C2), 3.34 (s, 3H; NCH$_3$), 3.50 (t, J=8 Hz, 4H; ester β), 4.68 (d, J=6 Hz, 4H; O—CH$_2$—C=C), 4.93 (t, J=7 Hz, 2H; C1), 5.21 (d, J=11 Hz, 2H; —C=CH$_2$), 5.26 (t, J=8 Hz, 4H; ester α), 5.32 (d, J=18 Hz, 2H; —C=CH$_2$), 5.92 (ddt, J=6, 11, 18 Hz, 2H; —CH=C), 7.45 (s, 1H; imidazole ring), 7.68 (s, 1H; imidazole ring), 8.73 (d, J=4.2 Hz, 2H; Porβ), 9.41 (d, J=4.2 Hz, 2H; Porβ), 9.47 (d, J=4.2 Hz, 2H; Porβ), 9.51 (d, J=4.2 Hz, 2H; Porβ); $^{13}$C NMR (150 MHz, CDCl$_3$) δ 14.2 (C7), 22.8 (C6), 29.4 (C4), 30.4 (C3), 30.7 (ester α), 32.0 (C5), 34.6 (NCH$_3$), 36.0 (C2), 39.1 (C1), 41.9 (ester β), 65.6 (O—C—C=C), 103.8 (meso), 116.9 (meso), 118.6 (O—C—C=C), 121.6 (meso), 122.1 (imidazole ring), 126.3–129.5 (br, 4 carbons (Porβ)), 128.3 (imidazole ring), 132.2 (O—C—C=C), 148.7 (Im N—C=N), 172.4 (C=O) Other 4 carbons (Porα) could not observed by boarding; UV-Vis (CHCl$_3$): 647 (Abs.; 0.0024), 589 (0.0035), 553 (0.0051), 517 (0.0100), 417 (0.1438) nm; Fluorescence (EX=417 nm, CHCl$_3$): 722, 655 nm; MALDI-TOF MASS C$_{43}$H$_{48}$N$_6$O$_4$ Calcd: 712.37. Found: 713.6 (M+H)$^+$.

5,15-Bis(allyloxycarbonylethyl)-10-(1'-trimethylsilylethynyl)-20-(1'-methyl-2'-imidazolyl)porphyrin (A-8b)

This compound was prepared from porphyrin A-6b (70 mg, 0.1 mmol), allyl alcohol (0.1 mL, 2 mmol), and Sn Cat. A-7 (1 mg, 2 mmol) in toluene (10 mL) according to the procedure described for the preparation of A-8a. The thus obtained crude product was loaded on a silica gel column, eluting with $CHCl_3$/MeOH (9:1) to give A-8b (62 mg, 88%). $^1$H NMR (600 MHz, $CDCl_3$) δ −2.67 (s, 2H; inner proton), 0.66 (s, 9H; TMS), 3.35 (s, 3H; $NCH_3$), 3.48 (t, J=7 Hz, 4H; ester β), 4.67 (d, J=6 Hz, 4H; O—$CH_2$—C=C), 5.19 (d, J=11 Hz, 2H; —C=$CH_2$), 5.24 (t, J=8 Hz, 2H; ester α), 5.30 (d, J=19 Hz, 2H; —C=$CH_2$), 5.89 (ddt, J=6, 11, 19 Hz, 2H; —CH=C), 7.45 (s, 1H; imidazole ring), 7.68 (s, 1H; imidazole ring), 8.74 (d, J=4.2 Hz, 2H; Porβ), 9.39 (d, J=4.2 Hz, 2H; Porβ), 9.44 (d, J=4.2 Hz, 2H; Porβ), 9.71 (d, J=4.2 Hz, 2H; Porβ); $^{13}$C NMR (150 MHz, $CDCl_3$) δ 0.44 (TMS), 30.2 (ester α), 34.5 ($NCH_3$), 41.8 (ester β), 65.6 (O—$\underline{C}$—C=C), 100.1 (TMS-$\underline{C}$≡C—), 102.5 (meso), 106.7 (meso), 107.1 (TMS-C≡$\underline{C}$—), 118.3 (meso), 118.6 (O—C—C=$\underline{C}$), 121.6 (imdazole ring), 128.3 (Porβ), 128.4 (imidazole ring), 128.5 (Porβ), 131.3 (Porβ), 131.8 (Porβ), 132.1 (O—C—$\underline{C}$=C), 144.5–148.2 (4 carbons (Porα)), 148.5 (Im N—C=N), 172.3 (C=O); UV-Vis ($CHCl_3$): 665 (Abs.; 0.0633), 607 (0.0452), 565 (0.1344), 527 (0.1030), 427 (2.3423) nm; Fluorescence (EX=427 nm, $CHCl_3$): 740, 668 nm; MALDI-TOF MASS $C_{41}H_{42}N_6O_4Si$ Calcd: 710.30. Found: 711.0 (M+H)$^+$.

5,15-Bis(allyloxycarbonylethyl)-10,20-(1'-methyl-2'-imidazolyl)porphyrin (A-8c)

This compound was prepared from porphyrin A-6c (100 mg, 0.2 mmol), allyl alcohol (0.2 mL, 3 mmol), and Sn Cat. A-7 (1 mg, 2 μmol) in toluene (10 mL) according to the procedure described for the preparation of A-8a. The thus obtained crude product was loaded on a silica gel column, eluting with $CHCl_3$/MeOH (9:1) to give A-8c (99 mg, 92%). Imidazole groups at 10- and 20-positions gave two peaks by NMR. This comes from the presence of geometrical isomers of cis and trans (1:1) of the two N-methylimidazolyl groups. $^1$H NMR (600 MHz, $CDCl_3$) δ −2.76 (s, 2H×1/2; inner proton), −2.75 (s, 2H×1/2; inner proton), 3.37 (s, 6H×1/2; $NCH_3$), 3.46 (s, 6H×1/2; $NCH_3$), 3.55–3.60 (m, 4H; ester β), 4.70–4.72 (m, 4H; O—$CH_2$—C=C), 5.21–5.24 (m, 2H; —C=$CH_2$), 5.31–5.40 (m, 4H; ester α), 5.90–5.98 (m, 4H; —CH=C), 7.49 (d, J=1 Hz, 2H×1/2; imidazole ring), 7.50 (d, J=1 Hz, 2H×1/2; imidazole ring), 7.69 (d, J=2 Hz, 2H×1/2; imidazole ring), 7.71 (d, J=1 Hz, 2H×1/2; imidazole ring), 8.87 (d, J=5 Hz, 4H×1/2; Porβ), 8.88 (d, J=5 Hz, 4H×1/2; Porβ), 9.54 (d, J=5 Hz, 4H×1/2; Porβ), 9.55 (d, J=5 Hz, 4H×1/2; Porβ); $^{13}$C NMR (150 MHz, $CDCl_3$) δ 30.2 (ester α), 34.6 & 34.7 ($NCH_3$), 41.9 (ester β), 65.6 (O—$\underline{C}$—C=C), 106.4 & 106.5 (meso), 118.0 & 118.1 (meso), 118.6, (O—C—C=$\underline{C}$) 121.66 & 121.71 (imidazole ring), 128.5 & 128.6 (imdazole ring), 128.8 (Porβ), 131.5 (Porβ) 132.1 (O—C—$\underline{C}$=C), 145.5–149.0 (br, 4 carbons (Porα)), 148.4 & 148.5 (Im N—C=N), 172.2 (C=O); UV-Vis ($CHCl_3$): 653 (Abs. 0.0181), 591 (0.0153), 548 (0.0170), 514 (0.0376), 417 (0.04710) nm; Fluorescence (EX=417 nm, $CHCl_3$): 717, 657 nm; MALDI-TOF MASS $C_{40}H_{38}N_8O_4$ Calcd: 694.30. Found: 695.7 (M+H)$^+$.

5,15-Bis(allyloxycarbonylethyl)-10-(phenyl)-20-(1'-methyl-2'-imidazolyl) porphyrin (A-8d)

This compound was prepared from A-6d (60 mg, 94 μmol), allyl alcohol (0.1 mL, 2 mmol), and Sn Cat. A-7 (1 mg, 2 μmol) in toluene (10 mL) according to the procedure described for the preparation of A-8a. The thus obtained crude product was loaded on a silica gel column, eluting with $CHCl_3$/MeOH (9:1) to give pure A-8d (55 mg, 85%). $^1$H NMR (600 MHz, $CDCl_3$) δ −2.73 (s, 2H; inner proton), 3.39 (s, 3H; $NCH_3$), 3.53 (t, J=8 Hz, 4H; ester β), 4.69 (d, J=6 Hz, 4H; O—$CH_2$—C=C), 5.19 (d, J=10 Hz, 2H; —C=$CH_2$), 5.30 (t, J=8 Hz, 4H; ester α), 5.32 (d, J=16 Hz, 2H; —C=$CH_2$), 5.90 (ddt, J=6, 10, 16 Hz, 4H; —CH=C), 7.47 (s, 1H; imidazole ring), 7.68 (s, 1H; imidazole ring), 7.73–7.82 (m, 3H; Ph), 8.11 (d, J=7 Hz, 1H; Ph), 8.21 (d, J=7 Hz, 1H; Ph), 8.81 (d, J=4.8 Hz, 2H; Porβ), 8.89 (d, J=4.8 Hz, 2H; Porβ), 9.44 (d, J=4.8 Hz, 2H; Porβ), 9.50 (d, J=4.8 Hz, 2H; Porβ); $^{13}$C NMR (150 MHz, $CDCl_3$) δ 30.4 (ester α), 34.6 ($NCH_3$), 41.9 (ester β), 65.6 (O—$\underline{C}$—C=C), 104.8 (meso), 117.4 (meso), 118.5 (O—C—C=$\underline{C}$), 121.2 (meso), 121.5 (imidazole ring), 126.6 (Ph), 126.7 (Ph), 127.5 (Porβ), 128.0 (imidazole ring), 128.5 (C; Ph), 128.9 (Porβ), 131.1 (Porβ), 132.1 (O—C—$\underline{C}$=C), 132.7 (Porβ), 134.3 (Ph), 142.2 (Ph), 144.4–149.2 (4 carbons (Porα)), 148.6 (Im N—C=N), 172.2 (C=O); UV-Vis ($CHCl_3$): 647 (Abs. 0.0230), 590 (0.0392), 549 (0.0424), 515 (0.1201), 417 (2.0850) nm; Fluorescence (EX=417 nm, $CHCl_3$): 718, 652 nm; MALDI-TOF MASS $C_{42}H_{38}N_6O_4$ Calcd: 690.30. Found: 691.2 (M+H)$^+$.

5,15-Bis(allyloxycarbonylethyl)-10-(n-heptyl)-20-(1'-methyl-2'-imidazolyl) porphyrinatozinc (A-9a)

Saturated zinc acetate solution in MeOH (5 mL) was added to a solution of porphyrin A-8a (80 mg, 0.12 mmol) in $CHCl_3$ (15 mL). After stirring for 1 h at room temperature, the mixture was washed with water, and extracted with $CHCl_3$. The organic layer was dried over anhydrous $Na_2SO_4$, and evaporated under reduced pressure to give A-9a (88 mg, quant). $^1$H NMR (600 MHz, $CDCl_3$) δ 0.98 (t, J=7 Hz, 3H; C7), 1.43–1.48 (m, 4H; C6, C5), 1.64 (s, 3H; $NCH_3$), 1.67 (t.t, J=7, 7 Hz, 2H; C4), 1.97 (d, J=1.8 Hz, 1H; imdiazole ring), 2.00 (t.t, J=7, 7 Hz, 2H; C3), 2.75 (t.t, J=7, 7 Hz, 2H; C2), 3.64–3.75 (m, 2H; ester β), 3.80–3.86 (m, 2H; ester β), 4.85 (ddd, J=6, 12.6, 24.6 Hz, 4H; O—$CH_2$—C=C), 5.25 (t, J=7 Hz, 2H; C1), 5.32 (dd, J=1.8, 10.2 Hz, 2H; —C=$CH_2$) 5.40 (d, J=4.2 Hz, 2H; Porβ4), 5.40–5.50 (m, 4H; ester α), 5.46 (s, 1H; imidazole ring), 6.07 (ddt, J=6, 10.8, 16.8 Hz, 4H; —CH=C), 8.87 (d, J=4.2 Hz, 2H; Porβ3), 9.66 (d, J=4.2 Hz, 2H; Porβ), 9.73 (d, J=4, 2 Hz, 2H; Porβ); $^{13}$C NMR (150 MHz, $CDCl_3$) δ 14.3 (C7), 22.9 (C6), 29.7 (C4), 30.9 (ester α), 32.2 (C3), 32.7 ($NCH_3$), 36.3 (C1), 39.8 (C2), 42.7 (ester β), 65.5 (O—$\underline{C}$—C=C), 95.8 (meso), 116.8 (meso), 117.8 (O—C—C=$\underline{C}$), 118.4 (imidazole ring), 121.6 (meso), 122.8 (imidazole ring), 127.2 (Porβ4), 128.3 (Porβ1), 128.9 (Porβ3), 129.5 (Porβ2), 132.6 (O—C—$\underline{C}$=C), 146.1 (Im N—C=N), 148.6 (C), 149.2 (C), 149.5 (C), 150.1 (C), 172.9 (C=O); UV-Vis ($CHCl_3$): 616 (Abs. 0.0044), 568 (0.0104), 434 (0.1165), 416 (0.1052) nm; Fluorescence (EX=434 nm, $CHCl_3$): 673, 620, (EX=416 nm, $CHCl_3$): 673, 619 nm; MALDI-TOF MASS $C_{43}H_{46}N_6O_4Zn$ Calcd: 774.29. Found: 775.4 (M+H)$^+$.

5,15-Bis(allyloxycarbonylethyl)-10-(1'-trimethylsilylethynyl)-20-(1"-methyl-2"-imidazolyl)porphyrinatozinc (A-9b)

This compound was prepared from porphyrin A-8b (50 mg, 70 mmol), saturated zinc acetate solution in MeOH (3 mL) and $CHCl_3$ (12 mL) according to the procedure described for the preparation of A-9a. The organic layer was washed with brine, dried over $Na_2SO_4$, and evaporated under reduced pressure to give A-9b (54 mg, quant). $^1H$ NMR (600 MHz, $CDCl_3$) δ 0.74 (s, 9H; TMS), 1.66 (s, 3H; $NCH_3$), 2.02 (d, J=2 Hz, 1H; imidazole ring), 3.70 (ddd, J=7.2, 10.2, 17 Hz, 2H; ester β), 3.81 (ddd, J=6, 10.2, 17 Hz, 2H; ester β), 4.80 (dd, J=6, 12.6 Hz, 2H; O—$CH_2$—C=C), 4.86 (dd, J=6, 12.6 Hz, 2H; O—$CH_2$—C=C), 5.31 (d, J=10.8 Hz, 2H; —C=$CH_2$), 5.44 (d, J=2 Hz, 1H; imidazole ring), 5.45 (d, J=4.2 Hz, 2H; Porβ4), 5.48 (d, J=16.2 Hz, 2H; —C=$CH_2$), 6.06 (ddt, J=6, 10.8, 16.2 Hz, 2H; —CH=C), 8.86 (d, J=4.2 Hz, 2H; Porβ), 9.65 (d, J=4.2 Hz, 2H; Porβ), 9.92 (d, J=4.2 Hz, 2H; Porβ); $^{13}C$ NMR (150 MHz, $CDCl_3$) δ 0.7 (TMS), 30.9 (ester α), 32.7 ($NCH_3$), 42.7 (ester β), 65.6 (O—$\underline{C}$—C=C), 98.7 (meso), 99.9 (TMS-C≡$\underline{C}$—), 100.4 (TMS-$\underline{C}$≡C—), 109.2 (meso), 118.2 (O—C—C=$\underline{C}$), 118.4 (imidazole ring), 118.5 (meso), 121.9 (imidazole ring), 127.9 (Porβ4), 128.8 (Porβ1), 129.3 (Porβ3), 131.9 (Porβ2), 132.5 (O—C—$\underline{C}$=C), 145.5 (Im N—C=N), 147.8 (C), 150.0 (C), 150.5 (C), 152.0 (C), 172.7 (C=O); UV-Vis ($CHCl_3$): 637 (Abs.; 0.1747), 579 (0.0830), 445 (1.2834), 426 (0.7554) nm; Fluorescence (EX=426 nm, $CHCl_3$): 698, 640 nm; MALDI-TOF MASS $C_{41}H_{40}N_6O_4SiZn$ Calcd: 772.22. Found: 773.6 $(M+H)^+$.

5,15-Bis(allyloxycarbonylethyl)-10-(N-methyl-imidazolyl)-20-(N-methyl-imidazolyl)porphyrinatozinc (A-9c)

This compound was prepared from poprphyrin A-8c (80 mg, 0.11 mmol), saturated zinc acetate solution in MeOH (5 mL) and $CHCl_3$ (15 mL) according to the procedure described for the preparation of A-9a. The organic layer was washed with brine, dried over $Na_2SO_4$, and evaporated under reduced pressure to give A-9c (87 mg, quant). Imidazole groups at 10- and 20-positions gave two peaks by NMR. This comes from the presence of geometrical isomers of cis and trans by hindered rotation of the imidazolylporphyrin bond.

$^1H$ NMR (600 MHz, $CDCl_3$) δ 1.64 (s, 3H; $NCH_3$ (coordination)), 2.21 (d, J=2.4 Hz, 1H; imidazole ring (coordination)), 3.27 (s, 3H; $NCH_3$ (Free)), 3.68–3.76 (m, 2H; ester β), 3.80–3.90 (m, 2H; ester β), 4.78–4.90 (m, 4H; O—$CH_2$—C=C), 5.31 (dd, J=1.2, 10.2 Hz, 2H; —C=$CH_2$), 5.47 (dd, J=1.2, 16.8 Hz, 2H; —C=$CH_2$), 5.50 (br, 1H; Im ring), 5.52 (d, J=4.2 Hz, 2H; Porβ4), 5.45–5.55 (m, 4H; ester α), 6.03–6.10 (m, 2H; —CH=C), 7.52 (d, J=1.8 Hz, 1H; imdiazole ring (free)), 7.80 (d, J=1.8 Hz, 1H; imidazole ring (free)), 8.96 (d, J=4.2 Hz, 2H; Porβ3), 8.97 (d, J=4.2 Hz, 2H; Porβ1), 9.67 (d, J=4.2 Hz, 2H; Porβ2); $^{13}C$ NMR (150 MHz, $CDCl_3$) δ 30.9 (ester α), 32.6 ($NCH_3$ (free)), 34.5 ($NCH_3$ (coordination)), 42.7 (ester β), 65.5 (O—$\underline{C}$—C=C), 98.2 (br, meso), 98.3 (meso), 117.8 (meso), 118.4 (imidazole ring (coordination)), 118.5 (—C=$CH_2$), 121.2 (imidazole ring (free)), 122.2 (imidazole ring (coordination)), 128.1 (imidazole ring (free)), 128.9 (Porβ4), 129.6 (Porβ2,3), 131.4 (Porβ1), 132.5 (O—C—$\underline{C}$=C), 145.2 (Im N—C=N), 147.9 (C), 150.0 (C), 150.1 (C), 150.2 (C) 150.9 (C), 172.9 (C=O); UV-Vis ($CHCl_3$): 618 (Abs.; 0.0327), 564 (0.0527), 435 (0.5798), 412 (0.4772) nm; Fluorescence (EX=412 nm, $CHCl_3$): 679, 624 nm; MALDI-TOF MASS $C_{40}H_{36}N_8O_4Zn$ Calcd: 756.22. Found: 756.9 $(M+H)^+$.

5,15-Bis(allyloxycarbonylethyl)-10-(phenyl)-20-(1'-methyl-2'-imidazolyl) porphyrinatozinc (A-9d)

This compound was prepared from porphyrin A-8d (30 mg, 43 μmol), saturated zinc acetate solution in MeOH (2 mL) and $CHCl_3$ (9 mL) according to the procedure described for the preparation of A-9a. The organic layer was evaporated under reduced pressure to give A-9d (33 mg, quant). $^1H$ NMR (600 MHz, $CDCl_3$) δ 1.67 (s, 3H; $NCH_3$), 2.13 (d, J=2 Hz, 1H; imidazole ring), 3.71 (ddd, J=6.6, 10.8, 16.8 Hz, 2H; ester β), 3.85 (ddd, J=6.6, 10.8, 16.8 Hz, 2H; ester β), 4.84 (ddt, J=1.2, 6, 12 Hz, 2H; O—$CH_2$—C=C), 4.87 (ddt, J=1, 1.2, 6, 12 Hz, 2H; O—$CH_2$—C=C), 5.31 (dd, J=1.8, 10.2 Hz, 2H; —C=$CH_2$), 5.46 (dd, J=1.8, 16.2 Hz, 2H; —C=$CH_2$), 5.47 (d, J=4.2 Hz, 2H; β4), 5.46–5.51 (m, 4H; ester α), 5.53 (d, J=2.4 Hz, 1H; imidazole ring), 6.06 (ddt, J=6, 10.2, 16.2 Hz, 2H; —CH=C), 7.77 (dd, J=6.6, 8.4 Hz, 1H; Ph), 7.87 (t, J=8.4 Hz, 1H; Ph), 7.94 (dd, J=7.8, 8.4 Hz, 1H; Ph), 8.13 (d, J=7.8 Hz, 1H; Ph), 8.67 (d, J=6.6 Hz, 1H; Ph), 8.94 (d, J=4.2 Hz, 2H; Porβ3), 9.06 (d, J=4.2 Hz, 2H; Porβ1), 9.61 (d, J=4.2 Hz, 2H; Porβ2); $^{13}C$ NMR (150 MHz, $CDCl_3$) δ 30.9 (ester α), 32.7 ($NCH_3$), 42.7 (ester β), 65.6 (O—$\underline{C}$—C=C), 96.4 (meso), 117.5 (meso), 118.0 (O—C—C=$\underline{C}$), 118.4 (imidazole ring), 121.5 (imidzole ring), 122.0 (meso), 126.3 (Ph), 126.5 (Ph), 127.4 (Ph), 127.6 (Porβ4), 128.1 (Porβ3), 128.9 (Porβ1), 132.5 (O—C—$\underline{C}$=C), 132.7 (Porβ2), 134.7 (Ph), 134.8 (Ph), 143.9 (C), 146.0 (Im N—C=N), 148.3. (C), 149.5 (C), 149.6 (C), 150.7 (C), 172.8 (C=O); UV-Vis ($CHCl_3$): 616 (Abs.; 0.0107), 565 (0.0198), 435 (0.1510), 413 (0.1400) nm; Fluorescence (EX=413 nm, $CHCl_3$): 674, 619 nm; MALDI-TOF MASS $C_{42}H_{36}N_6O_4Zn$ Calcd: 752.21. Found: 753.4 $(M+H)^+$.

Metathesis Product of n-heptyl-substituted Porphyrin (A-11a)

To a stirred solution of porphyrin A-9a (80 mg, 0.1 mmol) in $CHCl_3$ (15 mL) was added Ru carbene complex (Grubbs catalyst A-10) (1 mg, 10 mmol). After stirring for 3 h at room temperature, completion of the reaction was checked by MALDI-TOF-MASS. The mixture was quenched by water and extracted with $CHCl_3$. The organic layer was washed with brine, dried over anhydrous $Na_2SO_4$, and evaporated under reduced pressure. The thus obtained crude product was loaded on a silica gel column, eluting with $CHCl_3$/acetone (9:1) to give A-11a (73 mg, 95%).

Ultraviolet-visible absorption spectrum of the compound A-11a is shown in FIG. 1. The dimer of conventional type which is formed by only coordination bonds dissociated to monomers in a solvent having high polarity such as the chloroform solvent containing methanol or the pyridine solvent. On the contrary, the dimer which had been fixed by covalent bonds maintained the dimer structure thereof in such a solvent having high polarity. That is, the porphyrin dimer of the present invention exhibits remarkably improved stability, as compared with the conventional porphyrin dimer.

(Note) As the compound A-11a has two olefin sites, there could theoretically exist three types of isomers (trans/trans, trans/cis and cis/cis) according to the olefin site of the compound. However, in $^1H$ NMR, two types of isomers (the isomer ratio was 4:1) were observed. As these isomers cannot be separated with chromatography or the like, it is not clear whether the mixture is constituted of two of the three types of the isomers or of all three types of the isomers. The portion in NMR data at which the signal is separated to 1:4 was regarded as trans and cis, respectively, for convenience. Further, as the trans isomer is stable in terms of the energy state in a large cyclic compound as a ring having not less than 16 atoms, the main isomer as the product was regarded as trans. Ultraviolet-visible absorption spectrum and fluorescence spectrum of the sample as the mixture of these isomers were measured. In this case, as there is no difference in configuration of the two porphyrins, it is assumed that there is hardly any difference in electronic physical properties between the isomers in the mixture.

$^1$H NMR (600 MHz, CDCl$_3$) δ 0.99 (trans & cis; t, J=7.2 Hz, 6H; C7), 1.43–1.48 (trans & cis; m, 8H; C6, C5), 1.64 (trans & cis; s, 6H; NCH$_3$), 1.65–1.69 (trans & cis; m, 4H; C4), 1.94 (trans & cis; br, 2H; CH (imidazole ring)), 1.97–2.03 (trans & cis; m, 4H; C3), 2.70–2.77 (trans & cis; m, 4H; C2), 3.60–3.74 (trans; m, 4Hx4/5; ester β), 3.80–3.92 (trans; m, 4Hx4/5; ester β), 3.79–3.85 (cis; m, 4Hx1/5; ester β), 4.05–4.14 (cis; m, 4Hx1/5; ester β), 5.00 (trans; d, J=10.2 Hz, 2Hx4/5; O—CH$_2$—C≡C), 5.06 (trans; d, J=10.2 Hz, 2Hx4/5; O—CH$_2$—C≡C), 5.10 (cis; dd, J=6.0, 12 Hz, 2Hx1/5; O—CH$_2$—C≡C), 5.20 (cis; dd, J=6.0, 12 Hz, 2Hx1/5; O—CH$_2$—C≡C), 5.22–5.29 (trans & cis; m, 4H; C1), 5.33 (cis; d, J=4.2 Hz, 4Hx1/5; Porβ4), 5.39 (trans; d, J=4.2 Hz, 4H 4/5; Porβ4), 5.43 (trans & cis; s, 2H; CH (imidazole ring)), 5.42–5.50 (trans & cis; m, 4H; ester α), 6.40 (cis; t, J=6.0 Hz, 4Hx1/5; —CH═C), 6.45–6.47 (trans; m, J=<1.2 Hz, 4Hx4/5; —CH═C), 8.89 (trans; d, J=4.2 Hz, 4Hx4/5; Porβ3), 8.91 (cis; d, J=4.2 Hz, 4Hx1/5; Porβ3), 9.63 (trans; d, J=4.2 Hz, 4Hx4/5; Porβ1), 9.67 (cis; d, J=4.2 Hz, 4Hx1/5; Porβ1), 9.75 (trans; d, J=4.2 Hz, 4Hx4/5; Porβ2), 9.75 (cis; d, J=4.2 Hz, 4Hx1/5; Porβ2); $^{13}$C NMR (150 MHz, CDCl$_3$) δ 14.3 (C7), 22.9 (C6), 29.6 (C4), 30.9 (C3), 31.4 (ester α), 32.2 (C5), 32.7 (NCH$_3$), 36.3 (C1), 39.8 (C2), 43.2 (ester β), 58.9 (O—C—C≡C; cis), 63.4 (O—C—C≡C; trans), 96.0 (C), 116.7 (C; trans), 116.8 (C; cis), 117.86 & 117.90 (imidazole), 121.61 & 121.65 (imidazole), 122.7 (C; cis), 122.8 (C; trans), 127.32 & 127.37 (Porβ4), 128.2 (Porβ1), 128.6 (Porβ3; trans), 128.7 (Porβ3; cis), 129.6 (Porβ2), 129.8 (O—C—C═C; cis), 130.8 (O—C—C═C; trans), 145.9 (C; trans), 146.0 (C; cis), 148.3 (C; cis), 148.4 (C; trans), 148.9 (C; cis), 149.0 (C; trans), 149.60 (C; trans), 149.63 (C; cis), 149.9 (C; cis), 150.0 (C; trans), 172.5 (C═O; trans), 172.9 (C═O; cis); UV-Vis (CHCl$_3$): 617 (Abs.; 0.0799), 570 (0.2089), 435 (2.2464), 416 (2.0287), (pyridine): 617 (0.0301), 570 (0.712), 436 (0.8064), 417 (0.7124), (MeOH/CHCl$_3$=100/1): 615 (0.0045), 566 (0.0100), 431 (0.1135), 416 (0.1009) nm; Fluorescence (EX=435 nm, CHCl$_3$): 674, 620, (EX=416 nm, CHCl$_3$): 673, 620 nm; MALDI-TOF MASS C$_{82}$H$_{84}$N$_{12}$O$_8$Zn$_2$ Calcd: 1492.51. Found: 1493.3 (M+H)$^+$.

Metathesis Product of 1'-trimethylsilyl-ethynyl-substituted Porphyrin (A-11b)

This compound was prepared from porphyrin A-9b (40 mg, 52 μmol) and Ru carbene complex (Grubbs catalyst A-10) (2 mg, 5 μmol) in CHCl$_3$ (5 mL) according to the procedure described for the preparation of A-11a. The thus obtained crude product was loaded on a silica gel column, eluting with CHCl$_3$/acetone (9:1) to give A-11b (36 mg, 93%).

(Note) As the compound A-11b has two olefin sites, there could theoretically exist three types of isomers (trans/trans, trans/cis and cis/cis) according to the olefin site of the compound. However, in $^1$H NMR, two types of isomers (the isomer ratio was 4:1) were observed. As these isomers cannot be separated with chromatography or the like, it is not clear whether the mixture is constituted of two of the three types of the isomers or of all three types of the isomers. The portion in NMR data at which the signal is separated to 1:4 was regarded as trans and cis, respectively, for convenience. Further, as the trans isomer is stable in terms of the energy state in a large cyclic compound as a ring having not less than 16 atoms, the main isomer as the product was regarded as trans. Ultraviolet-visible absorption spectrum and fluorescence spectrum of the sample as the mixture of these isomers were measured. In this case, as there is no difference in configuration of the two porphyrins, it is assumed that there is hardly any difference in electronic physical properties between the isomers in the mixture. $^1$H NMR (600 MHz, CDCl$_3$) δ 0.74 (trans & cis; s, 18H; TMS), 1.68 (trans & cis; s, 6H; NCH$_3$), 2.00 (trans & cis; br, 2H; CH (imidazole ring)), 3.60–3.73 (trans; m, 4Hx4/5; ester β), 3.80–3.89 (trans; m, 4Hx4/5; ester β), 3.75–3.82 (cis; m, 4Hx1/5; ester β), 4.02–4.10 (cis; m, 4Hx1/5; ester β), 5.00 (trans; d, J=10.2 Hz, 4Hx4/5; O—CH$_2$—C═C), 5.07 (trans; d, J=10.2 Hz, 4Hx4/5; O—CH$_2$—C═C), 5.10 (cis; dd, J=6.0, 12 Hz, 4Hx1/5; O—CH$_2$—C═C), 5.20 (cis; dd, J=6.0, 12 Hz, 4Hx1/5; O—CH$_2$—C═C), 5.37 (cis; d, J=4.2 Hz, 4Hx1/5; Porβ4), 5.42 (trans & cis; s, 2H; imidazole ring)), 5.44 (trans; d, J=4.2 Hz, 4Hx4/5; Porβ4), 5.40–5.41 (trans & cis; m, 8H; ester α), 6.40 (cis; br.t, J=6.0 Hz, 4Hx1/5; —CH═C), 6.45–6.47 (trans; dd, J=<2.0 Hz, 4Hx4/5; —CH═C), 8.89 (trans; d, J=4.2 Hz, 4Hx4/5; Porβ3), 8.90 (cis; d, J=4.2 Hz, 4Hx1/5; Porβ3), 9.62 (trans; d, J=4.2 Hz, 4Hx4/5; Porβ1), 9.65 (cis; d, J=4.2 Hz, 4Hx1/5; Porβ1), 9.928 (trans; d, J=4.2 Hz, 4Hx4/5; Porβ2), 9.933 (cis; d, J=4.2 Hz, 4Hx1/5; Porβ2); $^{13}$C NMR (150 MHz, CDCl$_3$) δ 0.7 (TMS), 29.8 (TMS-C≡C—), 31.4 (ester α), 32.8 (NCH$_3$), 43.2 (ester β), 59.0 (O—C—C═C; cis), 63.4 (O—C—C═C; trans), 98.8 (C), 99.8 (C; cis), 99.9 (C; trans), 100.6 (C), 109.0 (C), 118.2 (imidazole), 121.9 (imidazole), 127.8 (Porβ4), 128.5 (Porβ3; cis), 128.6 (Porβ3; trans), 129.0 (Porβ2), 129.8 (O—C—C═C; cis), 130.8 (O—C—C═C; trans), 132.0 (Porβ1), 145.4 (C), 147.5 (C; cis), 147.6 (C; trans), 149.8 (C; trans), 149.9 (C; cis), 150.3 (C; cis), 150.4 (C; trans), 152.1 (C; trans), 152.3 (C; cis), 172.3 (C═O; trans), 172.8 (C═O; cis); UV-Vis (CHCl$_3$): 637 (Abs.; 0.0253), 579 (0.0153), 445 (01505), 425 (0.0930) nm; Fluorescence (EX=425 nm, CHCl$_3$): 698, 640 nm; MALDI-TOF MASS C$_{78}$H$_{72}$N$_{12}$O$_8$Si$_2$Zn$_2$ Calcd: 1488.37. Found: 1489.1 (M+H)$^+$.

Metathesis Product of N-merhyl-imidazolyl (A-11c)

This compound was prepared from porphyrin A-9c (60 mg, 80 μmol) and Ru carbene complex (Grubbs catalyst A-10) (3 mg, 8 μmol) in CHCl$_3$ (10 mL) according to the procedure described for the preparation of A-11a. The thus obtained crude product was loaded on a silica gel column, eluting with CHCl$_3$/acetone (9:1) to give pure A-11c (36 mg, 93%).

(Note) As the compound A-11c has two olefin sites, there could theoretically exist three types of isomers (trans/trans, trans/cis and cis/cis) according to the olefin site of the compound. In $^1$H NMR, two types of isomers (the isomer ratio was 4:1) were observed. As these isomers cannot be separated with chromatography or the like, it is not clear whether the mixture is constituted of two of the three types of the isomers or of all three types of the isomers. The portion in NMR data at which the signal is separated to 1:4 was regarded as trans and cis, respectively, for convenience. Further, as the trans isomer is stable in terms of the energy state in a large cyclic compound as a ring having not less than 16 atoms, the main isomer as the product was regarded as trans. Ultraviolet-visible absorption spectrum and fluorescence spectrum of the sample as the mixture of these isomers were measured. In this case, as there is no difference in configuration of the two porphyrins, it is assumed that there is hardly any difference in electronic physical properties between the isomers in the mixture. $^1$H NMR (600 MHz, CDCl$_3$) δ 1.64 and 1.65 (s, 6H; NCH$_3$ (coordination)), 2.18–2.20 (m, 2H; imidazole ring (coordination)), 3.28 (s, 6H; NCH$_3$ (free)), 3.65–3.77 (m, 4Hx4/5; ester β), 3.82–3.94 (m; 4Hx4/5; ester β), 3.80–3.90 (m; 4Hx1/5; ester β), 4.02–4.15 (m; 4Hx1/5; ester β), 4.95–5.02 (m; 4Hx4/5; —CH=C), 5.04–5.08 (m; 4Hx4/5; —CH=C), 5.05–5.12 (m; 4Hx1/5; —CH=C), 5.18–5.22 (m; 4Hx1/5; —CH=C), 5.43 (d, J=4.2 Hz, 4Hx1/5; Porβ4), 5.50 (d, J=4.2 Hz, 4Hx4/5; Porβ4), 5.48–5.55 (m, 8H; ester α), 5.518 (br, 2H; imidazole ring (coordination)), 6.39–6.42 (m, 4Hx1/5; —CH=C), 6.47–6.49 (m, 4Hx4/5; —CH=C), 7.53 (s, 2H; imidazole ring (free)), 7.84 (s, 2H; imidazole ring (free)), 8.95–9.01 (m, 8H; Porβ2, 3), 9.61–9.69 (m, 4H; Porβ1); $^{13}$C NMR (150 MHz, CDCl$_3$) δ 31.4 (ester α), 32.7 (NCH$_3$ (coordination)), 34.6 (NCH$_3$ (free)), 43.3 (ester β), 58.9 (O—C—C=C; cis), 63.4 (O—C—C=C; trans), 98.8 (C), 99.5 (C), 117.7 (C), 118.5 (imidazole ring (coordination)), 121.2 (imidazole ring (free)), 122.3 (imidazole ring (coordination)), 128.0 (34), 128.6 (imidazole ring (free)), 128.7 (Porβ1), 129.6 (Porβ3), 129.8 (Porβ2), 130.8 (O—C—C=C; cis), 131.5 (O—C—C=C; trans), 145.1 (C), 147.6 (C), 147.7 (C), 150.0 (C), 150.2 (C), 150.8 (C), 172.3 (C=O; trans), 172.7 (C=O; cis); UV-Vis (CHCl$_3$): 620 (ABS.; 0.0145), 564 (0.0210), 435 (0.1775), 412 (0.01553) nm; Fluorescence (EX=412 nm, CHCl$_3$): 681, 624 nm; MALDI-TOF MASS C$_{76}$H$_{64}$N$_{16}$O$_8$Zn$_2$ Calcd: 1456.37. Found: 1457.8 (M+H)$^+$.

Metathesis Product of Phenyl-Substituted Porphyrin (A-11d)

This compound was prepared from porphyrin A-9d (30 mg, 40 mmol) and Ru carbene complex (Grubbs catalyst A-10) (2 mg, 5 mmol) in CHCl$_3$ (15 mL) according to the procedure described for the preparation of A-11a. The thus obtained crude product was loaded on a silica gel column, eluting with CHCl$_3$/acetone (9:1) to give A-11d (28 mg, 95%).

(Note) As the compound A-11d has two olefin sites, there could theoretically exist three types of isomers (trans/trans, trans/cis and cis/cis) according to the olefin site of the compound. In $^1$H NMR, two types of isomers (the isomer ratio was 4:1) were observed. As these isomers cannot be separated with chromatography or the like, it is not clear whether the mixture is constituted of two of the three types of the isomers or of all three types of the isomers. The portion in NMR data at which the signal is separated to 1:4 was regarded as trans and cis, respectively, for convenience. Further, as the trans isomer is stable in terms of the energy state in a large cyclic compound as a ring having not less than 16 atoms, the main isomer as the product was regarded as trans. Ultraviolet-visible absorption spectrum and fluorescence spectrum of the sample as the mixture of these isomers were measured. In this case, as there is no difference in configuration of the two porphyrins, it is assumed that there is hardly any difference in electronic physical properties between the isomers in the mixture. $^1$H NMR (600 MHz, CDCl$_3$) δ 1.68 (trans & cis; s, 6H; NCH$_3$), 2.10 (trans & cis; br, 2H; CH (imidazole ring)), 3.65–3.78 (trans; m, 4Hx4/5; ester 3), 3.80–3.95 (trans; m, 4Hx4/5; ester 3), 3.87–3.90 (cis; m, 4Hx1/5; ester 3), 4.05–4.15 (cis; m, 4Hx1/5; ester β), 5.00 (trans; d, J=10.2 Hz, 4Hx4/5; O—CH$_2$—C=C), 5.06 (trans; d, J=10.2 Hz, 4Hx4/5; O—CH$_2$—C=C), 5.10 (cis; dd, J=6.0, 12 Hz, 4Hx1/5; O—CH$_2$—C=C), 5.19 (cis; dd, J=6.0, 12 Hz, 4Hx1/5; O—CH$_2$—C=C), 5.39 (cis; d, J=4.2 Hz, 4Hx1/5; Porβ4), 5.47 (trans; d, J=4.2 Hz, 4Hx4/5; Porβ4), 5.48 (trans & cis; br, CH (imidazole ring)), 5.42–5.58 (trans & cis; m, 8H; ester α), 6.40 (cis; t, J=6.0 Hz, 4Hx1/5; —CH=C), 6.47 (trans; br.s, 4Hx4/5; —CH=C), 7.77 (trans & cis; br.t, J=7.8 Hz, 2H; Ph), 7.87 (trans & cis; br.t, J=8.4 Hz, 2H; Ph), 7.95 (trans & cis; br.t, J=7.8 Hz, 2H; Ph), 8.01–8.15 (trans & cis; br, 2H; Ph), 8.65–8.74 (trans & cis; br, 2H; Ph), 8.97 (trans; d, J=4.2 Hz, 4Hx4/5; Porβ3), 8.99 (cis; d, J=4.2 Hz, 4Hx1/5; Porβ3), 9.07 (trans & cis; d, J=4.2 Hz, 4H; Porβ1), 9.58 (trans; d, J=4.2 Hz, 4Hx4/5; Porβ2), 9.61 (cis; d, J=4.2 Hz, 4Hx1/5; Porβ2); $^{13}$C NMR (150 MHz, CDCl$_3$) δ 31.4 (ester α), 32.7 (NCH$_3$), 43.2 (ester β), 58.9 (O—C—C=C; cis), 63.4 (O—C—C=C; trans), 117.3 (C), 118.0 (imidazole), 121.5 (imidazole), 126.2 (Ph), 126.6 (Ph), 127.4 (Ph), 127.5 (Porβ4), 128.0 (Porβ2), 128.7 (O—C—C=C; trans), 128.8 (O—C—C=C; cis), 129.8 (Porβ3), 132.8 (Porβ1), 134.6 (Ph), 134.7 (Ph), 143.8 (C), 148.0 (C), 148.1 (C), 149.5 (C), 149.6 (C), 150.6 (C), 172.4 (C=O; trans), 172.9 (C=O; cis); UV-Vis (CHCl$_3$) 617 (Abs.; 0.079), 565 (0.0124), 436 (0.0739), 413 (0.0722), nm; Fluorescence (EX=413 nm, CHCl$_3$): 676, 620 nm; MALDI-TOF MASS C$_{80}$H$_{64}$N$_{12}$O$_8$Zn$_2$ Calcd: 1448.36. Found: 1449.47 (M+H)$^+$.

Example 2

Corresponding to the Above-Mentioned Scheme 1

5,15-Bis(methoxycarbonylethyl)-10-(1'-trimethylsilylethynyl)-20-(1''-methyl-2''-imidazolyl)porphyrinatozinc (B-1)

To a solution of porphyrin A-6b (120 mg, 0.18 mmol) in CHCl$_3$ (15 mL), saturated zinc acetate solution in MeOH (5 mL) was added. After stirring at room temperature for 1 hr, water was added to the reaction mixture, and extracted with CHCl$_3$. The organic layer was washed with brine, dried over anhydrous Na$_2$SO$_4$, and evaporated under reduced pressure to give B-1 (130 mg, quant).

$^1$H NMR (600 MHz, CDCl$_3$) δ 0.74 (s, 9H; TMS), 1.65 (s, 3H; NCH$_3$), 1.98 (br.s, 1H; imidazole ring), 3.64–3.81 (m, 4H; ester β), 3.89 (s, 6H; COOMe), 5.42–5.53 (m, 7H; ester α & imidazole ring & Porβ4), 8.86 (d, J=5 Hz, 2H; Porβ3), 9.66 (d, J=5 Hz, 2H; Porβ1), 9.93 (d, J=5 Hz, 2H; Porβ2); $^{13}$C NMR (150 MHz, CDCl$_3$) δ 0.7 (TMS), 31.0 (ester α), 32.7 (NCH$_3$), 42.5 (ester β), 52.1 (COOMe), 98.7 (meso), 99.8 (TMS-C≡C—), 100.4 (TMS-C≡C—), 109.2 (meso), 118.4 (imidazole ring), 118.5 (meso), 121.9 (imidazole ring), 127.9 (Porβ4), 128.8 (Porβ1), 129.3 (Porβ3), 131.9 (Porβ2), 145.5 (Im N—C=N), 147.7 (Porα), 150.0 (Porα), 150.5 (Porα), 152.0 (Porα), 172.6 (C=O). UV-vis (CHCl$_3$): 635 (Abs. 0.0637), 575 (0.0413), 442 (0.6564), 423 (0.4793) nm; Fluorescence (Ex=440 nm, CHCl$_3$): 694, 634, (Ex=423 nm, CHCl$_3$): 696, 638 nm; MALDI-TOF MASS C$_{37}$H$_{36}$N$_6$O$_4$SiZn Calcd: 720.19. Found: 721.2 (M+H)$^+$.

5,15-Bis(methoxycarbonylethyl)-10-(ethynyl)-20-(1'-methyl-2'-imidazolyl) porphyrinatozinc (B-2)

To a solution of porphyrin B-1 (130 mg, 0.1–8 mmol) in CHCl$_3$ (15 mL) was added 1M etrabutylammonium fluoride (0.6 mL) in THF. After stirring for 30 min at room tempereture, the mixture was added by water and extracted with CHCl$_3$. The organic layer was dried over anhydrous Na$_2$SO$_4$, and evaporated under reduced pressure. The product gave B-2 (117 mg, quant).

$^1$H NMR (600 MHz, CDCl$_3$) δ 1.66 (s, 3H; NCH$_3$), 2.0 (d, J=1.2 Hz, 1H; imidazole ring), 3.61–3.82 (m, 4H; ester β), 3.90 (s, 6H; COOMe), 5.42–5.45 (m, 4H; ester α), 5.45 (d, J=4.2 Hz, 2H; Porβ4), 5.55 (d, J=1.2 Hz, 1H; imidazole ring), 8.87 (d, J=4.2 Hz, 2H; Porβ3), 9.67 (d, J=4.2 Hz, 2H; Porβ1), 9.95 (d, J=4.2 Hz, 2H; Porβ2); UV-Vis (CHCl$_3$): 632 (Abs. 0.0125), 576 (0.0087), 440 (0.1280), 422 (0.0874) nm; Fluorescence (EX=440 nm, CHCl$_3$): 694, 634, (EX=422 nm, CHCl$_3$): 691, 635 nm; MALDI-TOF MASS C$_{34}$H$_{28}$N$_6$O$_4$Zn Calcd: 648.15. Found: 649.12 (M+H)$^+$.

1,4-Bis[10{5',15'-Bis(methoxycarbonylethyl)-20'-(1"-methyl-2"-imidazolyl)porphyrinyl}]ethan-1,3-diyne (B-4)

Cuprous chloride (89 mg) was added to porphyrin B-2 (117 mg, 0.18 mmol) in pyridine (20 mL). The reaction solution was stirred for 1 hour at room temperature under oxygen gas bubbling. Thereafter, water was added to the reaction solution, and extracted with CHCl$_3$. The organic layer was washed with a saturated EDTA aqueous solution and dried over anhydrous Na$_2$SO$_4$, and then the solvent was evaporated under reduced pressure. An excessive amount of p-toluenesulphonic acid monohydrate was added to a CHCl$_3$ solution (10 mL) of the thus obtained crude product (porphyrin-bis structure B-3), and the mixture was stirred for 1 hour. Thereafter, an aqueous solution of saturated sodium hydrogencarbonate was added to the mixture. The mixture was then subjected to extraction with CHCl$_3$. The organic layer was dried over anhydrous Na$_2$SO$_4$, and then the solvent was evaporated under reduced pressure. The thus obtained crude product was loaded on a silica gel column, eluting with CHCl$_3$/methanol (9:1) to give B-4 (84 mg, 40%). MALDI-TOF MASS C$_{68}$H$_{58}$N$_{12}$O$_8$ Calcd: 1170.45. Found: 1171.33 (M+H)$^+$.

1,4-Bis[10{5',15'-Bis(allyloxycarbonylethyl)-20'-(1"-methyl-2"-imidazolyl)porphyrinyl}]ethan-1,3-diyne (B-5)

Porphyrin B-4 (80 mg, 68 μmol) and allyl alcohol (93 μL, 1.4 mmol) in toluene (1 mL) was stirred under N$_2$ atmosphere. Thereafter, the Sn catalyst A-7 (1 mg, 2 μmol) was added to the solution, and solution was refluxed for 4 hr at 120° C. The completion of the reaction was checked with MALDI-TOF MASS. Thereafter, water was added to the reaction solution, and extracted with CHCl$_3$. The organic layer was dried over anhydrous Na$_2$SO$_4$ and then the solvent was evaporated under reduced pressure to obtain crude product. The thus obtained crude product was loaded on a silica gel chromatography, eluting with CHCl$_3$/methanol (10:1), to give pure B-5 (64 mg, 80%). $^1$H NMR (600 MHz, CDCl$_3$) δ −2.82 (s, 4H; inner proton), 3.34 (br.s, 6H; NCH$_3$), 3.42–3.48 (m, 8H; ester β), 4.68–4.71 (m, 8H; O—CH$_2$—C=C), 4.94–5.08 (m, 8H; ester α), 5.23 (br.d, J=7.2 Hz, 4H; —C=CH$_2$), 5.34 (br.d, J=16.2 Hz, 4H; —C=CH$_2$), 5.90–5.98 (m, 4H; —CH=C), 7.52 (br, 2H; imidazole ring), 7.77 (br, 2H; imidazole ring), 8.72 (br, 4H; Porβ), 9.31 (br, 8H; β), 9.89 (br, 4H; Porβ); $^{13}$C NMR (150 MHz, CDCl$_3$) δ 30.5 (ester α), 34.6 (NCH$_3$), 41.8 (ester β), 65.6 (O—C—C=C), 118.6 (O—C—C=C), 121.6 (imdazole ring), 128.5 (Porβ), 128.9 (imidazole ring), 131.4 (Porβ), 132.1 (O—C—C=C), 144.5–148.2 (br, 4 carbons (Porα)), 148.3 (Im N—C=N), 172.2 (C=O); UV-Vis (CHCl$_3$): 709 (Abs.; 0.0537), 608 (0.0500), 474 (0.1542), 445 (0.2224), 433 (0.2186), 415 (0.2085) nm; Fluorescence (EX=474 nm, CHCl$_3$): 789, 715 nm; MALDI-TOF MASS C$_{76}$H$_{66}$N$_{12}$O$_8$ Calcd: 1274.51. Found: 1275.01 (M+H)$^+$.

Zn Form of B-5 (B 6)

Zinc acetate in saturated zinc acetate solution in MeOH (1 mL) was added to porphyrin B-5 (64 mg, 50 μmol) in chloroform (3 mL). The mixture was stirred for 1 hour at room temperature, water was added to the reaction solution, then extracted with CHCl$_3$. The organic layer was dried over anhydrous sodium sulfate and then the solvent was evaporated under reduced pressure to give B-6 (70 mg). UV-Vis (CHCl$_3$): 731 (Abs.; 0.0161), 669 (0.0063), 582 (0.0036), 501 (0.0296), 462 (0.0188), 429 (0.0171) nm; Fluorescence (EX 501 nm, CHCl$_3$): 817, 740 nm; MALDI-TOF MASS C$_{76}$H$_{62}$N$_{12}$O$_8$Zn$_2$ Calcd: 1398.34. Found: 1399.21 (M+H)$^+$.

B-7

Figure 2:
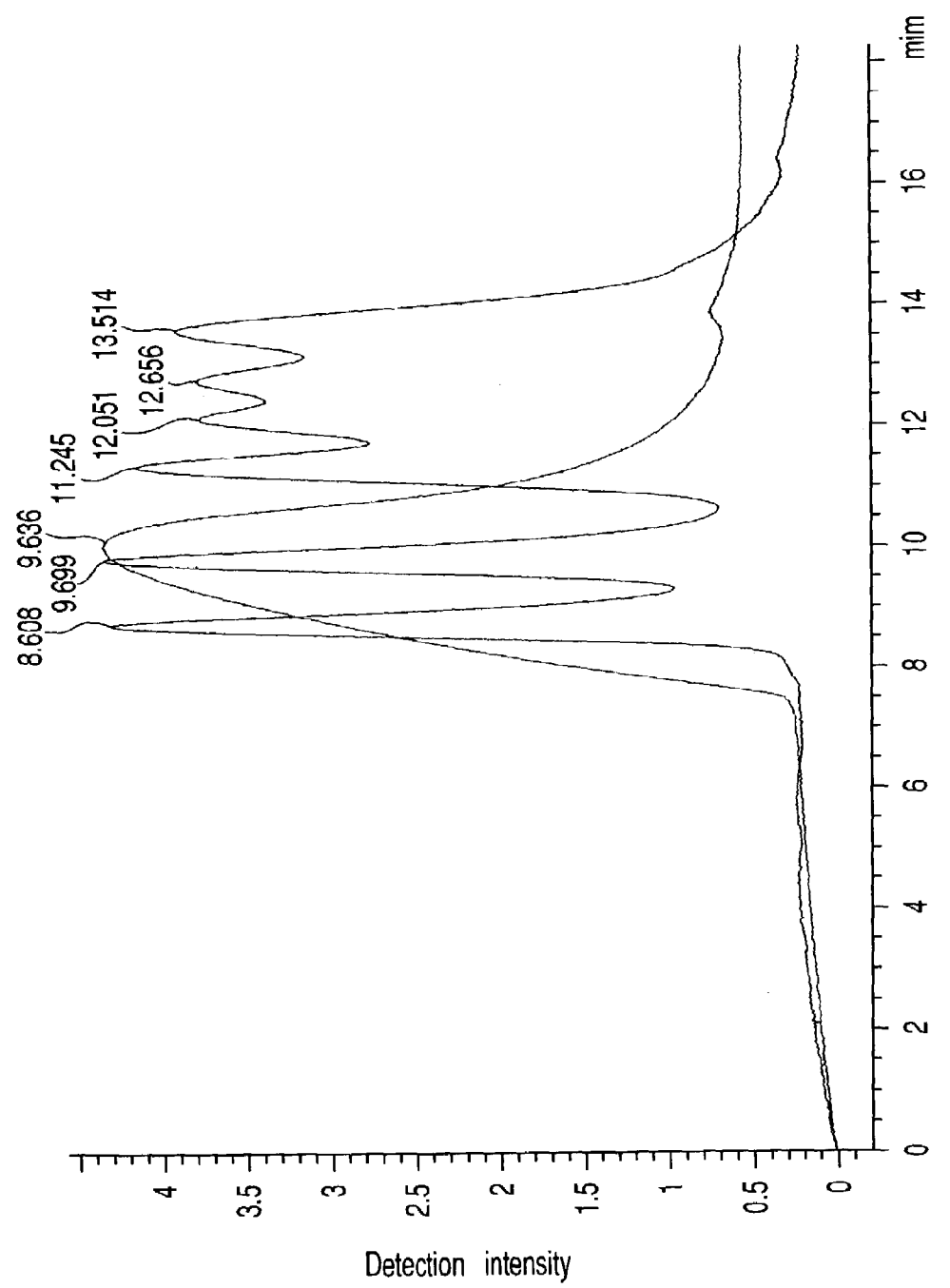
FIG. 2 shows GPC chromatogram of the compound B-7 (Column: JAIGEL-2.5HA manufactured by Japan Analytical Industry Co., Ltd., Eluent: chloroform, Flow rate: 1.2 mL/min). In the graph, the broad peak (the maximum peak at 9.6 min.) represents the result of the compound B-7. The sharp peaks observed at the retention time of 8.6 min. (molecular weight: 44,000), of 9.6 min. (MW: 21,000), of 11.2 min. (MW: 7,000), of 12.0 minutes (MW: 3,790), of 12.6 min. (MW: 2,090), and of 13.5 min. (MW: 920), respectively, are shown in a manner that the result obtained by analyzing the polystyrene reference material in the same condition is overlapped thereon.
Figure 3:
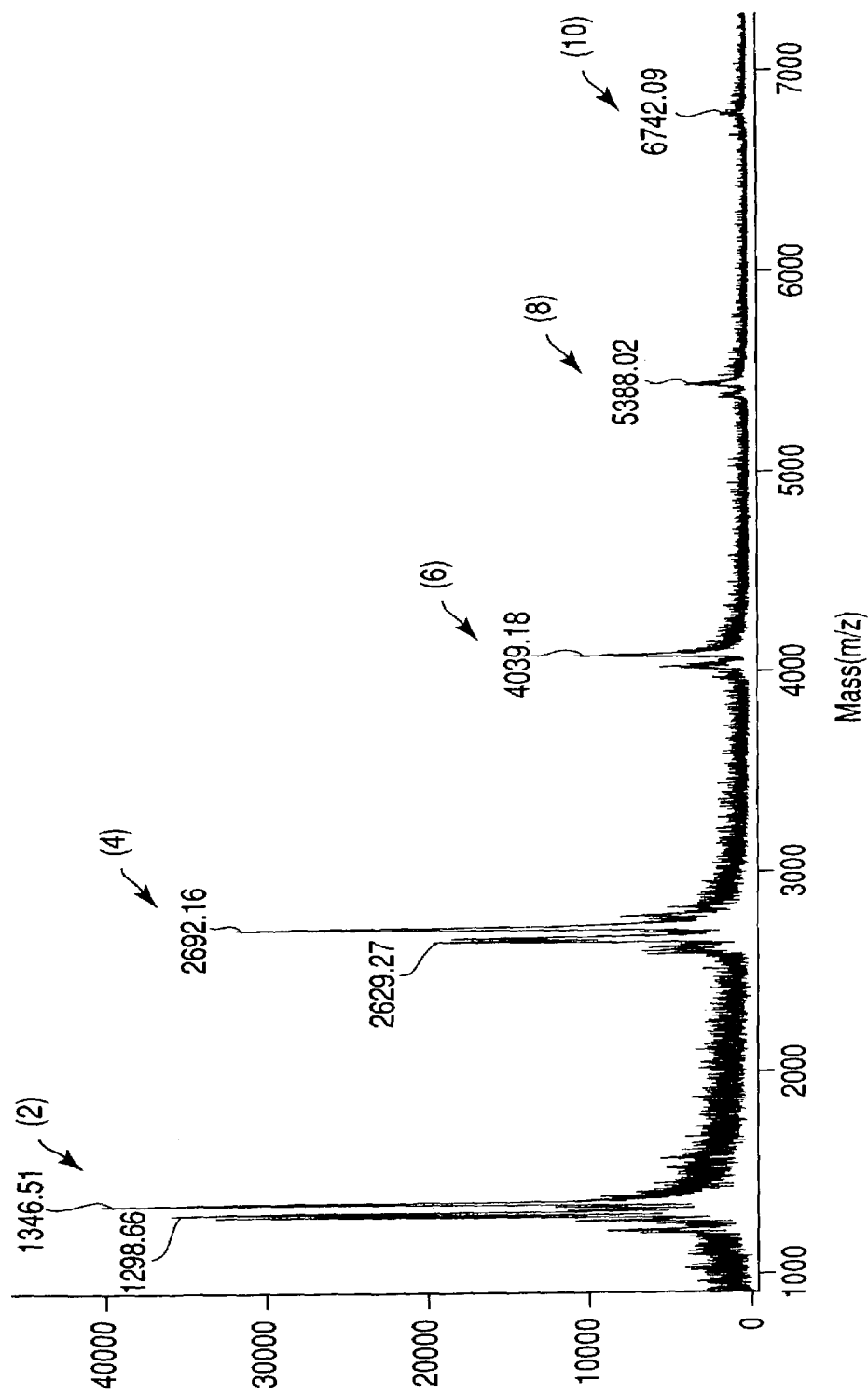
FIG. 3 shows MALDI-TOF mass spectrometry spectrum (matrix: dithranol) of the compound B-7. In the graph, the molecular weight-peaks at 1,346, 2,698, 4,039, 5,388 and 6,742 correspond to fragment peaks of porphyrin unit number 2, 4, 6, 8, and 10, respectively, at which carbon-carbon triple bond of polyacetylene has been cut in the measurement condition.

Zinc porphyrin B-6 (70 mg, 50 μmol) in CHCl$_3$ (2 mL) was stirred under N$_2$ atmosphere. Thereafter, the ruthenium carbene complex (1 mg, 10 μmol) was added to the solution. The reaction solution was stirred for 3 hours at room temperature, water was added to the reaction solution, and then extraction with CHCl$_3$. The organic layer was dried over anhydrous sodium sulfate and then the solvent was evaporated under reduced pressure. The thus obtained crude product was loaded on a silica gel column, eluting with CHCl$_3$/methanol (9:1) to fixed give B-7 (54 mg). The obtained B-7 was analyzed by using a size exclusion column chromatography (JAIGEL-2.5HA), and the chromatogram shown in FIG. 2 was obtained. As a result of comparison with the polystyrene reference substance, it was confirmed that a polymer which exhibits the distribution maximum of the molecular weight thereof in the vicinity of 20,000 had been generated. The result of the MALDI-TOF MASS spectrometry of B-7 is shown in FIG. 3. In the compound B-7, the carbon-carbon bond cleavage reaction occurs at the bis-acetylene site thereof during the measurement of mass spectroscopy, and thus peaks are observed at the molecular weights which correspond to multiples of the porphyrin unit. The largest value of the molecular weights indicated by these peaks reaches or exceed 6000. The peak in the vicinity of the molecular weight of 6742 corresponds to the porphyrin decamer. On the contrary, no peaks which correspond to the fragments whose molecular weight is 2000 or more were observed in the compound B-6 which had not been subjected to fixation. From these results, it is apparent that stability of the polymer has been significantly enhanced by fixation. Further, from the measurement result of ultraviolet-visible absorption spectrum of the compound B-7 in pyridine, it was confirmed that the configuration structure of the compound was maintained.

Figure 4:
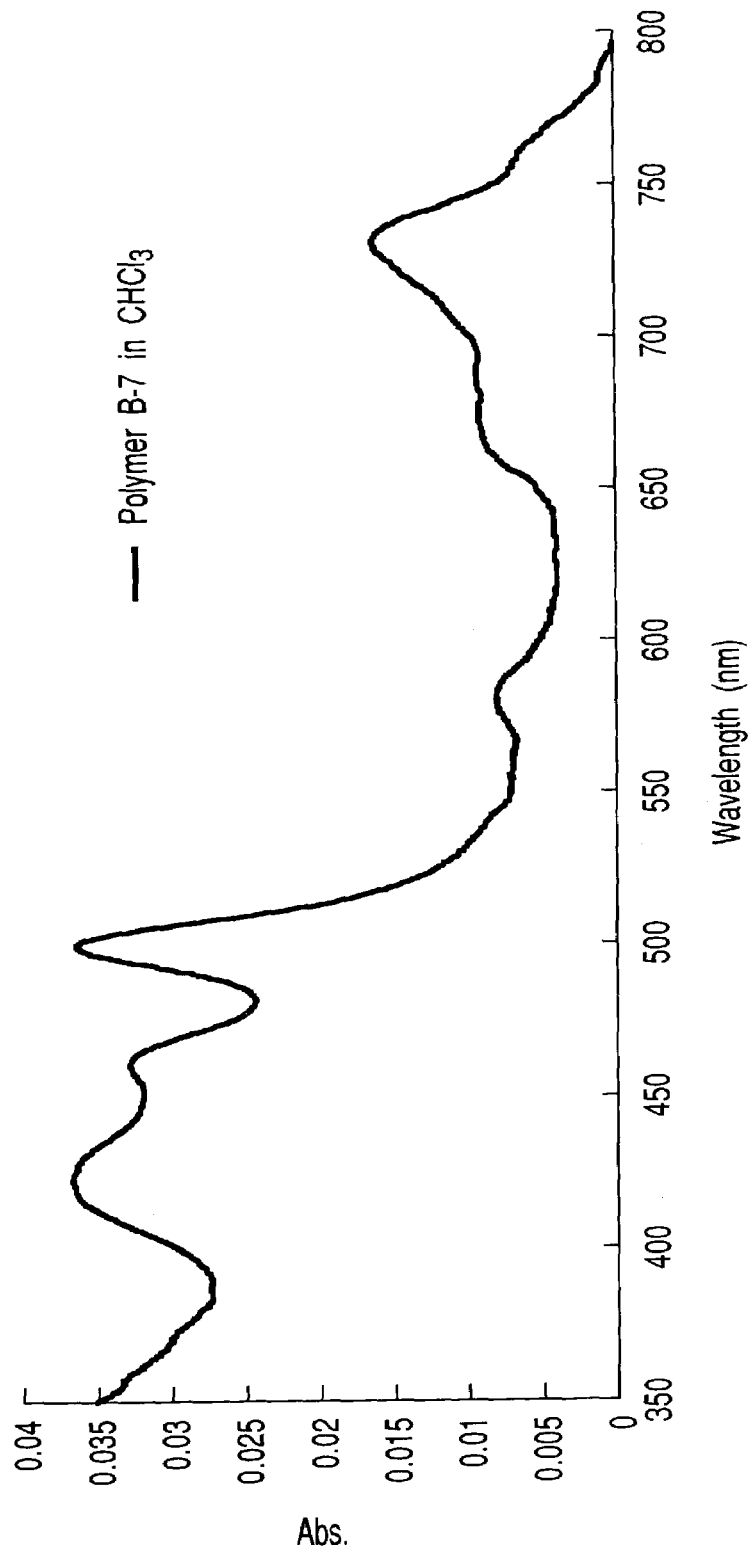
FIG. 4 shows ultraviolet-visible absorption spectrum of the polymer B-7 (Solvent: chloroform)
Figure 5:
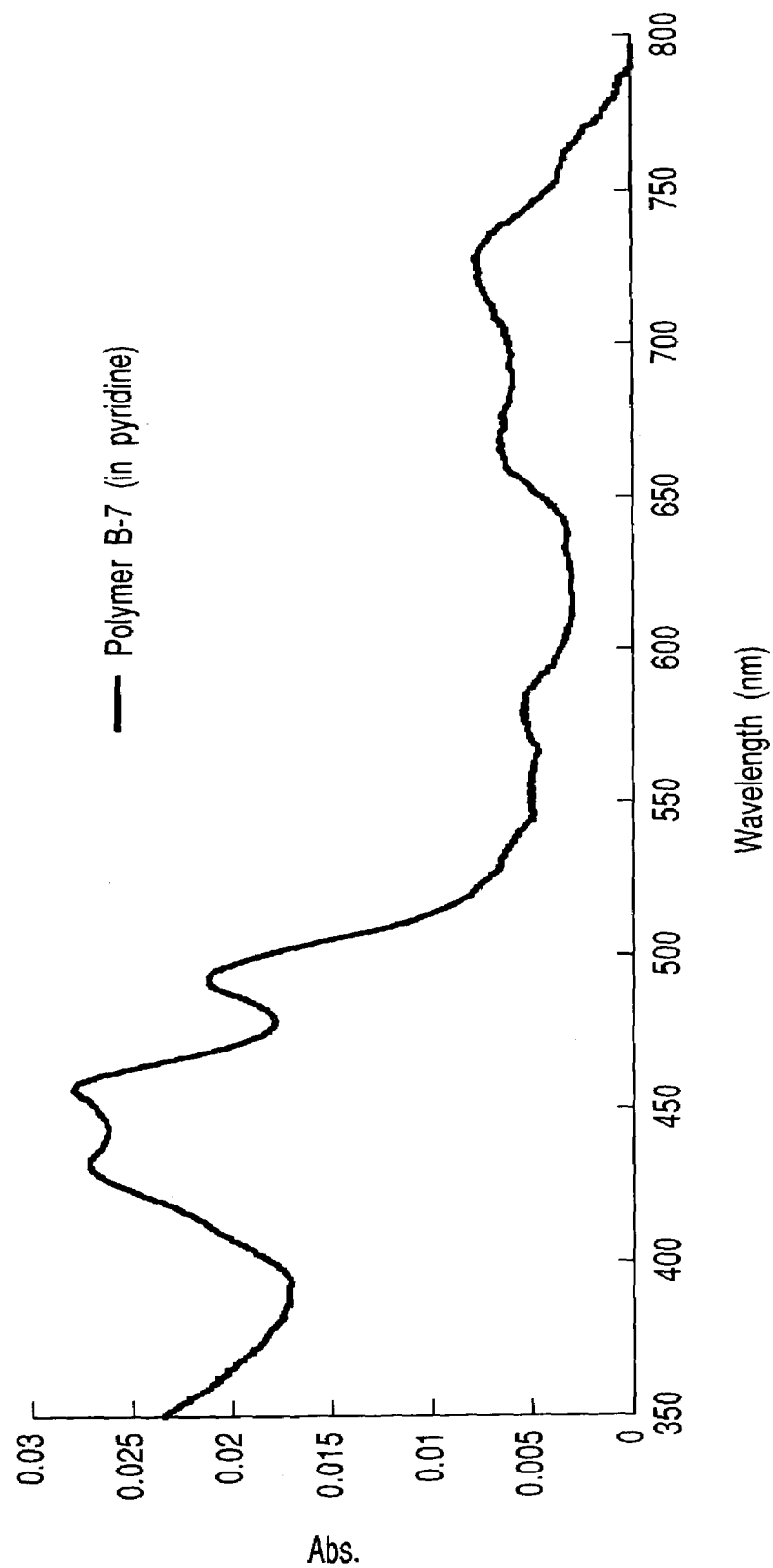
FIG. 5 shows ultraviolet-visible absorption spectrum of the polymer B-7 (Solvent: pyridine)
Figure 6:
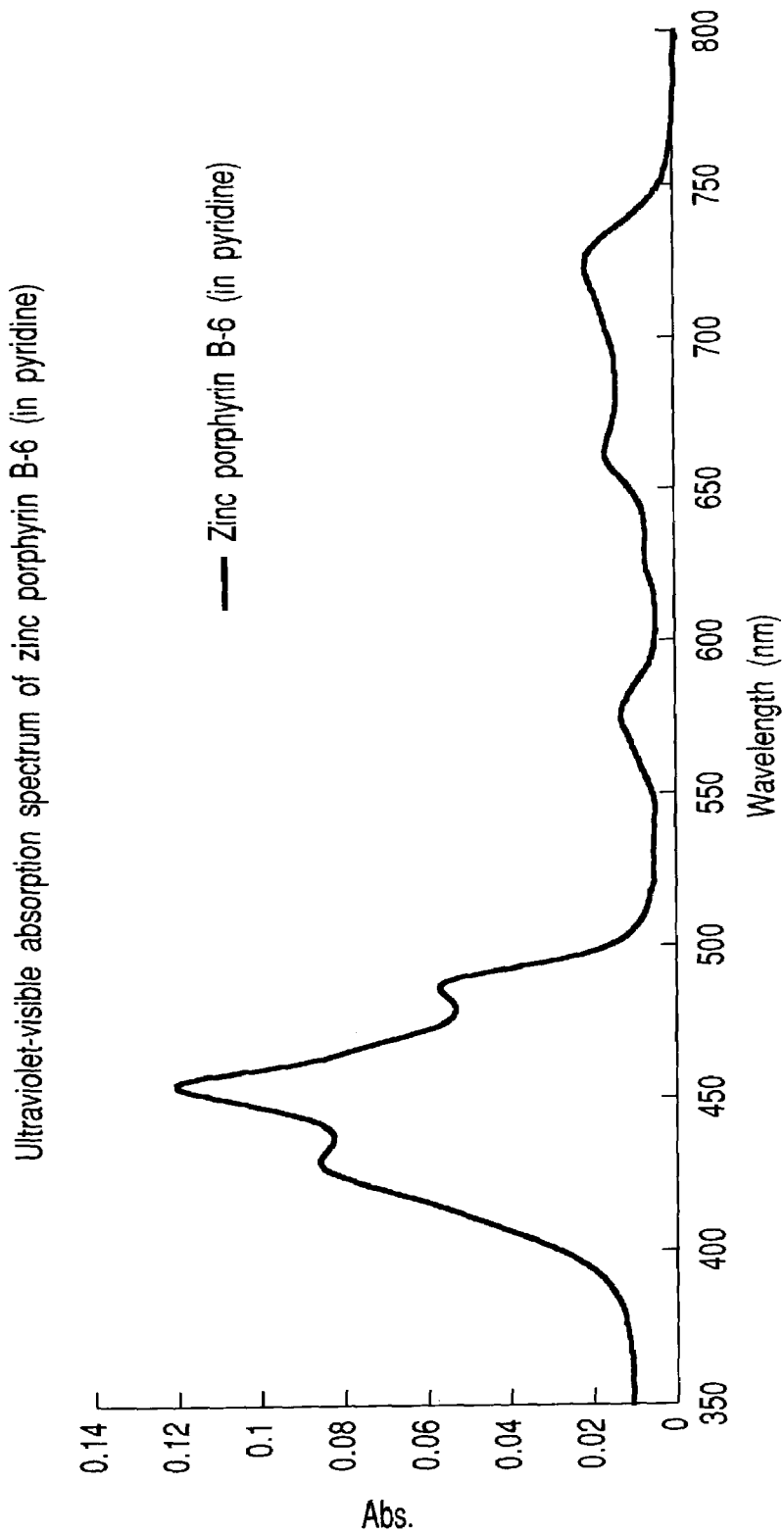
FIG. 6 shows ultraviolet-visible absorption spectrum of the zinc porphyrin B-6 (Solvent: pyridine)

FIG. 4 shows the ultraviolet-visible absorption spectrum (UV-Vis spectrum), in chloroform, of the polymer B-7 which has been subjected to fixation. FIG. 5 shows the ultraviolet-visible absorption spectrum, in pyridine, of the polymer B-7 which has been subjected to fixation. FIG. 6 shows the ultraviolet-visible absorption spectrum (UV-Vis spectrum), in pyridine, of the polymer B-6 which has not been subjected to fixation. The data of zinc porphyrin B-6 which has not been subjected to fixation shows that B-6 is completely dissociated to monomers in pyridine, and the large absorption peak at 453 nm in FIG. 6 is a peak which is characteristic to such a monomer. On the contrary, in the spectrum data of the polymer B-7 which has been subjected to fixation, the peak thereof corresponding to the large absorption peak of B-6, observed in pyridine solvent, is not large (refer to FIG. 5) but rather similar to the corresponding peak in the spectrum observed in chloroform solvent (refer to FIG. 4). This result indicates that the fixed polymer of the present invention exists with remaining the polymer structure thereof even in a polar solvent. Therefore, it is now possible, according to the present invention, to provide a sample of a porphyrin polymer that allows evaluation of function in a polar environment. GPC(CHCl$_3$, flow rate: 1.25 mL/h, detected 459.82 nm) 9.936 min; UV-Vis (CHCl$_3$): 731 (Abs.; 0.0163), 581 (0.0081), 500 (0.0364), 460 (0.0328), 427 (0.0368); (pyridine): 727 (0.0078), 665 (0.0066), 579 (0.0055), 492 (0.0212), 456 (0.0280), 433 (0.0272) nm; Fluorescence (EX=501 nm, CHCl$_3$): 817, 740 nm; MALDI-TOF MASS Calcd.: 1346 (monomer), 2692 (dimer), 4038 (trimer), 5384 (tetramer), 6730 (pentamer). Found: 1346, 2692, 4039, 5388, 6742.

Example 3

Corresponding the Above-Mentioned Scheme 2

H2-Pre-Gable C-1

5-(N-methylimidazol-2-yl)-10,15-bis(methoxycarbonylethyl)-20-(3-formylphenyl)-porphyrin N-Methylimidaol-2-carboxaldehyde (0.9 g, 8.18 mmol), meso-(methoxycarbonylethyl) dipyrromethane A-4 (4.0 g, 17.23 mmol) and isophtalaldehyde (1.15 g, 8.61 mmol) were dissolved in chloroform (1.7 L) in a 2 L round-bottomed flask. After purged with N$_2$ for 10 min, TFA (5.97 mL, 77.5 mmol) was added slowly and the reaction mixture was stirred at room temperature under dark. After 5 hrs, triethylamine (11.8 mL, 77.5 mmol) and p-chloranil (4.76 g, 19.38 mmol) were added successively, and the reaction mixture was stirred over night. The crude mixture was concentrated with ca. 20 g of silica gel to give black powder that was loaded on a silica gel column chromatography eluted with chloroform to chloroform/acetone (1:2). The second red band was collected and recrystallized from chloroform/hexane to give purple powder of target compound (140 mg, 2.4%). $^1$H NMR (CDCl$_3$, 600 MHz) δ 10.34, 10.33 (each s, 2H, CHO, split due to atropisomers), 9.51, 9.47, 8.83 and 8.80 (each d, J=4.86 and 5.40, 8H), 8.72, 8.63 (each s, 1H, phenyl-H$_2$), 8.49, 8.39 (each d, J=7.2 Hz, 1H, phenyl-H$_6$), 8.37 (d, J=7.2 Hz, 1H, phenyl-H$_3$), 7.97 (m, 1H, phenyl-H$_5$), 7.69 (s, 1H, imidazole-H$_4$), 7.50 (s, 1H, imidazole-H$_5$), 5.34 (t, J=8.4 Hz, 4H, α-CH$_2$), 3.75 (each s, 6H, COOMe), 3.51 (t, J=8.4 Hz, 4H, β-CH$_2$), 3.43, 3.42 (each s, 3H, N-Me), −2.74 (s, 2H, inner-NH). MALDI-TOF MASS (dithranol): m/z=667.64 (cald. 666.26), UV-Vis (CHCl$_3$; λ$_{max}$, nm (relative intensity)): 418.0 (1.00), 515.0(0.063), 549.5(0.023), 592.0(0.020), 648.5(0.010). Fluorescence, λ$_{ex}$=418.0 nm, (CHCl$_3$, λmax, nm(relative intensity)): 652.8(1.00), 718.4 (0.41).

H2-COOMeGable C-2

Pre-gable porphyrin C-1 (30 mg, 0.045 mmol) and meso-(methoxycarbonylethyl)dipyrromethane (52.2 mg, 0.23 mmol) were dissolved in chloroform (23 mL) in a 100 mL round-bottomed flask. After purged with N$_2$ for 5 min, TFA (27.7 μL, 0.036 mmol) was added and the reaction mixture was stirred at room temperature under dark. After 11 hrs, N-methylimidazol-2-carboxaldehyde dissolved in chloroform (0.5 mL) was added to the reaction mixture and stirred further 6 hrs followed by addition of DDQ (2,3-dicyano-5,6-dichlorobenzoquinone) (40.8 mg, 0.18 mmol). After stirred for 1 night, methanol (ca. 5 mL) was added to the reaction mixture to dissolve precipitate and washed with saturated NaHCO$_3$ aq. and water. Organic layer was dried over anhydrous Na$_2$SO$_4$ and evaporated under reduced pressure. Crude products were dissolved in chloroform followed by filtration through celite pad, and then passed through a pad of silica gell (3×3 cm) eluted with acetone until eluting solution became clear. The solvent was removed under reduced pressure to give a brownish red solid which was dissolved in chloroform/methanol (10/1) and purified by recycling GPC system (Column: TOSOH G2500HHR, chloroform/methanol=10/1). Removal of the solvent under vacuum gave a purple solid (53 mg, 22%) $^1$H NMR (CDCl$_3$, 600 MHz) δ 9.62 and 9.39 (each m, 4Hx2, pyrrole-H$_β$), 9.46 (br, 4H, pyrrole-H$_β$), 9.21, 9.03 and 8.88 (each s, 1H, phenyl-H$_2$), 8.78 (br, 4H, pyrrole-H$_β$), 8.69, 8.57 (d, J=7.2 Hz 1H, phenyl-H$_{4(6)}$), 8.19(m, 1H, phenyl-H$_5$), 7.69(m, 2H, imidazole-H$_4$), 7.49 and 7.47(each s, 2H, imidazole-H$_5$), 5.33 (m, 8H, α-CH$_2$), 3.747 (s, 12H, COOMe), 3.50(m, 8H, β-CH$_2$), 3.40 and 3.33(each s, 6H, N-methyl), −2.72(s, 4H, inner-NH). MALDI-TOF MASS (dithranol): m/z=1200.29 (cald. 1199.48). UV-Vis (CHCl$_3$; λ$_{max}$, nm (relative intensity)): 413.5 (1.000), 429.0(0.940), 515.5 (0.096), 550.0 (0.035), 590.5(0.026), 649.0(0.018). Fluorescence, λ$_{ex}$=413.0 nm, (CHCl$_3$, λmax, nm (relative intensity)): 653.5 (1.00), 717.6(0.48).

H2-AllylGable C-3

5-(1-Methylimidazol-2-yl)-10,20-bis(ethyleneoxycarbonylethyl)-15-[3-(5-(1-methylimidazol-2-yl)-10,20-bis(ethyleneoxycarbonylethyl)porphyrin-15-yl)phenyl]porphyrin H2-AllylGable C-3

21.2 mg (17.7 μmol) of H2-COOMeGable porphyrin C-2 was dissolved in 12 mL of a toluene/allylalcohol (1:1) mixture solution. 9 mg (17.7 μmol) of the Sn catalyst A-7, which had been synthesized for use according to the method of Otera et al. (Junzo Otera, Nobuhisa Dan-oh, Hitoshi Nozaki, J. Org. Chem. 1991, 56, 5307–5311) was added to the solution, and the mixture was refluxed for 12 hours. Thereafter, the organic layer was washed with water. The product was then purified with silica gel chromatography (Development solution: Chloroform/Methanol=10:1), whereby 18.3 mg of purple solid C-3 was obtained (79%).

$^1$H NMR (CDCl$_3$, 600 MHz) δ 9.64 and 9.50 (br. s, 4H, pyrrole-H$_β$), 9.40(m, 4H, pyrrole-H$_β$), 9.18, 9.03 and 8.92 (each s, 1H, phenyl-H$_2$, split due to atropisomerization), 8.81(br. s, pyrrole-H$_β$), 8.68(br, 1H, phenyl-H$_{4(6)}$), 8.58(d, J=7.2 Hz, 1H, phenyl-H$_{4(6)}$), 8.18(m, 1H, phenyl-H$_5$), 7.68 (br. s, 2H, imidazole-H$_4$), 7.49 and 7.47(each s, 2H, imidazole-H$_5$), 5.90(m, 4H, —CH═C), 5.37(m, 4H, α-CH$_2$), 5.30(d, J=13.8 Hz, Htrans in ethylene), 5.19(d, J=10.8 Hz, H$_{cis}$ in ethylene), 4.69(s, 8H, OCH$_2$), 3.55(m, 8H, β-CH$_2$), 3.42 and 3.37 (each s, 6H, N-methyl), −2.67(s, 4H, inner-NH). MALDI-TOF MASS (dithranol): m/z=1304.51 [M+1]$^+$, (cald. 1303.47)

UV-Vis (CHCl$_3$; λ$_{max}$, nm (relative intensity)): 414.5 (1.000), 428.5(0.885), 516.0(0.103), 551.0(0.045), 591.0 (0.034), 649.0(0.021). Fluorescence, λ$_{ex}$=414.0 nm, (CHCl$_3$, λmax, nm (relative intensity)): 654 (1.00), 718.8(0.36)

Zinc(II)-5-(1-methylimidazol-2-yl)-10,20-bis(ethyl-eneoxycarbonylethyl)-15-[3-(zinc(II)-5-(1-methylimidazol-2-yl)-10,20-bis(ethyleneoxycarbonylethyl)porphyrin-15-yl)phenyl]porphyrin Zn-Allylgable C-4

22.7 mg ($1.74 \times 10^{-5}$ mol) of H2-AllylGable porphyrin C-3 was dissolved in 8 mL of chloroform. 38 mg ($1.74 \times 10^{-4}$ mol) of zinc acetate dihydrate dissolved in 1 mL of methanol was added to the mixture, and the mixture was stirred for 12 hours at room temperature. Thereafter, the organic layer was washed with water and dried to obtain desired zinc complex C-4 (24.5 mg) quantitatively.

MALDI-TOF MASS (dithranol): m/z=1431.75 [M+1]$^+$, (cald. 1430.21)

UV-Vis (CHCl$_3$; $\lambda_{max}$, nm (relative intensity)): 411.0 (1.000), 447.0(0.913), 567.0(0.138), 618.0(0.072). Fluorescence, $\lambda_{ex}$=411.0 nm, (CHCl$_3$, λmax, nm(relative intensity)): 622.5(1.00), 669.0(0.29)

Zn-Allylgable C-5 (re-orgainzation)

Figure 7:
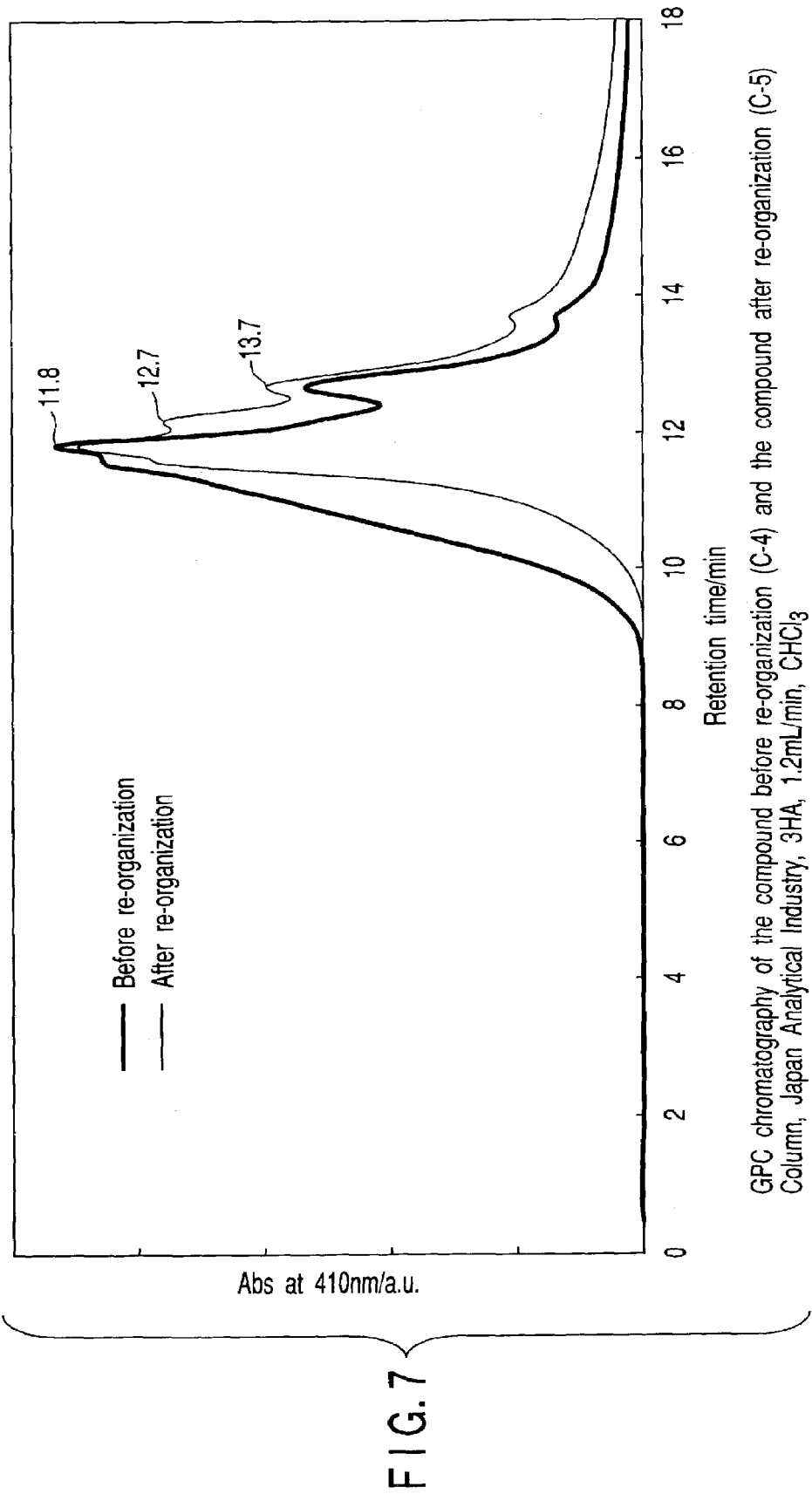
FIG. 7 shows GPC chromatograms of the polymer C-5 before and after re-organization (Column: JAIGEL-3HA manufactured by Japan Analytical Industry Co., Ltd., Eluent: chloroform, Flow rate: 1.2 mL/min). In the graph, the thick line and solid line present the result obtained from the sample before and after re-organization. That is, the halfband width of chromatography representing the sample after re-organization is narrower than that of before re-organization.

24.5 mg ($1.74 \times 10^{-5}$ mol) of Zn-AllylGable porphyrin C-4 was dissolved in a solvent prepared by mixing 45 mL of chloroform and 45 mL of methanol. The reaction solution was stirred for 5 minutes. The solvent was then slowly evaporated by using an evaporator, whereby 24.5 mg of the mixture whose main components were cyclic Zn-AllylGable porphyrin C-5a and Zn-AllylGable porphyrin C-5b. The result of GPC analysis of C-4 which has not been re-structured, and the result of GPC analysis of the mixture whose main components are C-5 compounds which have been re-structured, are shown in FIG. 7.

Cyclic-Zngable C-6a, C-6b 7.4 mg (5.18 μmol) of Zn-Allylgable, 10 mL of chloroform, and 4.3 mg (5.1 mmol) of Grubbs catalyst A-10 (Fluka 09587, Benzylidene-bis(tricyclohexylphosphine)-dichlororuthenium, was purchased and used) were charged in a 20 mL flask. The mixture was stirred for 12 hours under nitrogen atmosphere. Thereafter, the solvent was evaporated under reduced pressure. The product was purified with column chromatography (Development solvent: Chloroform/Methanol=10:1) and GPC chromatography (Column: TOSOH G3000HHR, Eluent: Chloroform/Methanol=10:1), whereby a cyclic porphyrin pentamer C-6a and a cyclic porphyrin hexamer C-6b were obtained, respectively, as a result of the purification.

Figure 8:
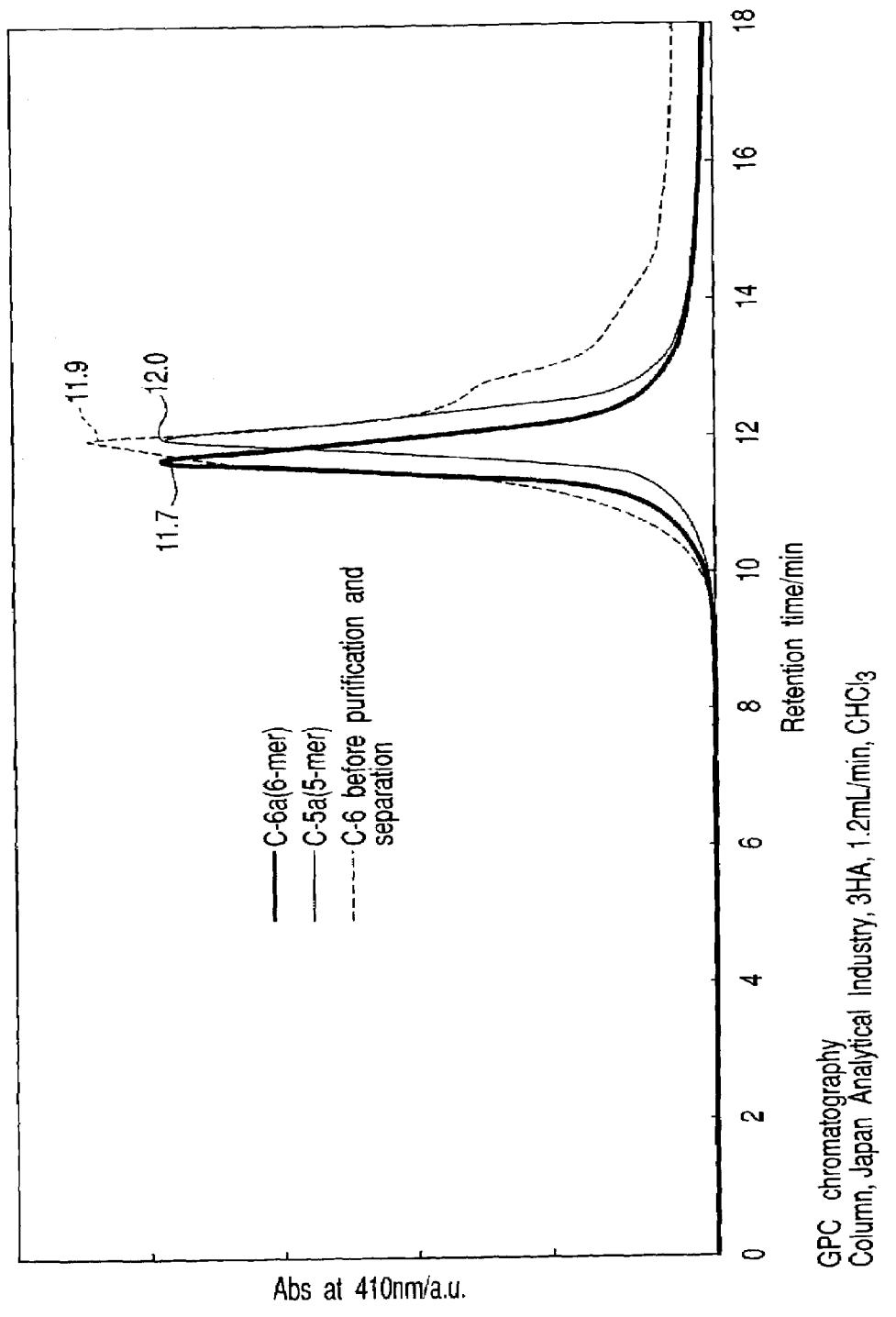
FIG. 8 shows results of GPC chromatograms of the polymer C-6a and the polymer C-6b that were separation-purified after the metathesis reaction (Column: JAIGEL-3HA manufactured by Japan Analytical Industry Co., Ltd., Eluent: chloroform, Flow rate: 1.2 mL/min). In the graph, the thick line, solid line and dotted line represent C-6a (hexamer), C-6b (pentamer) and the sample before being separation-purified, respectively.

The result of GPC chromatography analysis of the mixture whose main components were C-6a and C-6b (i.e., the cyclic porphyrin polymers which had not been purified), and the result of GPC chromatography analysis of each of C-6a and C-6b which has been purified and separated from each other, are shown in FIG. 8.

Figure 9:
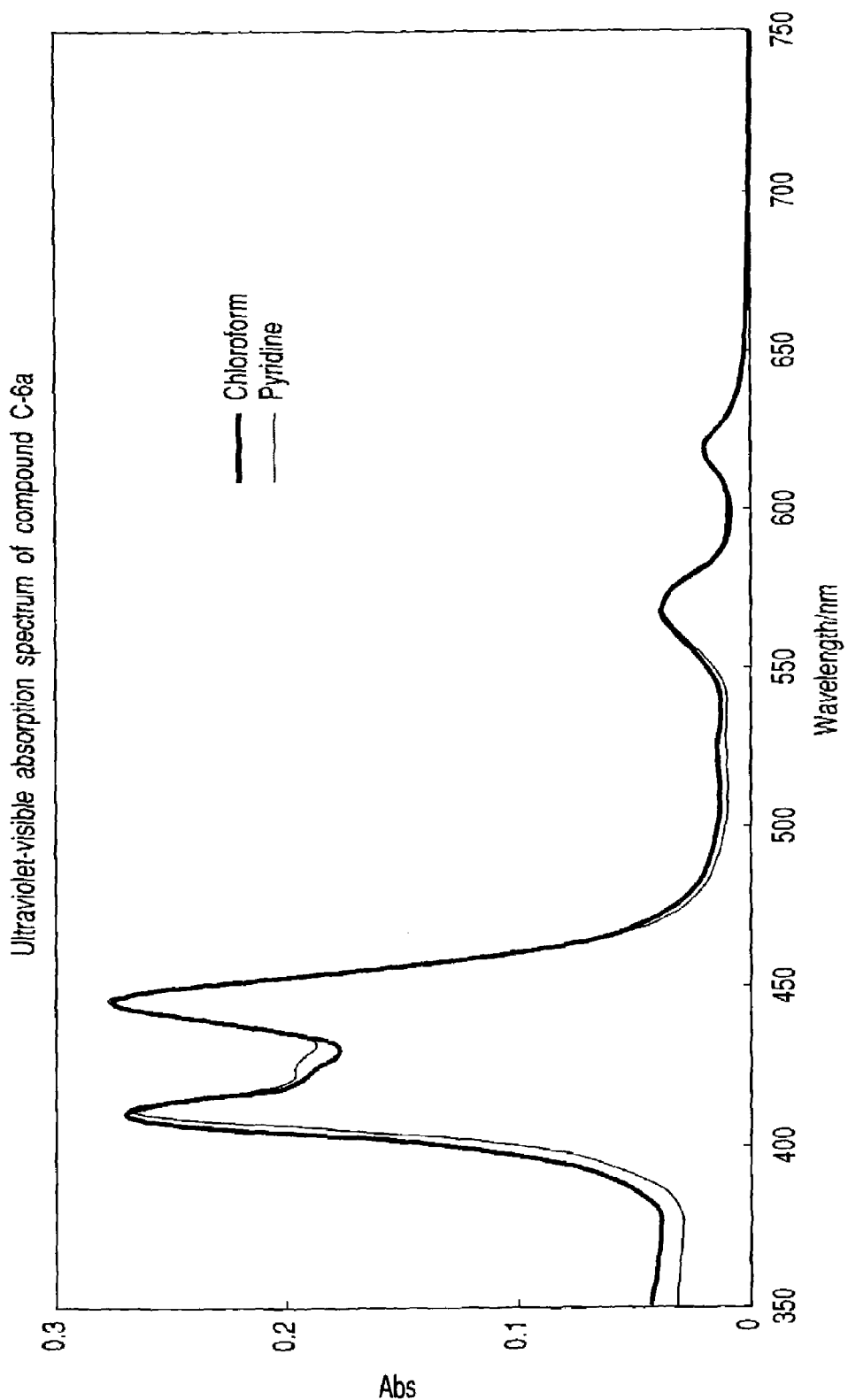
FIG. 9 shows ultraviolet-visible absorption spectra of the compound C-6a. In the graph, the thick line and solid line present the case using chloroform and pyridine, respectively, as a solvent.
Figure 10:
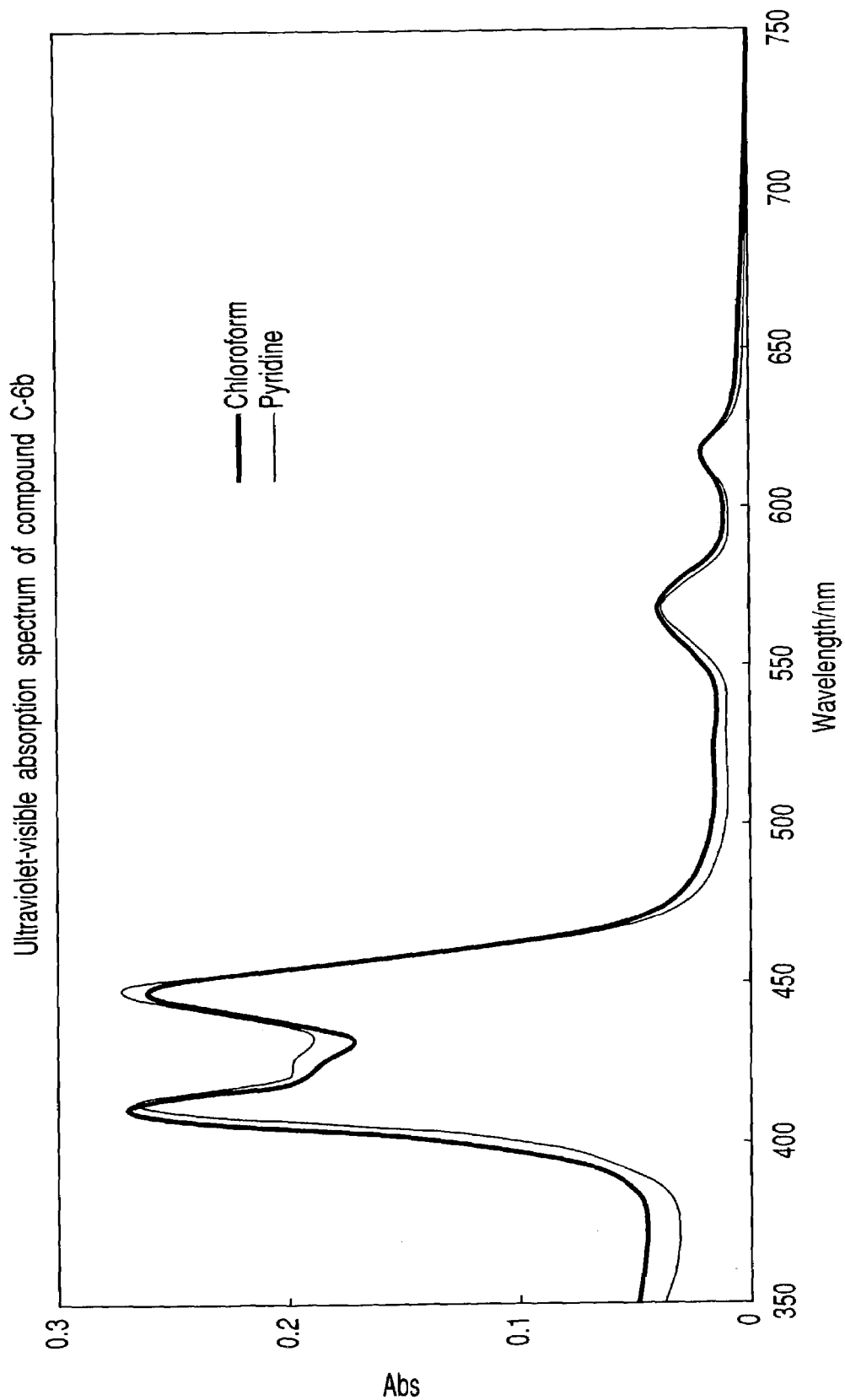
FIG. 10 shows ultraviolet-visible absorption spectra of the compound C-6b. In the graph, the thick line and solid line represent the case using chloroform and pyridine, respectively, as a solvent.

FIG. 9 shows the ultraviolet-visible absorption spectrum of the cyclic pentamer C-6a in chloroform and pyridine, respectively. FIG. 10 shows the ultraviolet-visible absorption spectrum of the cyclic hexamer C-6b in chloroform and pyridine, respectively. It is understood from FIGS. 9 and 10 that the cyclic pentamer C-6a and the cyclic hexamer C-6b which have been subjected to fixation can maintain the cyclic structure thereof in a stable manner even in a polar solvent such as pyridine.

Figure 11:
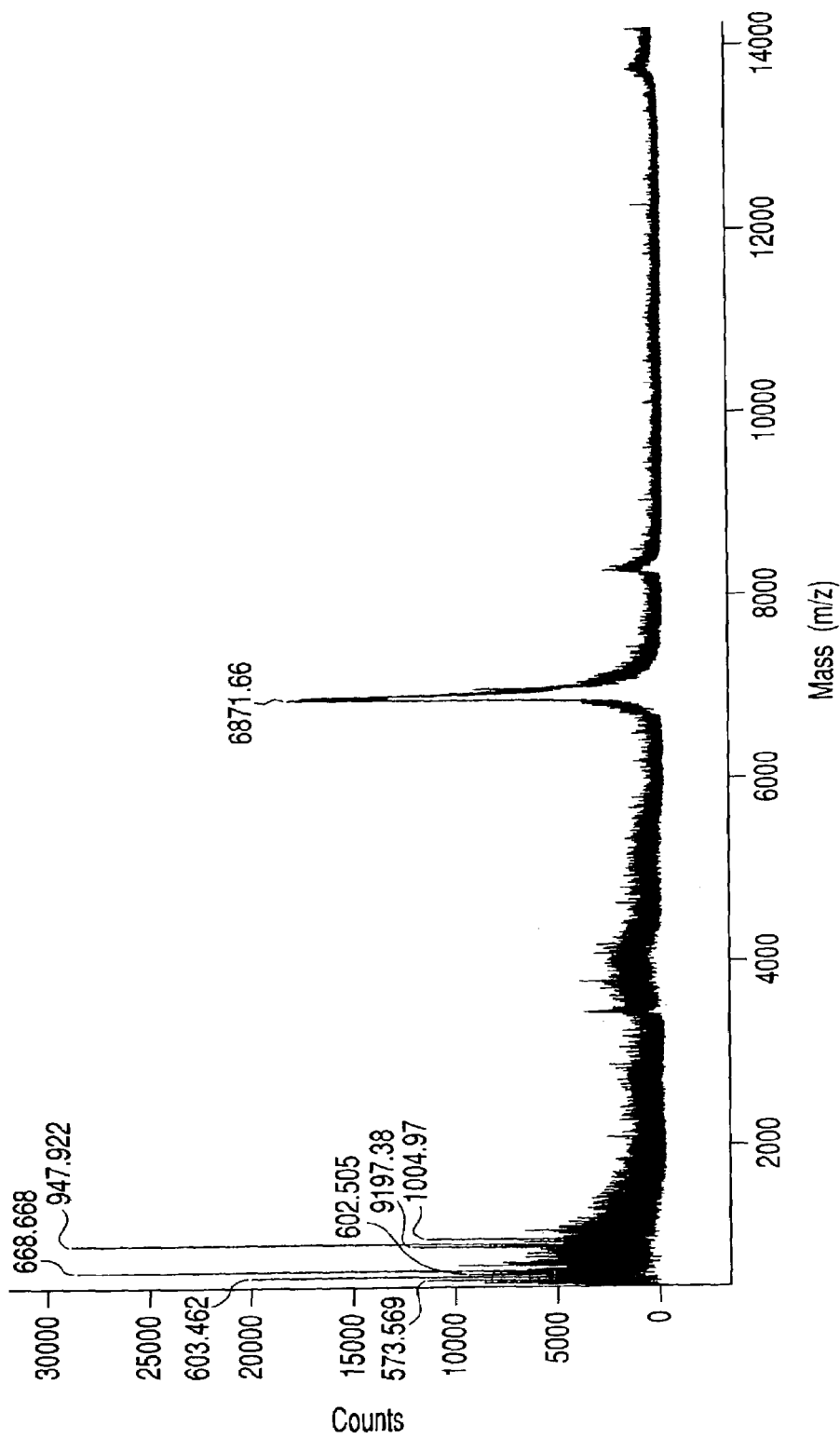
Figure 12:
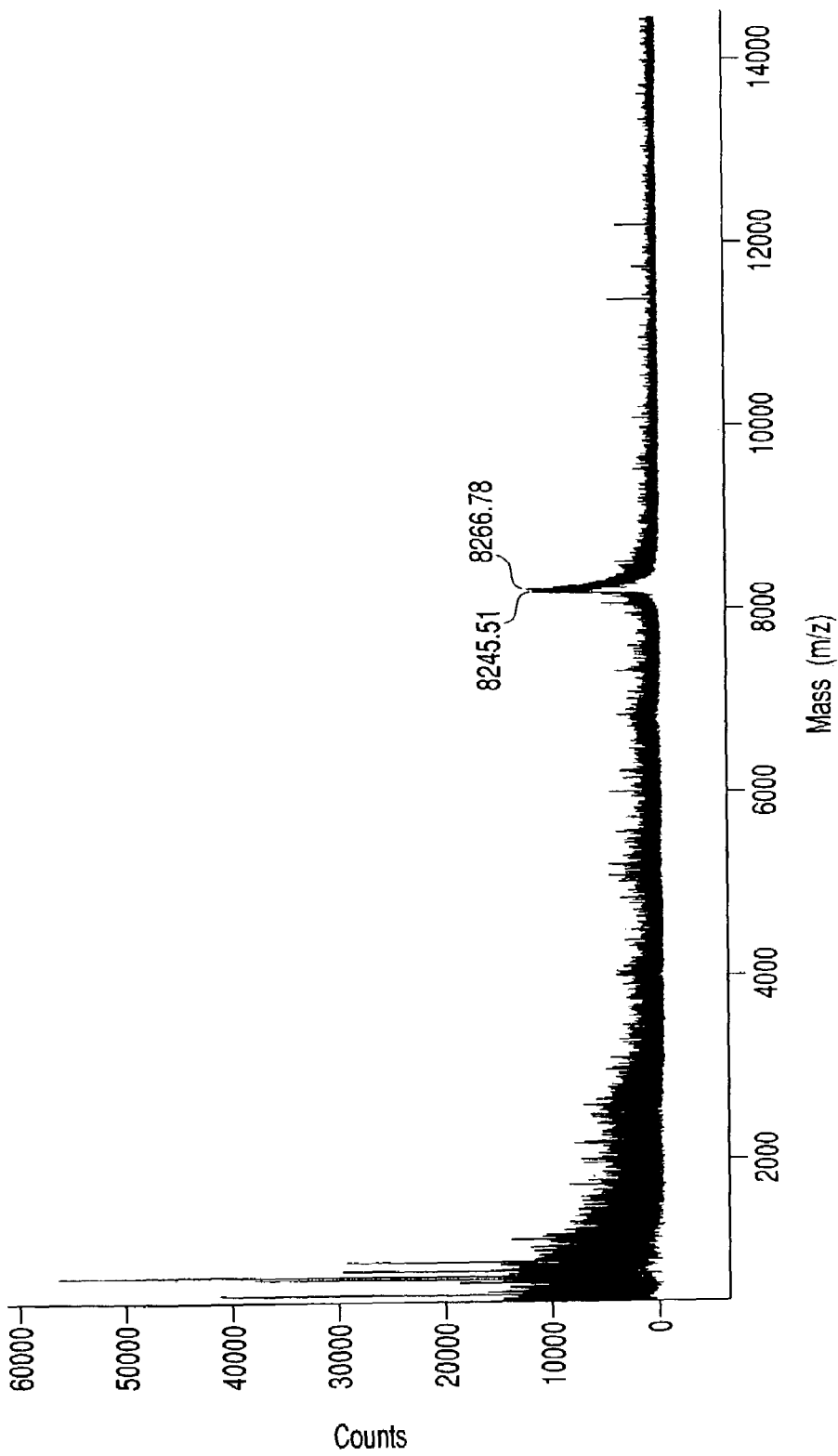
FIG. 12 shows MALDI-TOF mass spectrometry spectrum (matrix: dithranol) of the compound C-6b.

FIGS. 11 and 12 show the mass spectroscopy spectrum of the cyclic polymer C-6a and the mass spectroscopy spectrum of the cyclic polymer C-6b, respectively, which C-6a and C-6b have been subjected to fixation. A cyclic polymer formed by way of coordinate bond is likely to cause dissociation in a mass spectrometer, and thereby fails to give a signal corresponding to the molecular weight of the polymer. On the contrary, in the cyclic polymers C-6a and C-6b which have been subjected to fixation, the presence of a porphyrin decamer (MW: 6870.5) and the presence of a porphyrin dodecamer (MW: 8245.5) were clearly observed. That is, in the present invention, the stability of a polphyrin polymer has been remarkably enhanced.

5-mer C-6a 1.0 mg (14%)

MALDI-TOF MASS (dithranol): m/z=6871.66 (cald. 6870.54).

UV-Vis (CHCl$_3$; $\lambda_{max}$, nm (relative intensity)): 410.5 (1.000), 445.5(1.017), 567.5(0.144), 618.5(0.072), (pyridine, $\lambda_{max}$, nm (relative intensity)): 411.5(1.000), 446.0 (1.033), 568.5(0.141), 619.0(0.076). Fluorescence ($\lambda_{ex}$=410.0 nm, CHCl$_3$, λmax, nm (relative intensity)): 622.0(1.00), 673.8(0.44)

6-mer C-6b 0.7 mg (9.8%)

MALDI-TOF MASS (dithranol): m/z=8245.51 (cald. 8244.65).

UV-Vis (CHCl$_3$; $\lambda_{max}$, nm (relative intensity)): 410.5 (1.000), 447.0(0.973), 567.5(0.1473), 618.5(0.077), (pyridine, $\lambda_{max}$, nm (relative intensity)): 412.0(1.000), 447.5 (1.029), 568.5(0.141), 619.0(0.079). Fluorescence ($\lambda_{ex}$=411.0 nm, CHCl$_3$, λmax, nm (relative intensity)): 622.0(1.00), 665(shoulder) (0.34). ($\lambda_{ex}$=412.0 nm, pyridine, λmax, nm (relative intensity)): 623(1.00), 673.2(0.35)

As described above, the porphyrin polymers represented by the formula (1) and the formula (2) of the present invention are more firmly fixed by covalent bonds, in addition to by the coordinate bonds, and therefore can maintain the polymer structure thereof even in a polar solvent. Accordingly, it is now possible, according to the present invention, to provide a sample of a porphyrin polymer whose function can be evaluated in a polar environment.

Further, the method of producing a porphyrin polymer of the present invention enables extending the porphyrin polymer with fewer synthesis steps, and thus is more economical, than the conventional method. Moreover, according to the method of producing a porphyrin polymer of the present invention, it is theoretically possible to synthesize a porphyrin polymer system including hundreds of porphyrin unit, of which production would have been impossible by the conventional method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A covalently linked linear porphyrin polymer represented by formula (1):

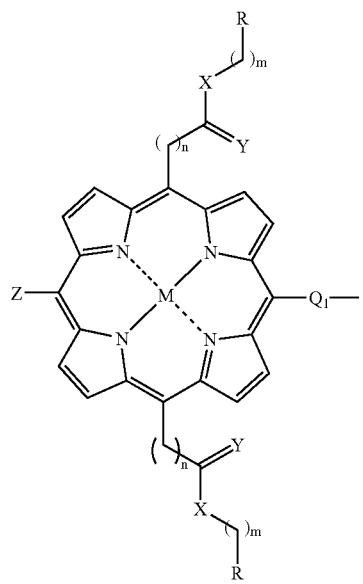

(1)

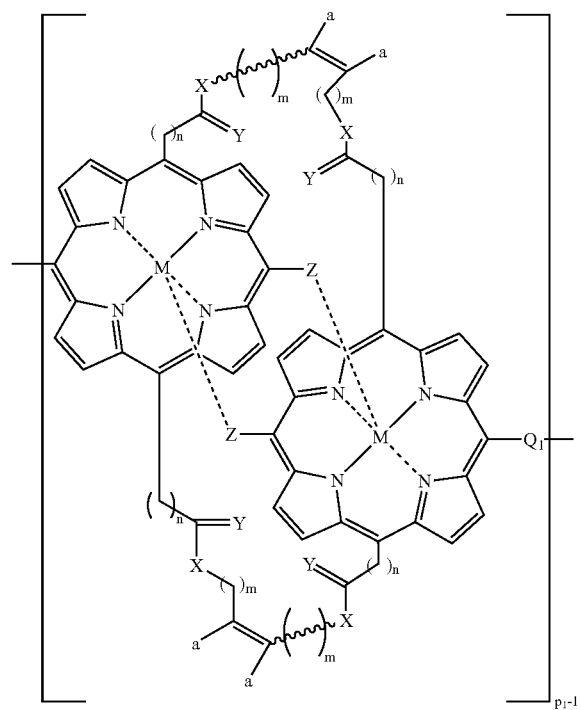

-continued

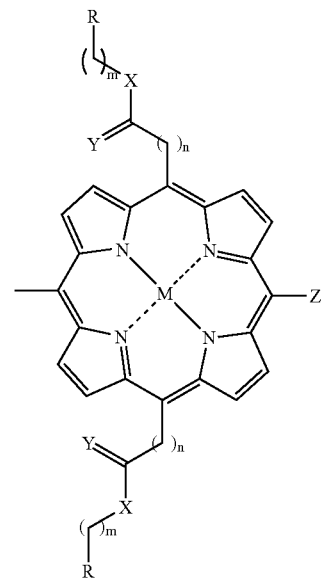

wherein

R represents an alkyl group or

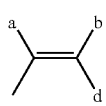

(wherein a, b and d independently represent H, an alkyl group or aryl group);

X represents —O—, —S—, >NR$_{101}$ (wherein R$_{101}$ represents H or an alkyl group), —CH$_2$— or a single bond;

Y represents =O, =S, or 2H;

m represents an integer of 0 to 4;

n represents an integer of 0 to 6;

Z represents a five- or six-membered, nitrogen-containing, coordinating hetero aromatic ring group;

M represents an ion of metal selected from typical metals and transition metals;

Q$_1$ represents a single bond or a linear, divalent linking group; and p$_1$ represents an integer of 2 or more.

2. A covalently linked linear porphyrin polymer derivative represented by formula (1-1):

(1-1)
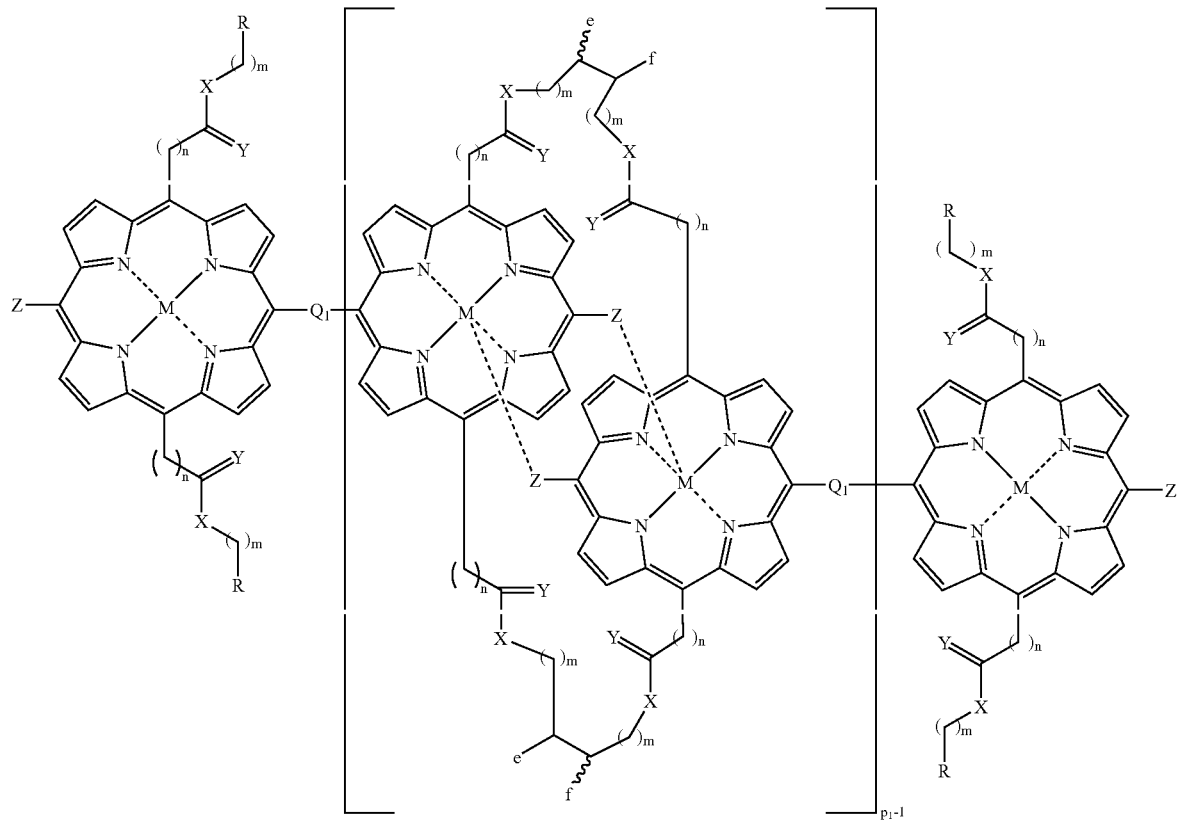
wherein
R, X, Y, m, n, Z, M, $Q_1$ and $p_1$ have the same meaning as defined in formula (1) of claim 1; and
e and f simultaneously represent H or a hydroxyl group, or e and f are bonded to each other to form an epoxy ring together with C—C to which e and f are bonded.
3. A covalently linked cyclic porphyrin polymer represented by formula (2):
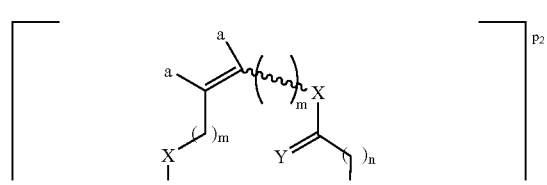
(2)

-continued

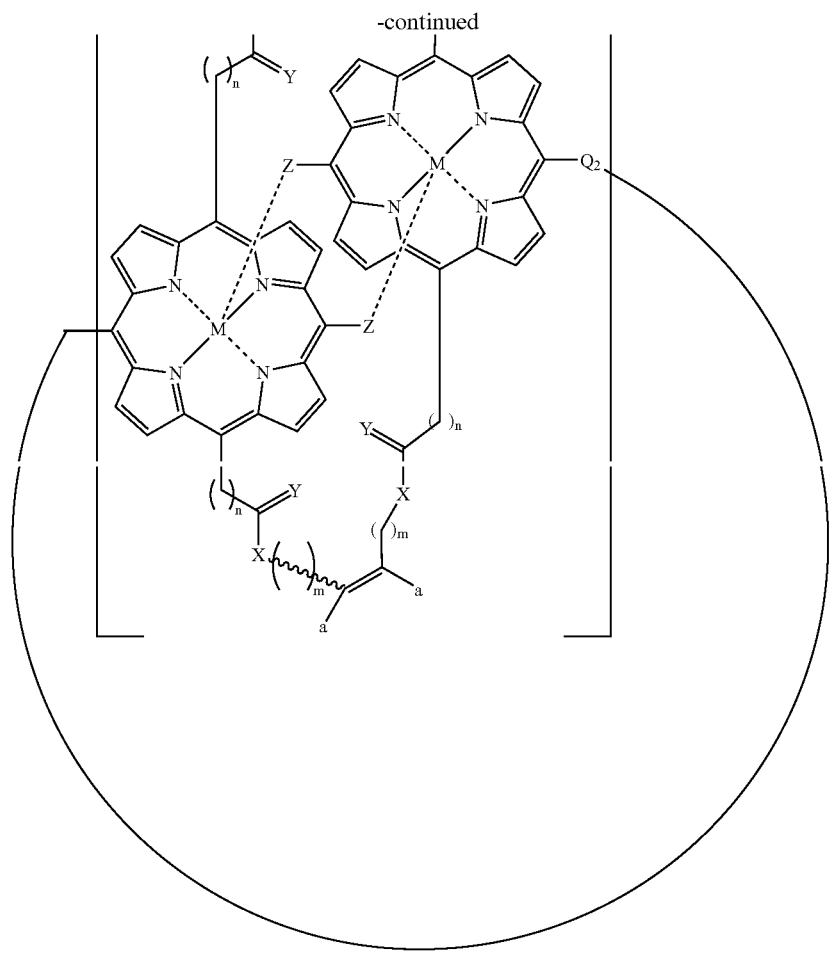

wherein
a represents H, an alkyl group or aryl group;
X represents —O—, —S—, >$NR_{101}$ (wherein $R_{101}$ represents H or an alkyl group), —$CH_2$— or a single bond;
Y represents =O, =S, or 2H;
m represents an integer of 0 to 4;
n represents an integer of 0 to 6;
Z represents a five- or six-membered, nitrogen-containing, coordinating hetero aromatic ring group;
M represents an ion of metal selected from typical metals and transition metals;
$Q_2$ represents a bent divalent group; and
$p_2$ represents an integer of 3 or more.

4. A covalently linked cyclic porphyrin polymer derivative represented by formula (2-1):

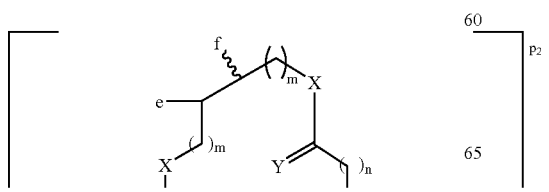

(2-1)

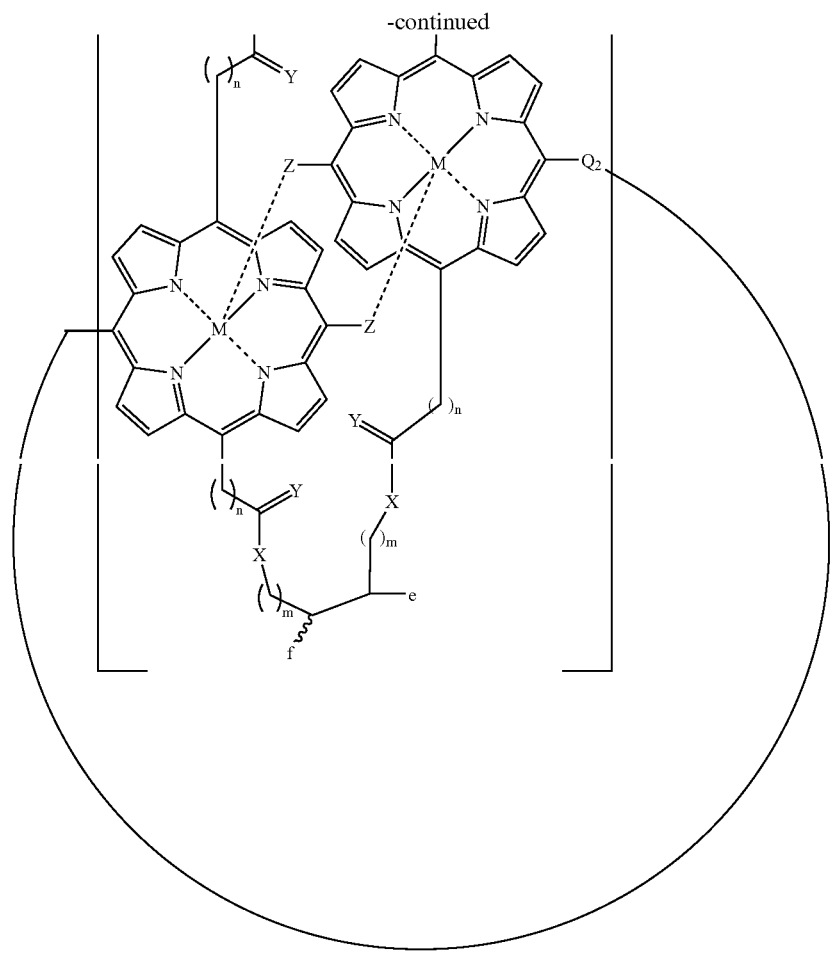
wherein X, Y, m, n, Z, M, Q₂ and p₂ have the same meaning as defined in formula (2) of claim 3; and
e and f simultaneously represent H or a hydroxyl group, or e and f are bonded to each other to form an epoxy ring together with C—C to which e and f are bonded.
5. A coordination-organized linear porphyrin polymer represented by formula (3):
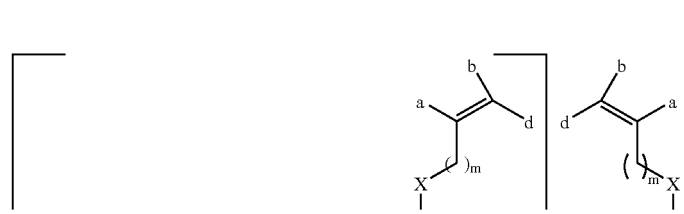
(3)

-continued

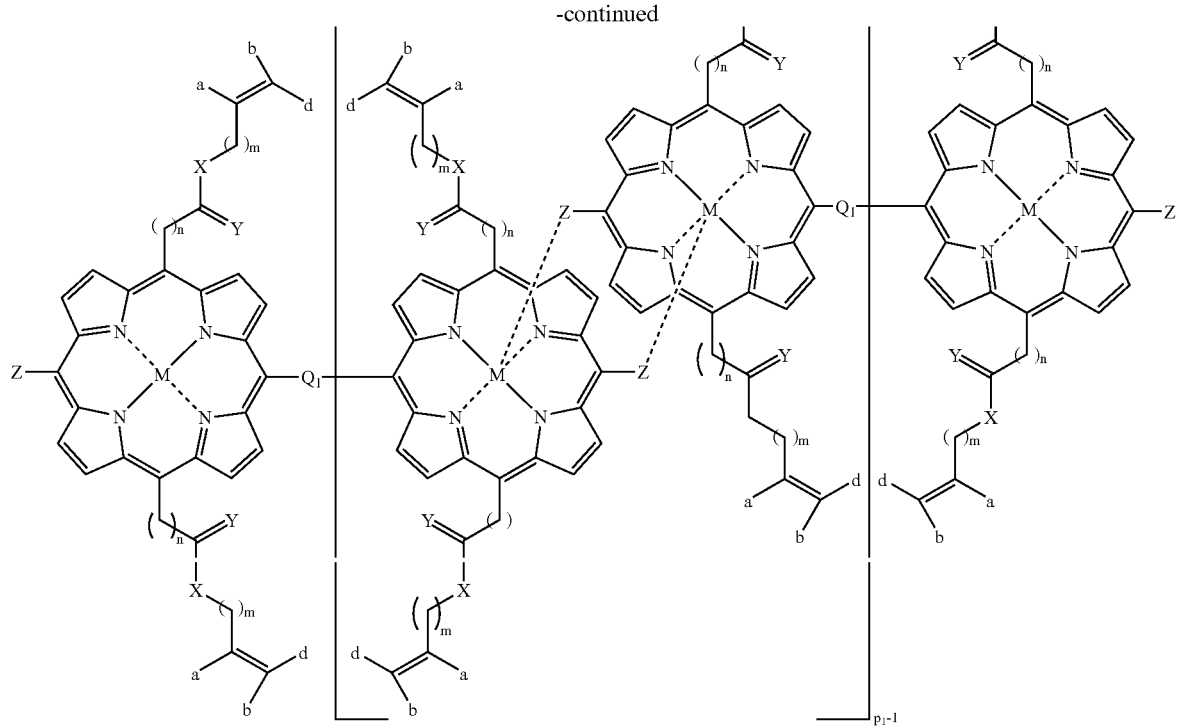

wherein a, b and d independently represent H, an alkyl group or aryl group;
X represents —O—, —S—, >NR$_{101}$ (wherein R$_{101}$ represents H or an alkyl group), —CH$_2$— or a single bond;
Y represents =O, =S, or 2H;
m represents an integer of 0 to 4;
n represents an integer of 0 to 6;

Z represents a five- or six-membered, nitrogen-containing, coordinating hetero aromatic ring group;
M represents an ion of metal selected from typical metals and transition metals;
Q$_1$ represents a linear divalent group; and
p$_1$ represents an integer of 2 or more.

6. A coordination-organized cyclic porphyrin polymer represented by formula (4):

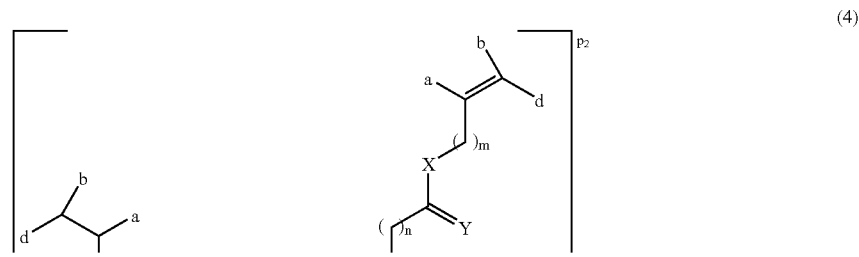

(4)

-continued

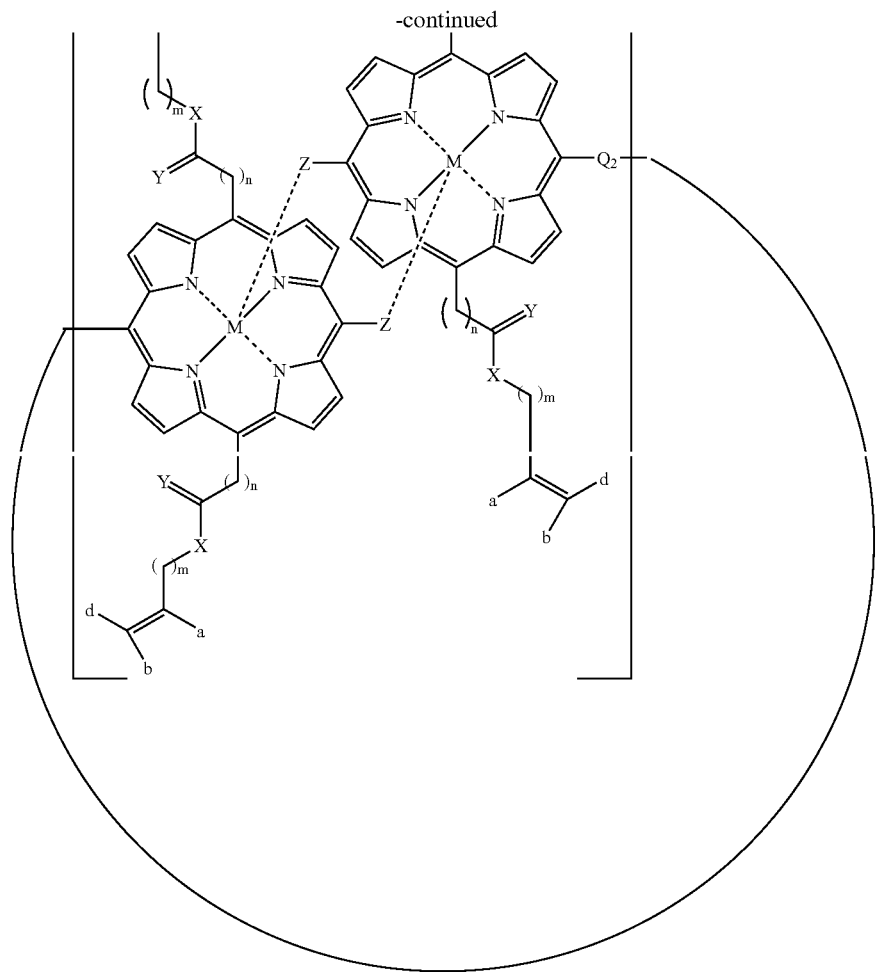

wherein a, b and d independently represent H, an alkyl group or aryl group;

X represents —O—, —S—, >$NR_{101}$ (wherein $R_{101}$ represents H or an alkyl group), —$CH_2$— or a single bond;

Y represents =O, =S, or 2H;

m represents an integer of 0 to 4;

n represents an integer of 0 to 6;

Z represents a five- or six-membered, nitrogen-containing, coordinating hetero aromatic ring group;

M represents an ion of metal selected from typical metals and transition metals;

$Q_2$ represents a bent divalent group; and $p_2$ represents an integer of 3 or more.

7. A bis-porphyrin monomer represented by formula (5):

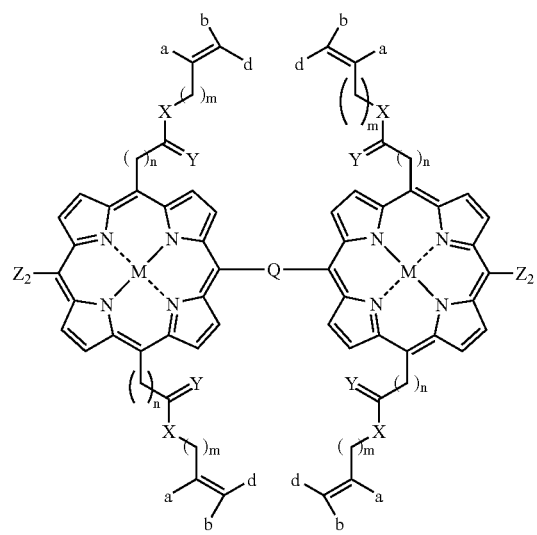

(5)

wherein
a, b and d independently represent H, an alkyl group or aryl group;
X represents —O—, —S—, >NR$_{101}$ (wherein R$_{101}$ represents H or an alkyl group), —CH$_2$— or a single bond;
Y represents =O, =S, or 2H;
m represents an integer of 0 to 4;
n represents an integer of 0 to 6;
Z$_2$ represents a five- or six-membered, nitrogen-containing, coordinating hetero aromatic ring group, alkyl group or aryl group;
M represents an ion of metal selected from typical metals and transition metals; and
Q represents a single bond or a divalent linking group.

8. A covalently linked porphyrin dimer represented by formula (6):

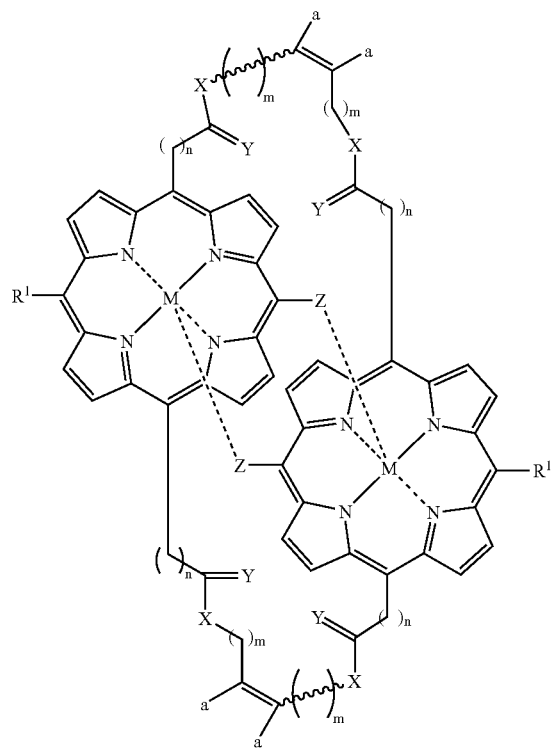

(6)

wherein
a represents H, an alkyl group or aryl group;
X represents —O—, —S—, >NR$_{101}$ (wherein R$_{101}$ represents H or an alkyl group), —CH$_2$— or a single bond;
Y represents =O, =S, or 2H;
m represents an integer of 0 to 4;
n represents an integer of 0 to 6;
Z represents a five- or six-membered, nitrogen-containing, coordinating hetero aromatic ring group;
M represents an ion of metal selected from typical metals and transition metals;

R$^1$ represents H, an alkyl group, alkenyl group, alkynyl group, aryl group,

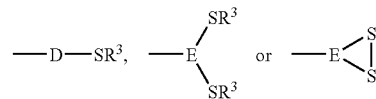

(wherein D represents a divalent group including at least one of an arylene group and alkylene group, E represents a trivalent group including at least one of an arylene group and alkylene group, and R$^3$ represents H or an acetyl group).

9. A covalently linked porphyrin dimer derivative represented by formula (6-1):

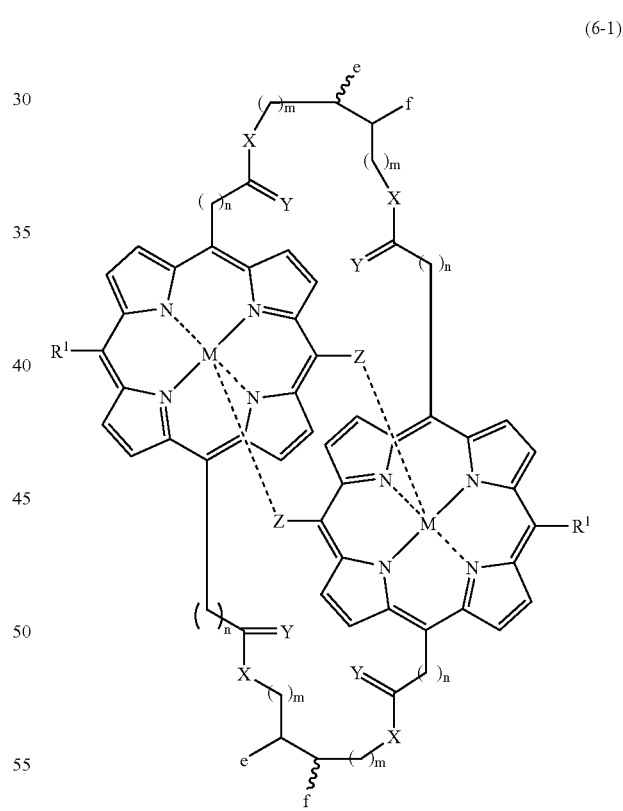

(6-1)

wherein
X, Y, m, n, Z, M, and R$^1$ have the same meaning as defined in formula (6) of claim 8; and
e and f simultaneously represent H or a hydroxyl group, or e and f are bonded to each other to form an epoxy ring together with C—C to which e and f are bonded.

10. A coordination-organized porphyrin dimer represented by formula (7):

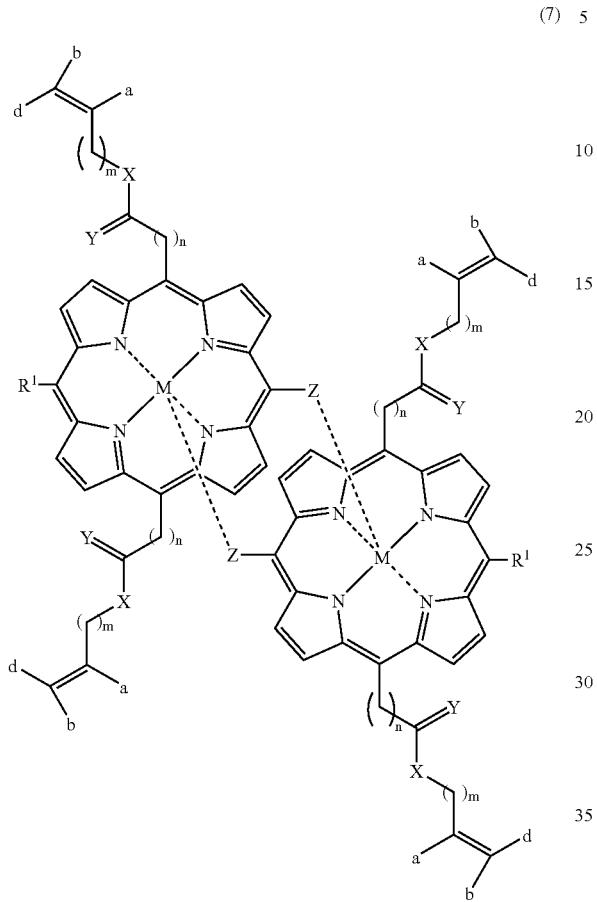 (7)

wherein
- a, b and d independently represent H, an alkyl group or an aryl group;
- X represents —O—, —S—, >NR$_{101}$ (here, R$_{101}$ represents H or an alkyl group), —CH$_2$— or a single bond;
- Y represents =O, =S, or 2H;
- m represents an integer of 0 to 4;
- n represents an integer of 0 to 6;
- Z represents a five- or six-membered, nitrogen-containing, coordinating hetero aromatic ring group;
- M represents an ion of metal selected from typical metals and transition metals;
- R$^1$ represents H, an alkyl group, alkenyl group, alkynyl group, aryl group,

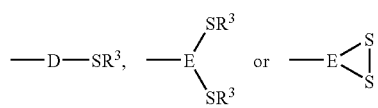

(wherein D represents a divalent group including at least one of an arylene group and alkylene group, E represents a trivalent group including at least one of an arylene group and alkylene group, and R$^3$ represents H or an acetyl group).

11. A porphyrin metal complex monomer represented by formula (8):

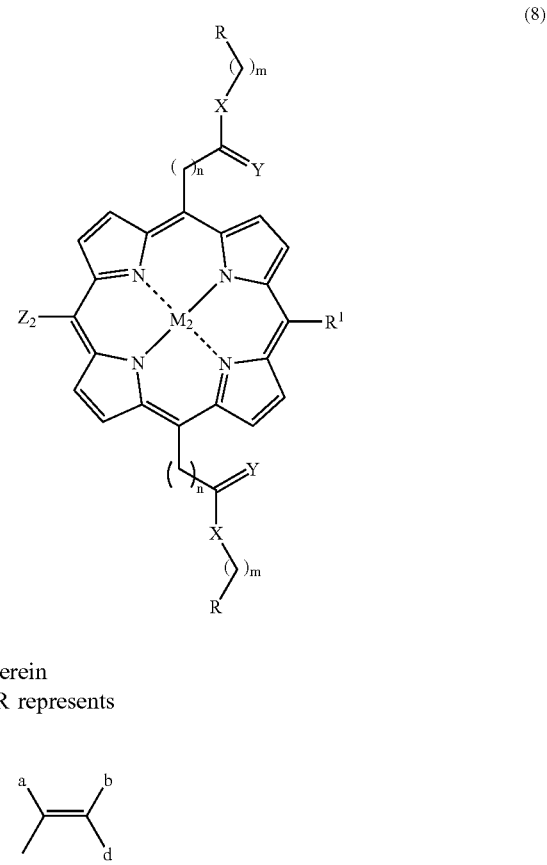 (8)

wherein
R represents (wherein a, b and d independently represent H, an alkyl group or aryl group);
- X represents —O—, —S—, >NR$_{101}$ (wherein R$_{101}$ represents H or an alkyl group), —CH$_2$— or a single bond;
- Y represents =O, =S, or 2H;
- m represents an integer of 0 to 4;
- n represents an integer of 0 to 6;
- Z$_2$ represents a five- or six-membered, nitrogen-containing, coordinating hetero aromatic ring group, an alkyl group or aryl group;
- M$_2$ represents an ion of metal selected from typical metals and transition metals;
- R$^1$ represents H, an alkyl group, alkenyl group, alkynyl group, aryl group,

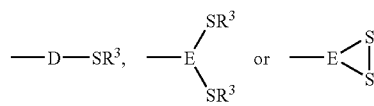

(wherein D represents a divalent group including at least one of an arylene group and alkylene group, E represents a trivalent group including at least one of an arylene group and alkylene group, and R$^3$ represents H or an acetyl group).

12. A method of producing a covalently linked linear porphyrin polymer represented by formula (1):

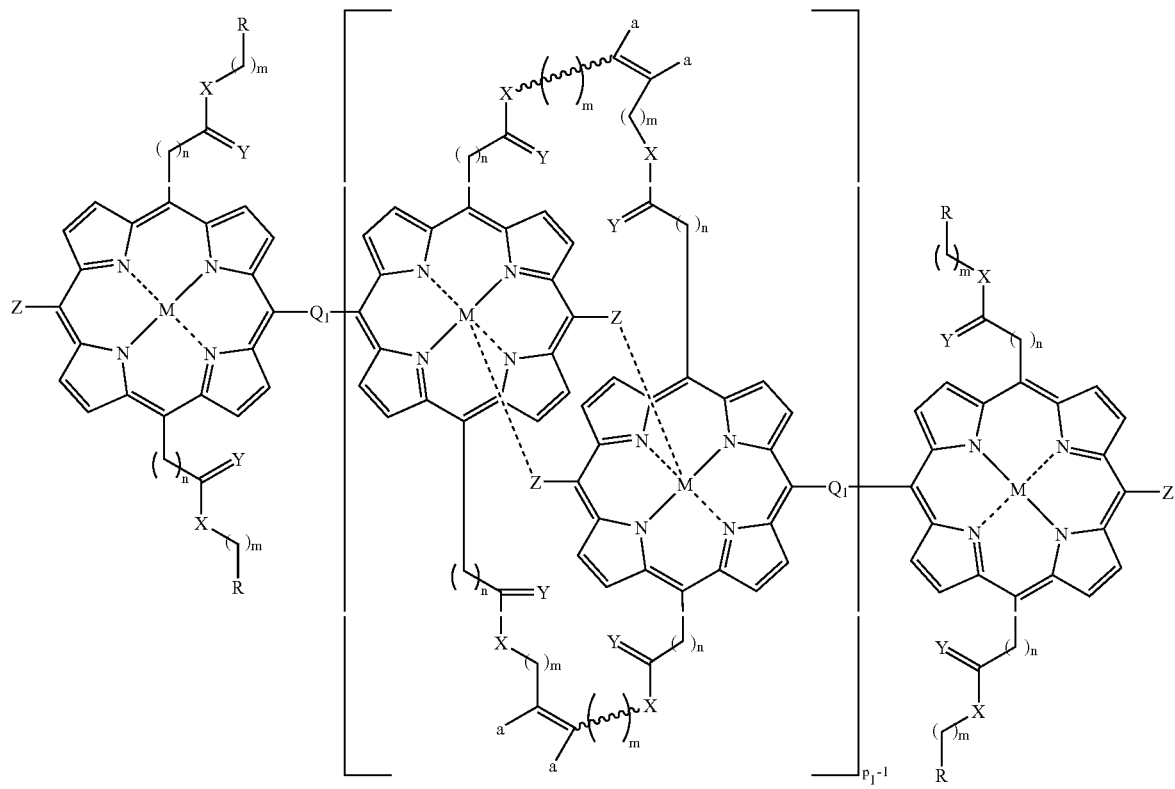

(1)

wherein

R represents an alkyl group or

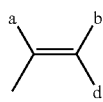

(wherein a, b and d independently represent H, an alkyl group or aryl group);

X represents —O—, —S—, >NR$_{101}$ (wherein R$_{101}$ represents H or an alkyl group), —CH$_2$— or a single bond;

Y represents =O, =S, or 2H;

m represents an integer of 0 to 4;

n represents an integer of 0 to 6;

Z represents a five- or six-membered, nitrogen-containing, coordinating hetero aromatic ring group;

M represents an ion of metal selected from typical metals and transition metals;

Q$_1$ represents a single bond or a linear, divalent linking group; and p$_1$ represents an integer of 2 or more comprising:

subjecting the coordination-organized linear polymer represented by formula (3) according to claim 5 to a cyclization metathesis reaction in the presence of Grubbs catalyst.

13. A method of producing a covalently linked linear porphyrin polymer derivative represented by formula (1-1):

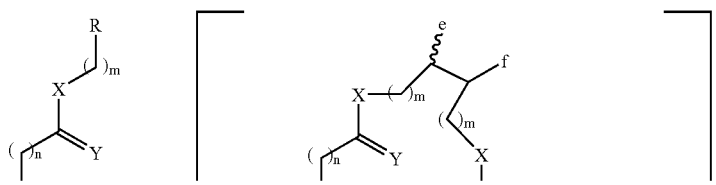

(1-1)

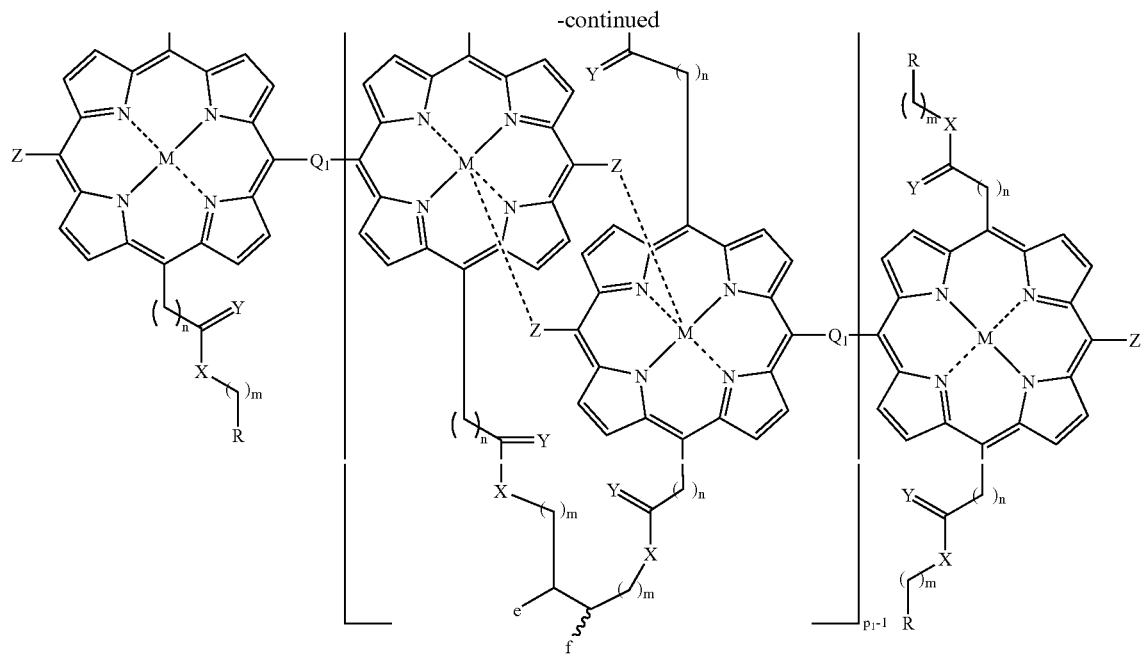

wherein
R, X, Y, m, n, Z, M, $Q_1$ and $p_1$ have the same meaning as defined in formula (1) of claim 1; and
e and f simultaneously represent H or a hydroxyl group, or e and f are bonded to each other to form an epoxy ring together with C—C to which e and f are bonded comprising:
(a) hydrogenating the covalently linked linear porphyrin polymer represented by formula (1) according to claim 1 in the presence of a metal catalyst to obtain the covalently linked linear porphyrin polymer derivative represented by formula (1-1), provided that e and f of formula (1-1) each represents H;
(b) oxidizing the covalently linked linear porphyrin polymer represented by formula (1) according to claim 1 in the presence of a catalyst to obtain the covalently linked linear porphyrin polymer derivative represented by formula (1-1), provided that e and f of formula (1-1) each represents a hydroxy group; or (c) oxidizing the covalently linked linear porphyrin polymer represented by formula (1) according to claim 1, optionally in the presence of a catalyst, to obtain the covalently linked linear porphyrin polymer derivative represented by formula (1-1), provided that e and f of formula (1-1) are bonded together to form an epoxy ring together with C—C to which they attach.

14. A method of producing a covalently linked cyclic porphyrin polymer represented by formula (2):

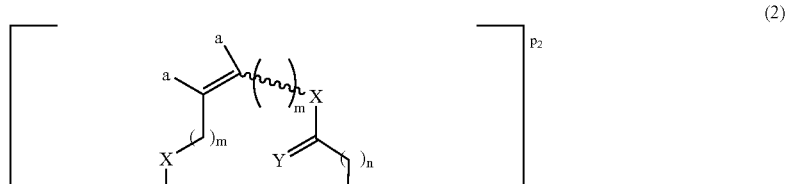

(2)

-continued

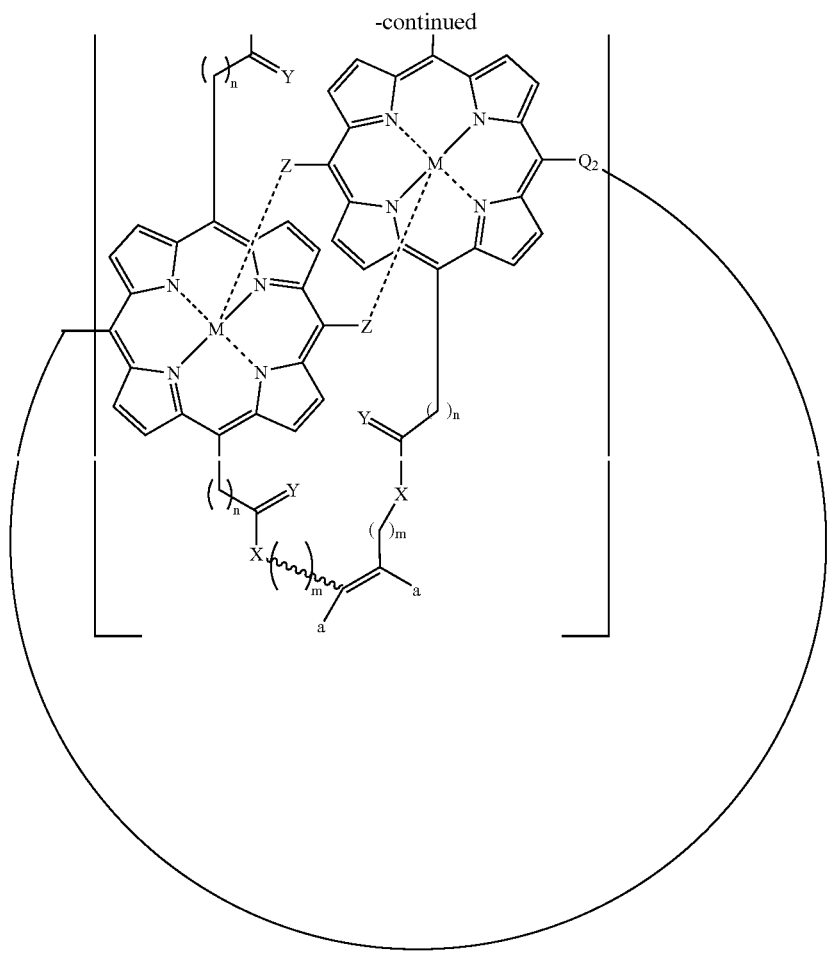

wherein
a represents H, an alkyl group or aryl group;
X represents —O—, —S—, >NR$_{101}$ (wherein R$_{101}$ represents H or an alkyl group), —CH$_2$— or a single bond;
Y represents =O, =S, or 2H;
m represents an integer of 0 to 4;
n represents an integer of 0 to 6;
Z represents a five- or six-membered, nitrogen-containing, coordinating hetero aromatic ring group;
M represents an ion of metal selected from typical metals and transition metals;

Q$_2$ represents a bent divalent group; and p$_2$ represents an integer of 3 or more comprising:
subjecting the coordination-organized cyclic porphyrin polymer represented by formula (4) according to claim 6 to a cyclization metathesis reaction in the presence of Grubbs catalyst.

15. A method of producing a covalently linked cyclic porphyrin polymer derivative represented by formula (2-1):

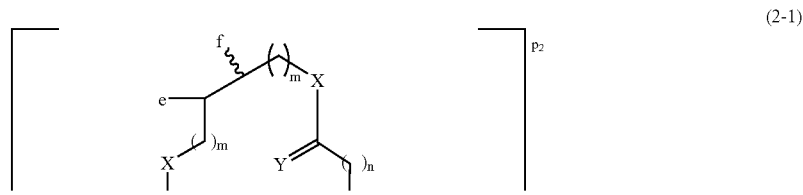

(2-1)

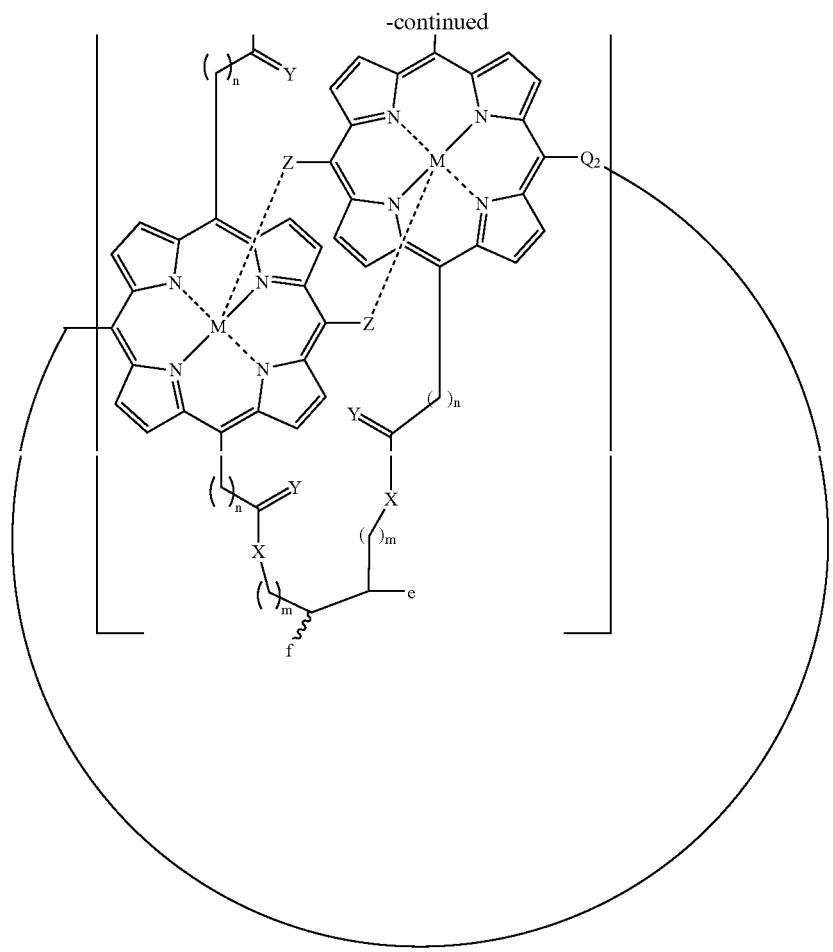

wherein X, Y, m, n, Z, M, $Q_2$ and $p_2$ have the same meaning as defined in formula (2) of claim 3; and e and f simultaneously represent H or a hydroxyl group, or e and f are bonded to each other to form an epoxy ring together with C—C to which e and f are bonded comprising:

(a) hydrogenating the covalently linked cyclic porphyrin polymer represented by formula (2) according to claim 3 in the presence of a metal catalyst to obtain the covalently linked cyclic porphyrin polymer derivative represented by formula (2-1), provided that e and f of formula (2-1) each represents H;

(b) oxidizing the covalently linked cyclic porphyrin polymer represented by formula (2) according to claim 3 in the presence of a catalyst to obtain the covalently linked cyclic porphyrin polymer derivative represented by formula (2-1), provided that e and f of formula (2-1) each represents a hydroxy group; or (c) oxidizing the covalently linked cyclic porphyrin polymer represented by formula (2) according to claim 3, optionally in the presence of a catalyst, to obtain the covalently linked cyclic porphyrin polymer derivative represented by formula (2-1), provided that e and f of formula (2-1) are bonded together to form an epoxy ring together with C—C to which they attach.

16. A method of producing (a) a coordination-organized linear porphyrin polymer represented by formula (3):

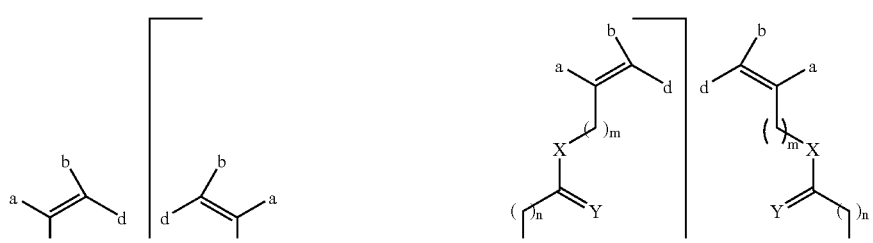

(3)

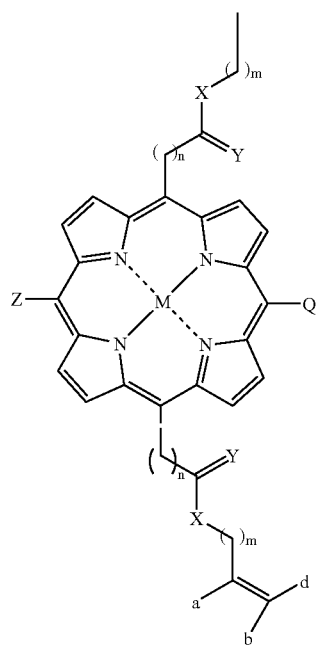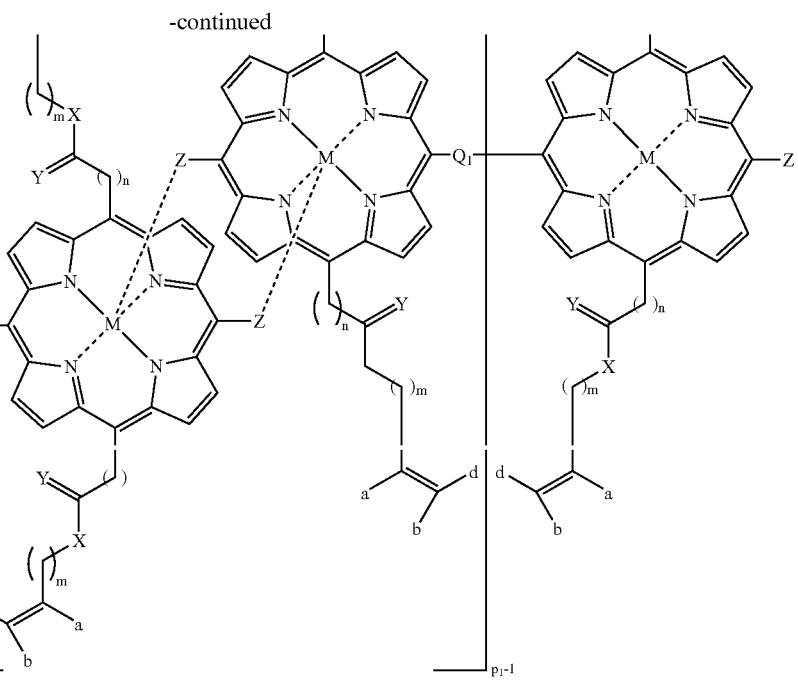

wherein
- a, b and d independently represent H, an alkyl group or aryl group;
- X represents —O—, —S—, >NR$_{101}$ (wherein R$_{101}$ represents H or an alkyl group), —CH$_2$— or a single bond;
- Y represents =O, =S, or 2H;
- m represents an integer of 0 to 4;
- n represents an integer of 0 to 6;
- Z represents a five- or six-membered, nitrogen-containing, coordinating hetero aromatic ring group;
- M represents an ion of metal selected from typical metals and transition metals;
- Q$_1$ represents a linear divalent group; and
- p$_1$ represents an integer of 2 or more;

comprising self-organizing the bis-porphyrin monomer represented by formula (5) according to claim 7 in a non-polar solvent, provided that
when Q in formula (5) represents a single bond or a linear, divalent group the coordination-organized linear porphyrin polymer represented by formula (3) is obtained.

17. A method of producing a covalently linked porphyrin dimer represented by formula (6):

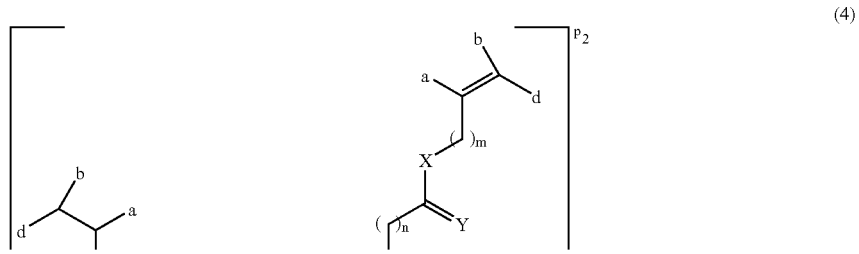

(4)

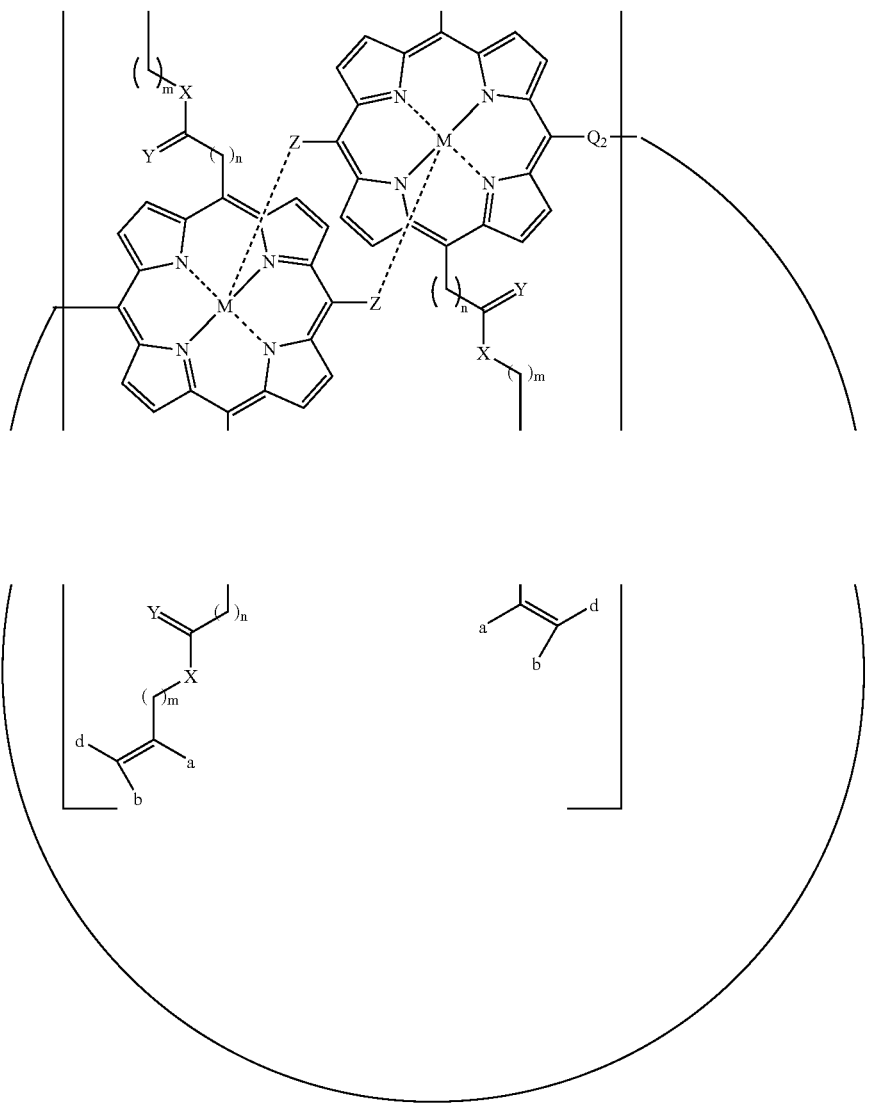

wherein a represents H, an alkyl group or aryl group;

X represents —O—, —S—, >NR$_{101}$ (wherein R$_{101}$ represents H or an alkyl group), —CH$_2$— or a single bond;

Y represents =O, =S, or 2H;

m represents an integer of 0 to 4;

n represents an integer of 0 to 6;

Z represents a five- or six-membered, nitrogen-containing, coordinating hetero aromatic ring group;

M represents an ion of metal selected from typical metals and transition metals;

R$^1$ represents H, an alkyl group, alkenyl group, alkynyl group, aryl group,

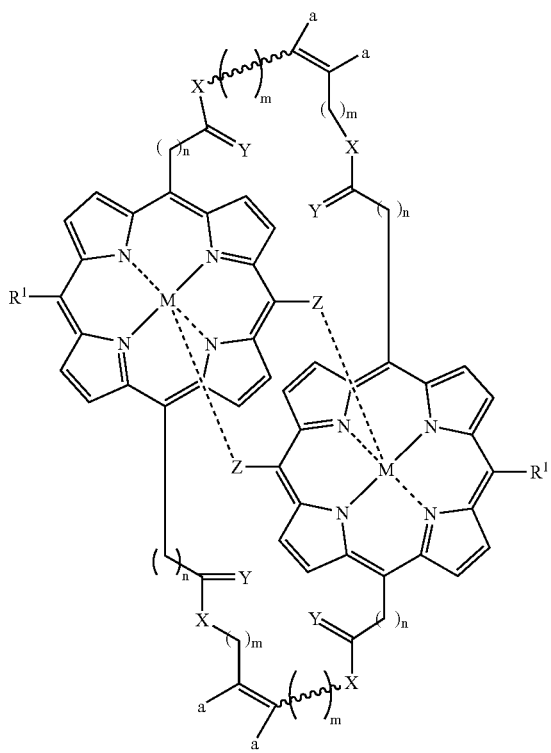

(6)

(wherein D represents a divalent group including at least one of an arylene group and alkylene group, E represents a trivalent group including at least one of an arylene group and alkylene group, and $R^3$ represents H or an acetyl group)

comprising:

subjecting the coordination-organized porphyrin dimer represented by formula (7) according to claim 10 to a cyclization metathesis reaction in the presence of Grubbs catalyst.

18. A method of producing a covalently linked porphyrin dimer derivative represented by formula (6-1):

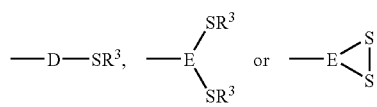

wherein

X, Y, m, n, Z, M, and $R^1$ have the same meaning as defined in formula (6) of claim 8; and e and f simultaneously represent H or a hydroxyl group, or e and f are bonded to each other to form an epoxy ring together with C—C to which e and f are bonded comprising:

(a) hydrogenating the covalently linked porphyrin dimer represented by formula (6) according to claim 8 in the presence of a metal catalyst to obtain the covalently linked porphyrin dimer derivative represented by formula (6-1), provided that e and f of formula (6-1) each represents H;

(b) oxidizing the covalently linked porphyrin dimer represented by formula (6) according to claim 8 in the presence of a catalyst to obtain the covalently linked linear porphyrin dimer derivative represented by formula (6-1), provided that e and f of formula (6-1) each represents a hydroxy group; or (c) oxidizing the covalently linked linear porphyrin dimer represented by formula (6) according to claim 8, optionally in the presence of a catalyst, to obtain the covalently linked linear porphyrin dimer derivative represented by formula (6-1), provided that e and f of formula (6-1) are bonded together to form an epoxy ring together with C—C to which they attach.

19. A method of producing a coordination-organized porphyrin dimer represented by formula (7):

(6-1)

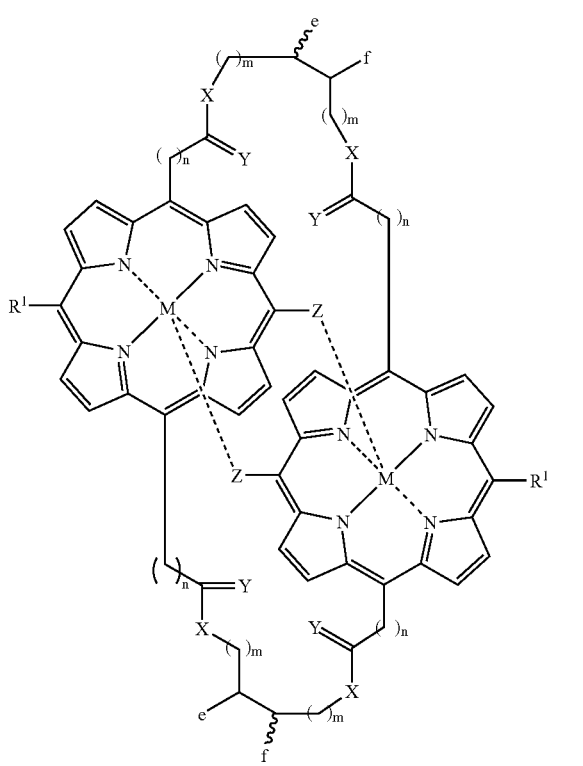

wherein a, b and d independently represent H, an alkyl group or an aryl group;

X represents —O—, —S—, >$NR_{101}$ (here, $R_{101}$ represents H or an alkyl group), —$CH_2$— or a single bond;

Y represents =O, =S, or 2H;

m represents an integer of 0 to 4;

n represents an integer of 0 to 6;

Z represents a five- or six-membered, nitrogen-containing, coordinating hetero aromatic ring group;

M represents an ion of metal selected from typical metals and transition metals;

$R^1$ represents H, an alkyl group, alkenyl group, alkynyl group, aryl group, (7)

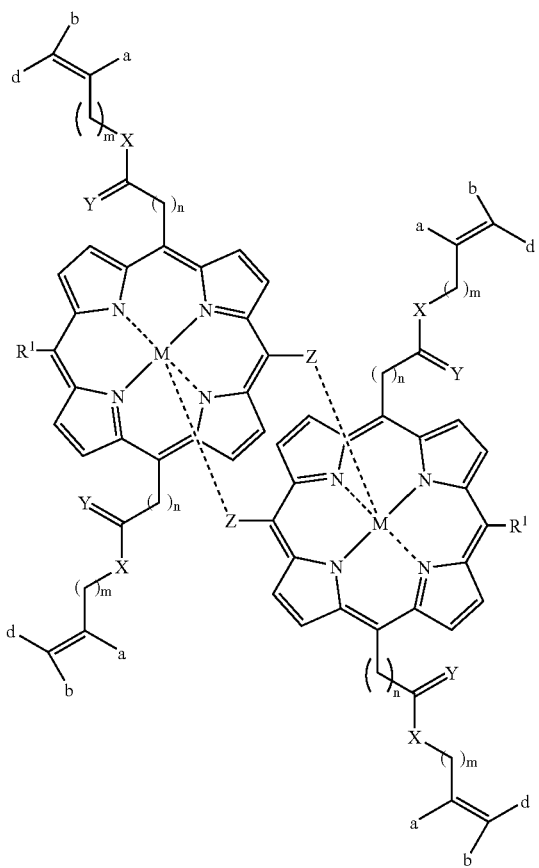

(wherein D represents a divalent group including at least one of an arylene group and alkylene group, E represents a trivalent group including at least one of an arylene group and alkylene group, and $R^3$ represents H or an acetyl group)

comprising:
self-organizing the porphyrin metal complex monomer represented by formula (8) according to claim 11 in a non-polar solvent.

20. A method of producing a coordination-organized cyclic porphyrin polymer represented by formula (4):

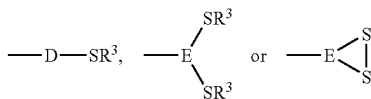

wherein
- a, b and d independently represent H, an alkyl group or an aryl group;
- X represents —O—, —S—, >$NR_{101}$ (wherein $R_{101}$ represents H or an alkyl group), —$CH_2$— or a single bond;
- Y represents =O, =S, or 2H;
- m represents an integer of 0 to 4;
- n represents an integer of 0 to 6;
- Z represents a five- or six-membered, nitrogen-containing, coordinating hetero aromatic ring group;
- M represents an ion of metal selected from typical metals and transition metals;
- $Q_2$ represents a bent divalent group; and
- $P_2$ represents an integer of 3 or more comprising:
self-organizing the bis-porphyrin monomer represented by formula (5) according to claim 7 in a non-polar solvent, provided that
when Q in formula (5) represents a bent, divalent group the coordination-organized cyclic porphyrin polymer represented by formula (4) is obtained.

* * * * *